(12) United States Patent
Rhee

(10) Patent No.: US 12,545,644 B2
(45) Date of Patent: Feb. 10, 2026

(54) 6-AZIDO-1,3 BENZO[DE]ISOQUINOLINE COMPOUNDS PHOTO-CROSSLINKED BY VISIBLE LIGHT AND USES THEREOF

(71) Applicant: SEOUL NATIONAL UNIVERSITY R&DB FOUNDATION, Seoul (KR)

(72) Inventor: Hyun Woo Rhee, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 846 days.

(21) Appl. No.: 17/784,298

(22) PCT Filed: Apr. 13, 2022

(86) PCT No.: PCT/KR2022/005350
§ 371 (c)(1),
(2) Date: Jun. 10, 2022

(87) PCT Pub. No.: WO2022/220581
PCT Pub. Date: Oct. 20, 2022

(65) Prior Publication Data
US 2024/0182425 A1  Jun. 6, 2024

(30) Foreign Application Priority Data

Apr. 13, 2021 (KR) .................. 10-2021-0047647
Nov. 5, 2021 (KR) .................. 10-2021-0151263

(51) Int. Cl.
*C07D 221/14* (2006.01)
*G01N 33/68* (2006.01)

(52) U.S. Cl.
CPC ....... *C07D 221/14* (2013.01); *G01N 33/6845* (2013.01); *G01N 33/6848* (2013.01); *G01N 2333/165* (2013.01)

(58) Field of Classification Search
CPC ............. C07D 221/14; G01N 33/6845; G01N 2333/165; G01N 33/6848
See application file for complete search history.

(56) References Cited

U.S. PATENT DOCUMENTS

2014/0273274 A1   9/2014   Valdez et al.

FOREIGN PATENT DOCUMENTS

| CN | 109608396 A | * | 4/2019 | ............. C09K 11/06 |
| WO | WO-2012078559 A2 | | 6/2012 | |
| WO | WO-2014109985 A1 | | 7/2014 | |

OTHER PUBLICATIONS

PubChem CID 90289651, National Center for Biotechnology Information. PubChem Compound Summary for CID 90289651, 4-Azido-n-ethyl-1,8-naphthalimide. https://pubchem.ncbi.nlm.nih.gov/compound/4-Azido-n-ethyl-1_8-naphthalimide. Accessed Mar. 28, 2025, create date Feb. 13, 2015. (Year: 2015).*
Singha et al., ACS Omega (2019), 4(7), 11914-11920. (Year: 2019).*
A machine generated English translation of CN 109608396 A, Fan et al., 2019. (Year: 2019).*
Brachet, E. et al., "Visible light C—H amidation of heteroarenes with benzoyl azides", Chem. Sci., 2015, 6, 987.
Borra, S. et al., "Visible light triggered photo-decomposition of vinyl azides to (E)-stilbene derivatives via 1,2-acyl migration", Org. Biomol. Chem., 2019, 17, 5971-5981.
Gordon, D.E. et al., "A SARS-CoV-2 protein interaction map reveals targets for drug repurposing", Nature, vol. 583, Jul. 16, 2020, pp. 459-468.
Nabeel-Shah, S. et al., "SARS-CoV-2 nucleocapsid protein binds host mRNAs and attenuates stress granules to impair host stress response", *bioRxiv* 2020, 2020.2010.2023.342113.* *Has since published in iScience 25, 103562, Jan. 21, 2022 and follows the attached bioRxiv prepublished version.
Korean Written Opinion of the ISA issued in PCT/KR2022/005350, mailed Jul. 21, 2022; ISA/KR.
Kamaruddin, et al., "A facile, click chemistry-based approach to assembling fluorescent chemosensors for protein tyrosine kinases", Bioorganic & Medicinal Chemistry Letters, 2011, 21, pp. 329-331.
Zeng, et al., "Fluorescent Probe Encapsulated in SNAP-Tag Protein Cavity to Eliminate Nonspecific Fluorescence and Increase Detection Sensitivity", Bioconjugate Chemistry, 2016, 27, pp. 1872-1879.
Mishra, et al., "A chemical tool for blue light-inducible proximity photo-crosslinking in live cells", Chemical Science, 2022, 13, pp. 955-966.
Korean International Search Report issued in PCT/KR2022/005350, mailed Jul. 21, 2022; ISA/KR.
Zhang, Dan et al. "New Strategy for the azido-ascorbi acid reaction: a convenient chemosensor and its imaging in garlic slice tissues", New Journal of Chemistry, Issue 9, 2018 (1 page).

(Continued)

*Primary Examiner* — Laura L Stockton
(74) *Attorney, Agent, or Firm* — Harness, Dickey & Pierce, P.L.C.

(57) ABSTRACT

The present invention relates to novel compounds that are photo-crosslinked by visible light and spatiotemporal proximity photo-crosslinking by visible light activation (spotlight) using the same. When a target nucleic acid or target protein is bound to the novel compounds by the property of being photo-crosslinked to the proximal protein or peptide by irradiation with visible light and it is irradiated with visible light, the novel compounds according to the present invention can be photo-crosslinked with a protein or peptide that physically interacts with the target protein or target nucleic acid, and thus, there are advantages in that it is possible to overcome diffusive labeling, which is a limitation of the conventional proximity labeling technology, by photo-crosslinking by visible light irradiation, which is a safe method for a living body, and to improve the accuracy of protein interactome identification.

12 Claims, 37 Drawing Sheets
Specification includes a Sequence Listing.

(56) References Cited

OTHER PUBLICATIONS

Tamanini, Emiliano, et al. "Cyclam-Based 'Clickates': Homogeneous and Heterogeneous Fluorescent Sensors for Zn (II)" Inorganic Chemistry Article, Oct. 2009 (12 pages).

Spain, Malcolm, et al. "Anti-Tubercular bis-Substituted Cyclam Derivatives: Structure-Activity Relationships and In Vivo Studies", School of Chemistry, The University of Sydney, Sydney, NSW 2006, Austrailia (43 pages).

Fengriu Liu, et al., "Synthesis of 4-aziridino[C60]fulleren-1,8-naphthalimde (C60-NI dyads) and their photophysical properties" Science Direct, vol. 66, Issue 29, Jul. 17, 2010, pp. 5467-5471 (6 pages).

Chun-tao Yang, et al. "Data-Driven Identification of Hydrogen Sulfid Scavenger" HHS Public Access, Angew Chem Int Ed Engl. Aug. 5, 2019 (15 pages).

Mingfengt Yu, et al. "A fluorescent 'allosteric scorpionand' complex visualizes a biological recognition event" Chembiochem, Jan. 21, 2013 (1 page Abstract).

Singha, et al. "Use of Azido Naphthalimide Carboxylic Acids as Fluroescent Template with Built-in Photo-reactive Group and Flexible Linker Simplifies Protein Labeling Study: Applications in Selective Tagging of HCAII and Penicillin Binding Proteins", ChemComm Accepted Manuscript, 2017 (5 pages).

Singha, et al. "Rapid Fluorescent-Based Detection of New Delhi Metallo-B-Lactamases by Photo-Cross-Linking Using Conjugates of Azidonaphthalimide and Zinc (II)-Chelating Motifs", ACS Omega, 2019 (8 pages).

Extended European Search Report for Application No. 22728030.2 dated Sep. 23, 2024 (12 pages).

\* cited by examiner

VL1: n=2
VL2: n=3

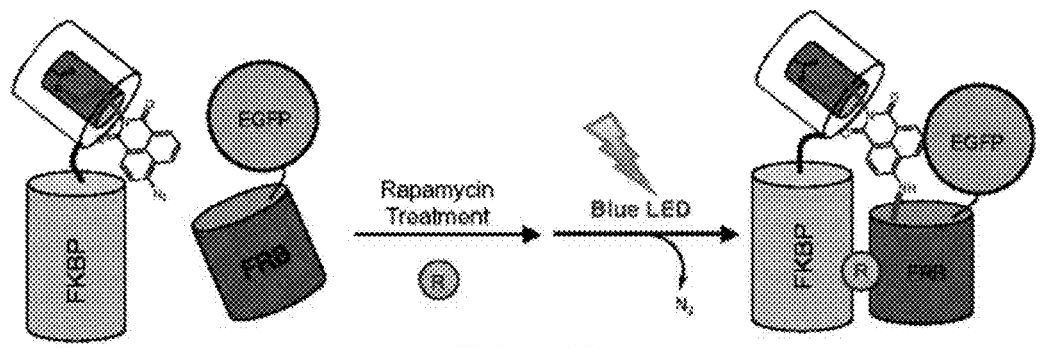
FIG. 2F
FIG. 2G
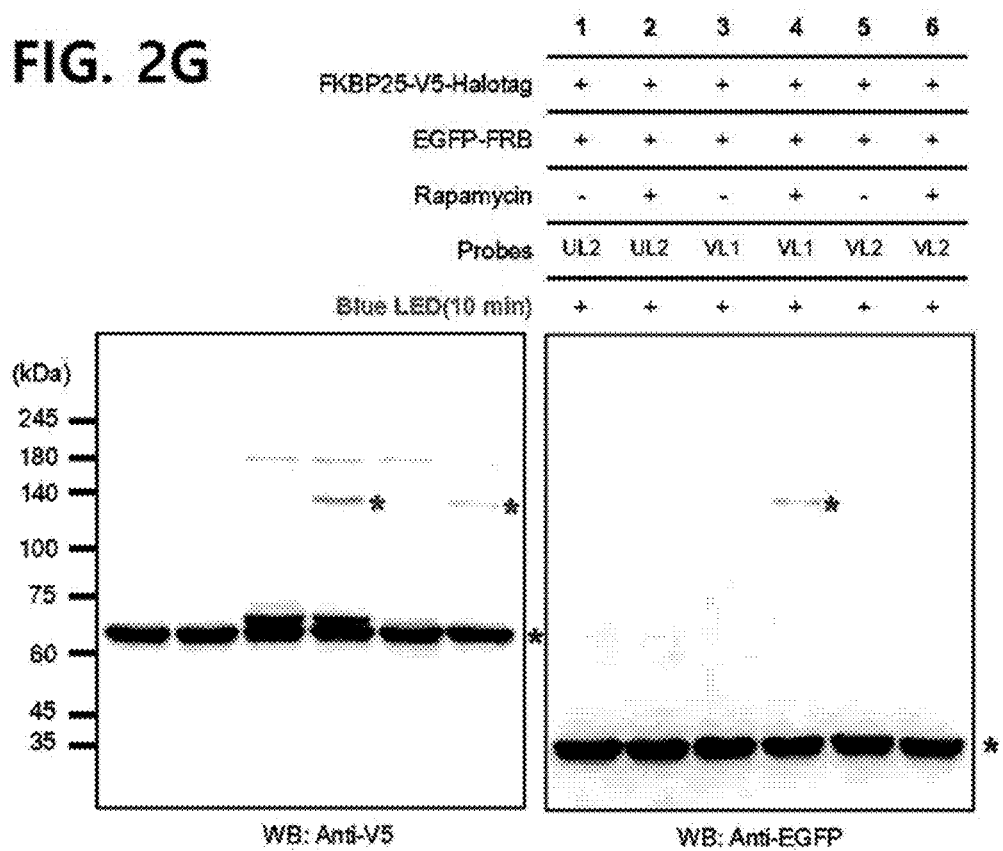

6-AZIDO-1,3 BENZO[DE]ISOQUINOLINE COMPOUNDS PHOTO-CROSSLINKED BY VISIBLE LIGHT AND USES THEREOF

CROSS-REFERENCE TO RELATED APPLICATIONS

This application is a U.S. National Phase Application under 35 U.S.C. 371 of International Application No. PCT/KR2022/005350, filed on Apr. 13, 2022, which claims the benefit of Korean Patent Application No. 10-2021-0047647, filed on Apr. 13, 2021 and Korean Patent Application No. 10-2021-0151263, filed on Nov. 5, 2021.

TECHNICAL FIELD

The present invention relates to novel compounds that are photo-crosslinked by visible light and uses thereof, and more specifically to novel compounds that are photo-crosslinked by visible light and spatiotemporal proximity photo-crosslinking by visible light activation (spotlight) using the same.

BACKGROUND ART

Most proteins physically interact with other proteins and form macromolecular complexes to perform their biological functions. However, only a few methods are available to reliably reveal unknown protein-protein interaction (PPI) network in living cells. Recently, proximity labeling (PL) technology was developed based on in situ-generated reactive species using various genetically encodable enzymes such as ascorbate peroxidase (APEX) or various biotin ligases such as BioID or TurboID, and the reactive species generated by APEX or BioID/TurboID are covalently conjugated to proximal proteins near the enzymes in living cells and analyzed using mass spectrometry after cell lysis. This method has become increasingly popular in cell biology and has revealed local proteome information in diverse subcellular compartments within a live cellular context.

The labeling radius of APEN BioID/TurboID and other proximity labeling tools (e. T-Rex, PhotoPPI) is estimated to range from approximately 10 nm to a few hundred nanometers, depending on the lifetime of the reactive species and local protein concentration in live cells. This labeling radius is suitable for sub-compartmental proteomic mapping; however, this labeling radius is rather diffusive for the identification or interaction analysis of the physical interaction partners (i.e., interactome analysis) of proteins of interest (POO.

Meanwhile, in the case of interactome mapping, photo-crosslinking reactions have been utilized to capture the physical interactome, and this method utilizes aryl azide, diazo or diazitine moieties that can be converted into reactive nitrene or carbene species by ultraviolet (UV) light activation. Since these species usually have a short lifetime ($T_{1/2}<2$ ns) in an aqueous solution, they can conduct N—H or C—H insertion reactions with physically interacting proteins. Photo-crosslinking methods using unnatural amino acids (UAAs) such as photo-methionine or photo-leucine or those containing diazirine moieties enable photo-crosslinking reaction of the proteins into which UAAs are incorporated via the translational machinery in live cells.

However, this method faces two critical issues: (i) toxicity from proteome-wide incorporation of UAAs and (ii) UV light irradiation that has detrimental consequences for a live system. To overcome the issues of current proximity labeling and photo-crosslinking techniques, photo-crosslinking by visible light can be attempted, but since most currently known visible light active moieties that can be used (e.g., benzoyl azide, vinyl azide) are unstable in physiological systems (Brachet, E, et al., *Chem Sci.* 2015, 6, 987-992; Borra, S. et at, *Org Biol. Chem,* 2019, 17, 5971-5981), there is a limitation in grafting the same to intracellular proximity labeling.

Naphthyl azide-based AzNP (4-azido-N-ethy-1,8-naphthalimide) is (1) very stable in an aqueous solution and has been widely used in a hydrogen sulfide sensor, (2) has been used for fluorescence imaging of biomolecules modified to alkyne in living mammalian cells by emitting strong green fluorescence, and (3) upon UV irradiation, AzNPs show good photo-crosslinking ability to be converted into aryl nitrene species capable of covalently bonding to proteins. However, the visible light-induced photo-crosslinking activity of AzNP in living cells has not been confirmed so far.

The inventors of the present invention have made extensive efforts to develop a method for improving the conventional technique of diffusive labeling and accurately identifying an interactome physically interacting with a target protein in a living cell as a method for identifying an interactome physically interacting with the target protein in a cell, and as a result, the inventors of the present invention newly synthesized compounds that can be photo-crosslinked to the proximal protein by visible light, and the present invention was completed by confirming that when the compounds are used, the accuracy of the protein-protein interaction analysis method can be increased by photo-crosslinking to the proximal protein without toxicity to living cells by irradiation with visible light, thereby improving the diffusion labeling characteristic, which is a limitation of the conventional proximity labeling technology.

DISCLOSURE

Technical Problem

An object of the present invention is to provide novel compounds that can be crosslinked by visible light and uses thereof.

Technical Solution

In order to achieve the above object, the present invention provides a compound represented by [Chemical Formula 1] below:

[Chemical Formula 1]

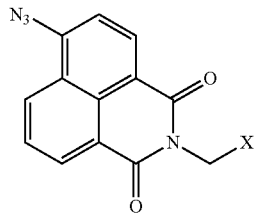

wherein in [Chemical Formula 1] above,

X is C, N, O, S, Si or represented by [Chemical Formula 2] below,

[Chemical Formula 2]

wherein in [Chemical Formula 2] above,
n is an integer of 0 to 10,
X is straight-chain or branched —$(CH_2)m$-, H or halogen, and m is an integer of 1 to 20, and
R is H, halogen or —$CH_3$.

In the present invention, the compound may be a compound represented by [Chemical Formula 3] below:

[Chemical Formula 3]

wherein in [Chemical Formula 3] above, n is an integer of 1 to 5.

In the present invention, the compound may have protein-binding ability.

In the present invention, the compound bound to a target protein or target nucleic acid may be photo-crosslinked to a protein or peptide that interacts with the target protein or target nucleic acid.

In the present invention, the target protein may be an antibody or peptide.

In the present invention, the target nucleic acid may be DNA or RNA.

In the present invention, the compound may be photo-crosslinked to a protein or peptide that interacts with the target protein or target nucleic acid by irradiation with visible light.

In the present invention, the radius of the photo-crosslinking may be 0.01 to 1 nm.

In addition, the present invention provides a method for photo-crosslinking a target protein or target nucleic acid with an interacting protein or peptide in proximity, including the steps of:
(a) treating the compound bound to a target protein or target nucleic acid in a sample including a protein or peptide interacting with the target protein or target nucleic acid; and
(b) processing visible light.

In the present invention, the target protein or target nucleic acid may be conjugated to the compound through (i) an internally existing amine group or an externally introduced amine group, or (ii) an internally existing thiol group or an externally introduced thiol group.

In the present invention, the target protein or target nucleic acid may be conjugated with a protein tag In addition, the present invention provides a method for identifying an interacting protein of a target protein, including the steps of:

(a) expressing a target protein in a cell;
(b) treating the cell with the compound;
(c) irradiating visible light to the cell; and
(d) lysing the cell to identify the protein that is photo-crosslinked with the compound as an interacting protein of the target protein.

In the present invention, the target protein may be conjugated with an epitope peptide tag.

In the present invention, in step (d), the target protein may be precipitated with an epitope peptide-specific antibody to identify the protein that is photo-crosslinked with the compound as an interacting protein of the target protein.

In the present invention, step (d) may be identified by mass spectrometry.

Advantageous Effects

The novel compounds according to the present invention can be photo-crosslinked with a protein or peptide that physically interacts with a target protein or target nucleic acid by the property of being photo-crosslinked to the proximal protein or peptide by irradiation with visible light by binding to the target protein or target nucleic acid, and thus, there are advantages in that it is possible to overcome diffusive labeling, which is a limitation of the conventional proximity labeling technique, by photo-crosslinking by visible light irradiation, which is a safe method for a living body, and to improve the accuracy of protein interactome identification.

DESCRIPTION OF DRAWINGS

FIG. 2F is a mimetic diagram showing VL1-mediated FKBP-FRB photo-crosslinking according to rapamycin treatment under blue LED light illumination.

FIG. 2G shows the Western blot results showing whether KBP-FRB mediated by VL1, VL2 and UL2 is photo-crosslinked according to rapamycin treatment under blue LED light illumination. The photo-crosslinked products of FKBP25-V5-HaloTag and EGFP-FRB are indicated by red asterisks, and non-photo-crosslinked FKBP25-V5-HaloTag and EGFP-FRB are indicated by blue asterisks.

MODES OF THE INVENTION

Figure 1:
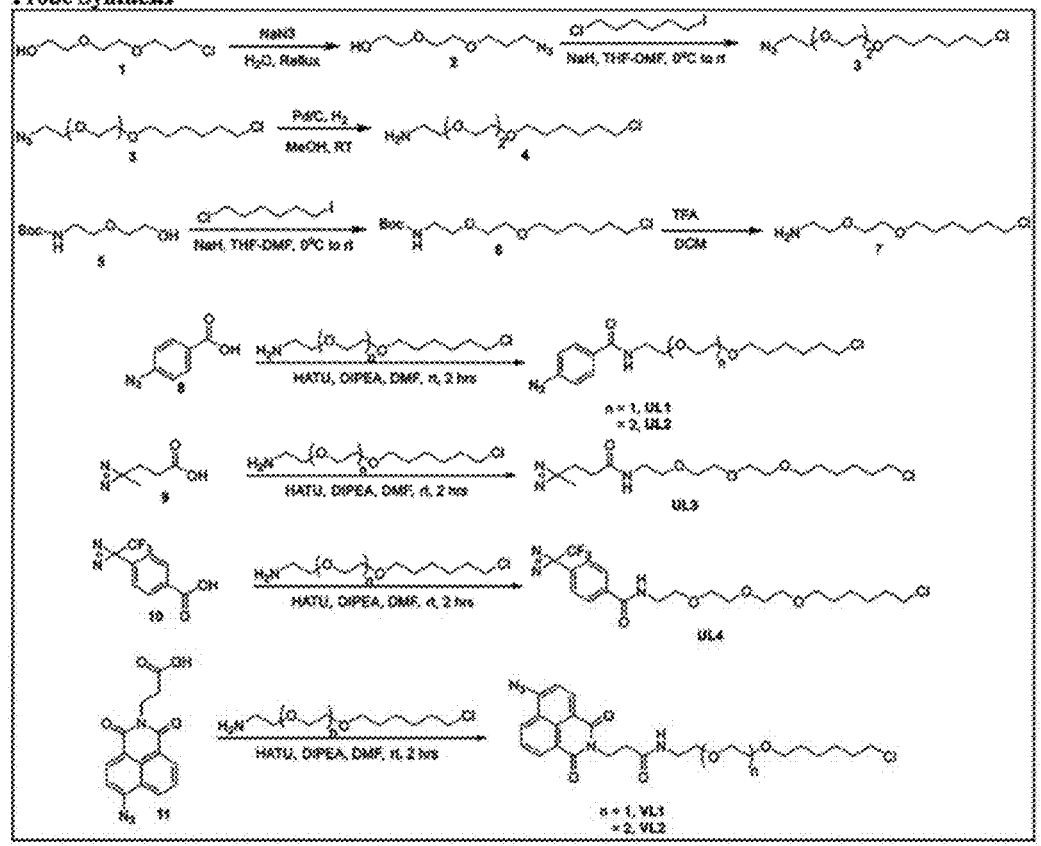
FIG. 1 shows the synthesis processes of two AzNP-conjugated HaloTag ligands (VL1 and VL2) and four control ligands (UL1-UL4) according to the present invention.

Hereinafter, exemplary embodiments will be provided to describe the present specification in detail. However, the exemplary embodiments according to the present specification may be modified in various other forms, and the scope of the present specification is not to be construed as being limited to the exemplary embodiments described below. The exemplary embodiments of the present specification are provided to more completely explain the present specification to those of ordinary skill in the art.

In the present invention, novel compounds that can specifically bind to an amine group or a thiol group and be photo-crosslinked with a proximal protein by blue light were synthesized.

Accordingly, the present invention relates to a compound represented by [Chemical Formula 1] below in one aspect:

[Chemical Formula 1]

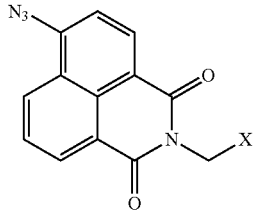

wherein in [Chemical Formula 1] above,
X is C, N, O, S, Si or represented by [Chemical Formula 2] below,

[Chemical Formula 2]

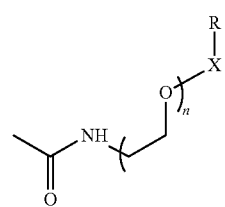

wherein in [Chemical Formula 2] above,
n is an integer of 0 to 10,
X is straight-chain or branched —$(CH_2)m$-, H or halogen, and m is an integer of 1 to 20, and
R is H, halogen or —$CH_3$.

In the present invention, the compound may be represented by Chemical Formula 1' below.

[Chemical Formula 1']

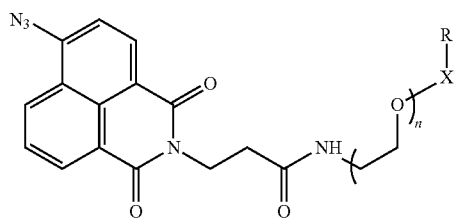

wherein in [Chemical Formula 1'] above,
n is an integer of 0 to 10,
X is straight-chain or branched —$(CH_2)m$-, H or halogen, and m is an integer of 1 to 20, and
R is H, halogen or —$CH_3$.

In [Chemical Formula 1'] according to the present invention, preferably, n may be a natural number of 2 to 5, and more preferably, n may be 2 or 3.

In the present invention, preferably, X may be straight-chain or branched —$(CH_2)m$, and m may be an integer of 1 to 10. More preferably, X may be straight-chain —$(CH_2)m$-, and m may be an integer of 5 to 10.

In the present invention, preferably, R may be halogen, and more preferably, chlorine (Cl).

In the present invention, the compound may be characterized as a compound represented by [Chemical Formula 3] below, but is not limited thereto:

[Chemical Formula 3]

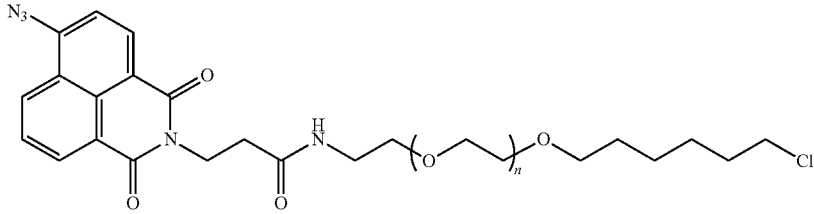

wherein in [Chemical Formula 3] above, n is an integer of 1 to 5.

In [Chemical Formula 3] according to the present invention, preferably, n may be 1 or 2. When n is 1, it may mean ligand VL1, and when n is 2, it may mean ligand VL2.

In the present invention, the compound may be characterized in that it is bound to a target substance to identify a proximal molecule (e.g., an interacting drug, an interacting protein and an interacting peptide present in close proximity) that interacts with the target substance (e.g., a target nucleic acid or a target protein).

In the present invention, the target nucleic acid may be DNA or RNA, but is not limited thereto, and the target protein may be an antibody or peptide, but is not limited thereto.

In one aspect, the compound may be characterized in that it is directly bound to a target substance, but is not limited thereto.

The compound may be an AzNP having an NHS ester group capable of reacting with an amine group of the target substance, by introducing an amine group present in the target protein or an amine group from the outside when synthesizing the target nucleic acid.

In addition, the compound may be an AzNP having a maleimide group capable of reacting with the target substance, by introducing a cysteine group present in the target protein or a thiol group from the outside when synthesizing the target nucleic acid.

In another aspect, the compound may be characterized in that it is bound through a protein tag, but is not limited thereto. That is, in some aspects, the compound may be characterized in that it specifically binds to a protein tag, and the protein tag may be Halotag, SNAP-tag or CLIP-tag, but is not limited thereto.

In the present invention, when the ligand is VL1 or VL2, the protein tag may be preferably Halotag. The ligand VL1 has a shorter length than VL2 and may bind to the protein tag faster than VL2.

In the present invention, the compound may be characterized in that it is photo-crosslinked to a proximal molecule that interacts with the target substance.

That is, the compound bound to the target protein or target nucleic acid may be characterized by photo-crosslinking to a protein or peptide that interacts with the target protein or target nucleic acid.

In the present invention, the target protein may be characterized as an antibody or peptide, but is not limited thereto.

In the present invention, the target nucleic acid may be characterized as DNA or RNA, but is not limited thereto.

In the present invention, the compound may be characterized by photo-crosslinking to a protein or peptide that interacts with the target protein or target nucleic acid by irradiation with visible light.

In one aspect, when the target substance is treated with living cells or protein mixture and treated with visible light, photo-crosslinking may be induced with a protein or peptide that interacts with the target substance in the cells or protein mixture.

In one aspect, the compound may be characterized in that it photo-crosslinks to a protein that interacts with a target protein fused to the protein tag.

In the present invention, the visible light may be used without limitation as long as it is in the range of electromagnetic waves visible to the human eye, but preferably, it may be light at 400 to 700 nm, and more preferably, blue light at 450 to 500 nm.

In the present invention, the radius of the photo-crosslinking may be characterized to be 0.01 to 1 nm, but is not limited thereto.

In an aspect of the present invention, the length of the PEG linker of [Chemical Formula 3] above may determine the direction of active species on the surface of a protein tag (e.g., HaloTag), thereby affecting crosslinking efficiency for a specific interaction partner. Therefore, this feature of the present invention, which has a position-dependent crosslinking efficiency due to the inherently short labeling radius, may be a limiting factor in covering all of the complete physical interactions of the target protein, but from another point of view, due to this structural feature of the present invention, the present invention has the advantage of being able to identify only the protein interacting with the target protein by crosslinking.

In another aspect, the present invention relates to a method for photo-crosslinking a target protein or target nucleic acid with an interacting protein or peptide in proximity, including the steps of:
  (a) treating the compound bound to a target protein or target nucleic acid in a sample including a protein or peptide interacting with the target protein or target nucleic acid; and
  (b) processing visible light.

In the present invention, the target protein or target nucleic acid may be characterized in that it is conjugated to the compound through (i) an internally existing amine group or an externally introduced amine group, or (ii) an internally existing thiol group or an externally introduced thiol group.

In the present invention, in another aspect, the target protein or target nucleic acid may be characterized in that it is conjugated with a protein tag, but is not limited thereto.

In another aspect, the present invention relates to a method for identifying an interacting protein of a target protein, including the steps of:
  (a) expressing a target protein in a cell;
  (b) treating the cell with the compound;
  (c) irradiating visible light to the cell; and
  (d) lysing the cell to identify the protein that is photo-crosslinked with the compound as an interacting protein of the target protein.

In the present invention, the target protein may be characterized in that it is conjugated with an epitope peptide tag. By tagging the target protein with an epitope peptide, the target protein may be immunoprecipitated.

In one aspect, the target protein may be selected from the group consisting of a Flag tag, a Myc tag, an HA tag, an Avi tag and a V5 tag, but is not limited thereto.

In the present invention, the target protein may be isolated by immunoprecipitation with magnetic or agarose beads loaded with an antibody capable of binding to an epitope peptide tag, but is not limited thereto.

In another aspect, the target protein is characterized in that it binds streptavidin, avidin or biotin and is isolated by sedimentation with magnetic or agarose beads loaded with an analog of streptavidin or an analog of avidin reversibly binding to biotin, but is not limited thereto.

Meanwhile, in the present invention, the direct interacting partner of a target protein may be selectively and accurately identified in a living cell as compared to a conventional proximity labeling method, and through this, it is possible to confirm a molecular network of the target protein in a living cell.

TurboID has been utilized for interactome mapping in various experiments, but due to the rather diffuse labeling properties of biotin-AMP, recent proximity labeling methods (e.g., BioID, TurboID and APEX) have additionally required "a filtration approach" that compares data to the biotinylated proteins of cytoplasmic TurboID (e.g. TurboID-NES). However, these filtered data still cannot selectively reflect only direct binding partners, but rather only provide an ambiguous "contour" of the proximal protein compared to the cytoplasmic background, and there was a limitation in that it was not possible to decipher whether the protein selected from this data was a true interacting partner of the target protein.

In order to overcome this problem, considering that the photo-crosslinking (Spotlight) reaction according to the present invention may be orthogonal to the amide coupling-based biotinylation reaction of TurboID, in the present invention, TurboID was applied to the same target protein in addition to the photo-crosslinking reaction according to the present invention, and as a result, it was confirmed that the physical interacting protein of the target protein may be biotinylated together with photo-crosslinking by the compound of the present invention.

Accordingly, in another aspect, the present invention relates to a method for identifying an interacting protein of a target protein, including the steps of:

(a) expressing a target protein in a cell;
(b) treating the cell with the compound;
(c) irradiating visible light to the cell; and
(d) lysing the cell to identify the protein that is photo-crosslinked with the compound as an interacting protein of the target protein.

In the present invention, the target protein in step (a) may be further fused with biotin ligase.

In one aspect, the protein tag may be fused to a target protein by a linker.

In the present invention, the linker may be an amide linker, but is not limited thereto.

Meanwhile, as a result of an experiment using HaloTag-G3BP1 to determine if the generation efficiency of the crosslinked product is affected by the linker in the present invention, it was confirmed that the HaloTag position at the N-terminus of G3BP1 may have some flexibility to access the surface of the $^{SARS-CoV-2}$N protein, and thus is not substantially affected by the length of the peptide linker between the HaloTag and G3BP1.

Accordingly, a linker known in the art, which is commonly used for linkage between proteins/proteins, proteins/peptides or peptides/peptides, may be used without limitation to bind HaloTag and a target protein in the present invention.

In the present invention, the compound may be characterized in that it specifically binds to a protein tag, and the protein tag may be Halotag, SNAP-tag or CLIP-tag, but is not limited thereto. In the present invention, the protein tag may be preferably Halotag.

In the present invention, the biotin ligase may be characterized as BirA, BioID or TurboID, but is not limited thereto. In the present invention, the biotin ligase may preferably be TurboID.

In the present invention, the step (d) may be characterized in that it further includes a step of isolating the target protein and the photo-crosslinked protein from the lysed cells, and the step of isolating the photo-crosslinked protein may be characterized by fusing an epitope peptide tag (e.g., a Flag tag, a Myc tag, an HA tag, an Avi tag, a V5 tag, etc.) to the target protein so as to immuneprecipitate the target protein, and isolating the target protein by using magnetic or agarose beads loaded with an antibody specifically binding to the epitope peptide tag, but the present invention is not limited thereto.

In another aspect, the step of isolating the photo-crosslinked protein may be characterized in that streptavidin, avidin or biotin is added to the target protein, and the photo-crosslinked protein is isolated using magnetic or agarose beads loaded with an analog of streptavidin reversibly binding to the streptavidin, avidin or biotin or an analog of avidin reversibly binding to biotin, but the present invention is not limited thereto.

In the present invention, step (d) may be characterized in that it further includes a step of digesting the isolated protein with a hydrolase, but is not limited thereto.

In the present invention, the hydrolase may be characterized in that it is selected from the group consisting of trypsin, arginine C (Arg-C), aspartic acid N (Asp-N), glutamic acid C (Glu-C), lysine C (Lys-C), chymotrypsin, proteinase K and pronase, but is not limited thereto.

In the present invention, step (d) may be characterized in that the interacting protein is identified by mass spectrometry, but is not limited thereto.

In the present invention, the mass spectrometer for mass spectrometry may be characterized in that it is selected from the group consisting of LTQ-FT, Orbitrap, Triple-Tof, Q-Tof, Tof-Tof and Q Exactive, but is not limited thereto.

In the present invention, in step (d), the protein that is biotinylated by a control fusion protein to which biotin ligase and a protein tag are fused in the cell may characterized in that it is excluded from the interacting protein of the target protein, but is not limited thereto.

In the present invention, in an exemplary embodiment related to the above aspect, in order to confirm whether each step of the experiment (e.g., photo-crosslinking and streptavidin concentration) operates as expected, mass analysis was performed on 8 samples of $^{SARS-CoV-2}$N-HaloTag-AP and HaloTag-AP under four control conditions (+/−VL1, +/−BirA), but in order to identify the interacting protein of the target protein, it may be sufficient to compare the streptavidin-concentrated sample of the VL1-crosslinked POI-HaloTag (POI-HaloTag-AP/+VL1/+BirA) with the VL1-crosslinked free HaloTag (HaloTag-AP/+VL1/+BirA), and in this case, the free HaloTag-crosslinked protein may provide background protein information for other experiments for identifying various types of interacting proteins of the target protein by applying the present invention.

Further, in the present invention, it was confirmed that the location of the target protein in living cells may be identified based on the characteristic that the compound can penetrate various intracellular organelles and exhibit green fluorescence, and it is possible to verify whether the target protein interacts with an interacting protein candidate group based on imaging.

Accordingly, in another aspect, the present invention relates to a method for identifying an interacting protein of a target protein, including the steps of:
(a) expressing a target protein to which a protein tag is fused in a cell;
(b) treating the cell with the compound;
(c) irradiating visible light to the cell; and
(d) identifying the intracellular location of the target protein by green fluorescence.

According to the present invention, after step (a) in the above method, the intracellular movement of the target protein may be easily observed under a stress situation by inducing stress (change in acidity, change in temperature, etc.).

In another aspect, the present invention relates to a method for verifying interaction with a target protein and an interactome thereof, including the steps of:
(a) expressing a target protein to which a protein tag is fused and an interactome thereof in a cell;
(b) treating the cell with the compound;
(c) irradiating visible light to the cell; and
(d) confirming whether the target protein and the interactome are co-localized in the cell.

In the present invention, the intracellular location of the target protein may be identified by green fluorescence, and the interactome may be identified by a fluorescence different from the green fluorescence, and by observing the co-localization of the two types of fluorescence, it will be possible to determine whether there is an interaction between the protein and the interactome thereof.

In the present invention, fluorescence for identifying the interactome may be identified by labeling the interactome-specific antibody with fluorescence or engineering the interactome to be expressed together with fluorescence in a cell.

According to the present invention, after step (a) in the above method, it is possible to easily determine how the target protein and the interactome thereof interact in the before and after stress situations by inducing stress (change in acidity, change in temperature, etc.).

In some aspects of the present invention, the protein may be proteins or virus proteins distributed in various organelles, including Lamin-AC (inner nuclear membrane), p80-coilin (Cajal body), HNRNPD (SAM68 body), MRPL12 (mitochondrial matrix), Tom20 (outer mitochondrial membrane), SEC61B (ER membrane) and G3BP1 (stress granule). For example, the protein may be a nucleocapsid (N) protein.

According to an exemplary embodiment of the present invention, the virus may be a mammalian infection virus, and preferably, SARS-CoV-2 virus. The mammal may be a mouse, hamster, dog, cat, pig, goat or primate, including humans.

It can be seen that the compound of the present invention is activated by irradiation with visible light to effectively have photo-crosslinking ability, and in particular, it is remarkable that in the present invention, the effect was confirmed by using a blue LED home lamp (about 36 W) in all photo-crosslinking experiments using living cells as well as in an in-test tube experiment using VL1. That is, the compound of the present invention may be effectively photo-crosslinked in low-intensity visible light illumination, suggesting that the present invention may be utilized in the in vivo experiments using living animals as well as the in vitro experiments using living cells.

Meanwhile, in a living cell experiment, photo-crosslinked products of the HaloTag protein were produced within 1 minute under blue LED illumination, which was confirmed at a much faster rate than non-targeted in vitro photo-crosslinking with bovine serum albumin, which is interpreted to be due to a macromolecule-dense environment of living cells.

The above-described results support that the spatiotemporal proximity photo-crosslinking by visible light activation (spotlight) may accurately capture transient interacting partners effectively under physiological conditions.

Hereinafter, the present invention will be described in more detail through examples. These examples are only for illustrating the present invention, and it is apparent to those of ordinary skill in the art that the scope of the present invention is not to be interpreted as being limited by these examples.

Example 1. Synthesis of HaloTag-Specific AzNP Ligands

AzNP-conjugated HaloTag ligands (VL1 and VL2) were synthesized with two linker sizes. VL1 showed a fairly strong absorbance in the visible region; $M_{max}$=375 nm, extinction coefficient value=2,230 $M^{-1}$ $cm^{-1}$. For control experiments, other photo-crosslinkable HaloTag ligands including ultraviolet light-absorbing para-azidophenyl and diazirine moieties were also prepared (UL1-UL4). The reaction schematic is as shown in FIG. 1.

Synthesis of (1-(2-(2-(2-azidoethoxy)ethoxy)ethoxy)-6-chlorohexane)

NaH (6 mg, 0.15 mmol) was added to a solution of 2-(2-(2-azidoethoxy)ethoxy)ethanol (17.5 mg, compound 2, 0.1 mmol) in DMF at 0° C. After stirring at 0° C. for 30 minutes, 1-chloro-6-iodohexane (18.6 μL, 0.12 mmol) was added. The mixture was stirred for 1 hour, warmed to room temperature and stirred for 2 hours. Ammonium chloride was added to the reaction mixture at 0° C., and after it was extracted with diethyl ether (10 mL×3), it was washed with saturated brine (10 mL), dried over anhydrous $Na_2SO_4$, filtered and concentrated in vacuum. The crude material was purified by flash chromatography on silica gel to obtain (1-(2-(2-(2-azidoethoxy)ethoxy)ethoxy)-6-chlorohexane) (12 mg, compound 3, yield: 40%).

$^1$H NMR (400 MHz, Chloroform d) δ(m, 6H), 3.60-3.57 (m, 2H), 3.53 (t, J=6.7 Hz, 2H), 3.46 (t, J=6.6 Hz, 2H), 3.39 (t, J=5.1 Hz, 2H), 1.82-1.73 (m, 2H), 1.60 (p, J=6.8 Hz, 2H), 1.52-1.31 (m, 6H). $^{13}$C NMR (100 MHz, Chloroform-d) 670.74, 70.72, 70.66, 70.11, 70.04, 50.70, 45.07, 32.56, 29.46, 26.71, 25.43. APCI-MS: m/z calcd. for 293.15, measured for 265.88 $[M+H-N_2]^+$.

Synthesis of (2-(2-(2-((6-chlorohexyl)oxy)ethoxy)ethoxy)ethan-1-amine)

After performing 2 cycles of vacuum/$H_2$ to replace the air inside the reaction tube with hydrogen, the mixture of compound 3 (35 mg, 0.12 mmol), 10% Pd/C (3.5 mg 10 wt.

% of compound 3) and 2 to 3 drops of 1N HCl in MeOH (0.6 mL) was stirred under a balloon of hydrogen for 2 hours at room temperature. The reaction mixture was filtered using a Celite filter to obtain (2-(2-(2-((6-chlorohexyl)oxy)ethoxy)ethoxy)ethan-1-amine (compound 4) as a quantitative yield.

$^1$H NMR (400 MHz, DMSO-d6) δ-8.02 (m, 3H), 3.59 (dq, J=6.7, 3.6, 3.1 Hz, 4H), 3.55-3.41 (m, 8H), 3.35 (d, J=2.9 Hz, 2H), 2.90 (t, J=5.3 Hz, 2H), 1.73-1.63 (m, 2H), 1.46 (dd, J=9.9, 4.7 Hz, 2H), 1.40-1.24 (m, 4H). $^{13}$C NMR (100 MHz, DMSO-d6) δ70.31-69.74 (m), 67.01, 45.82, 38.82, 32.45, 29.47, 26.54, 25.35. APCI-MS: m/z calcd for 267.16, measured for 267.95 [M+H]$^+$.

UL1 Synthesis

In order to synthesize an aryl-azide-PEG2 HaloTag ligand (UL1), 4-azidobezoic acid (compound 8, 83 mg, 0.50 mmol) was placed in a 10 mL round bottom flask with HATU (214 mg, 0.56 mmol) and DIPEA (131.3 mg, 1.02 mmol) and dissolved in 2 mL of DCM. The reaction mixture was stirred at room temperature for 30 minutes or until the color turned brown, and subsequently, 2-(2-((6-chlorohexyl)oxy)ethoxy) ethanamine (138 mg, 0.61 mmol) dissolved in 1 mL of DCM was added dropwise to the reaction mixture, and then the reaction was stirred at room temperature for additional 3 hours. After completion of the reaction, the solvent was removed under reduced pressure to obtain a colorless oil, which was purified by silica gel column chromatography (eluent: 40% EtOAc in hexane) to obtain pure UL1 (168 mg, 90%) as a colorless oil.

$^1$H NMR (400 MHz, CDCl$_3$) δ(d, J=8.7 Hz, 2H), 7.06 (d, J=8.7 Hz, 2H), 6.67 (br s, 1H), 3.70-3.63 (m, 6H), 3.62-3.57 (m, 2H), 3.52 (t, J=6.7 Hz, 2H), 3.46 (t, J=6.7 Hz, 2H), 1.78-1.70 (m, 2H), 1.61-1.54 (m, 2H), 1.46-1.32 (m, 4H). $^{13}$C NMR (100 MHz, CDCl3) δ143.35, 131.19, 128.93, 119.04, 77.16, 71.39, 70.35, 70.12, 69.81, 45.12, 39.84, 38.73, 32.59, 29.55, 26.78, 25.50, HR-ESI-MS: m/z calcd. for 368.1615, measured for 368.1614.

UL2 Synthesis

In order to synthesize an aryl-azide-PEG3 HaloTag ligand (UL2), 4-azidobezoic acid (compound 8, 45 mg, 0.28 mmol) was placed in a 10 mL round bottom flask with HATU (105 mg, 0.28 mmol) and DIPEA (64 mg, 0.58 mmol) and dissolved in 2 ml of DCM. The reaction mixture was stirred at room temperature for 30 minutes or until the color turned brown, and subsequently, 2-(2-(2-((6-chlorohexyl)oxy) ethoxy)ethoxy)ethanamine (68 mg, 0.25 mmol) dissolved in 1 mL of DCM was added dropwise to the reaction mixture, and then the reaction was stirred at room temperature for additional 3 hours. After completion of the reaction, the solvent was removed under reduced pressure to obtain a colorless oil, which was purified by silica gel column chromatography (eluent: 60% EtOAc in hexane) to obtain UL2 (98 mg, 95%) as a colorless oil.

$^1$H NMR (400 MHz, Acetone) δ (d, J=8.8 Hz, 2H), 7.77 (s, 1H), 7.16 (d, J=8.8 Hz, 2H), 3.66-3.54 (m, 12H), 3.54-3.49 (m, 2H), 3.41 (t, J=6.5 Hz, 2H), 1.75 (m, 2H), 1.57-1.49 (m, 2H), 1.47-1.32 (m, 4H). $^{13}$C NMR (101 MHz, Acetone) δ143.74, 132.45, 129.94, 119.66, 71.56, 71.10, 71.09, 70.92, 70.76, 70.54, 45.75, 40.50, 38.72, 33.36, 30.28, 27.36, 26.15, HR-ESI-MS: m/z calcd. for 412.1877, measured for 412.1877

UL3 Synthesis

In order to synthesize N-(2-(2-(2-((6-chlorohexyl)oxy) ethoxy)ethoxy)ethyl)-3-(3-methyl-3H-diazirin-3-yl)propenamide (UL3), 3-(3-methyl-3H-diazirin-3-yl)propanoic acid (compound 9, 13.4 mg, 0.05 mmol), EDC-HCl (10.5 mg, 0.055 mmol), TEA (7 μL, 0.05 mmol) and DMAP (6.1 mg, 0.05 mmol) in dried THF (0.3 mL) were mixed in a solution of 2-(2-(2-((6-chlorohexyl)oxy)ethoxy)ethoxy)ethan-1-aminium chloride (1c, 15.2 mg, 0.05 mmol) in THF (0.2 mL). The mixture was stirred for 2 hours and concentrated in vacuum. The crude material was purified by flash chromatography to obtain UL3 (7 mg, yield: 37%).

$^1$H NMR (600 MHz, Chloroform-d) δ(s, 1H), 3.64-3.51 (m, 12H), 3.48-3.42 (m, 4H), 2.02-1.98 (m, 2H), 1.79-1.72 (m, 4H), 1.60 (p, J=6.9 Hz, 2H), 1.45 (dt, J=14.8, 6.8 Hz, 2H), 1.37 (q, J=8.0 Hz, 2H), 1.02 (s, 3H). $^{13}$C NMR (150 MHz, Chloroform-d) 671.26, 70.50, 70.47, 70.20, 70.05, 69.82, 45.01, 39.27, 32.50, 30.57, 30.06, 29.38, 26.65, 25.46, 25.37, 19.86. HRMS-DART: m/z calcd for 377.2081, measured for 378.2154 [M+H]$^+$.

UL4 Synthesis

In order to synthesize N-(2-(2-(2-((6-chlorohexyl)oxy) ethoxy)ethoxy)ethyl)-4-(3-(trifluoromethyl)-3H-diazirin-3-yl)benzamide (UL4), 4-(3-(trifluoromethyl)-3H-diazirin-3-yl)benzoic acid (compound 10, 11.5 mg, 0.05 mmol), EDC-HCl (10.5 mg, 0.055 mmol), TEA (7 μL, 0.05 mmol) and a solution of DMAP (6.1 mg, 0.05 mmol) in crude THF (0.3 mL) were added to a solution of 2-(2-(2-((6-chlorohexyl) oxy)ethoxy)ethoxy)ethan-1-aminium chloride (15.2 mg, 0.05 mmol) in THF (0.2 mL). The mixture was stirred for 2 hours and concentrated in vacuum. The crude material was purified by flash chromatography to obtain UL4 (14 mg, yield: 60%).

$^1$H NMR (600 MHz, Chloroform-d) δ–7.82 (m, 2H), 7.23 (d, J=8.2 Hz, 2H), 7.09 (d, J=5.4 Hz, 1H), 3.68-3.61 (m, 10H), 3.54 (dd, J=5.8, 3.7 Hz, 2H), 3.51 (t, J=6.7 Hz, 2H), 3.40 (t, J=6.7 Hz, 2H), 1.78-1.71 (m, 2H), 1.54 (dt, J=14.7, 6.9 Hz, 2H), 1.45-1.38 (m, 2H), 1.32 (p, J=7.6, 7.1 Hz, 2H). $^{13}$C NMR (100 MHz, Chloroform-d) δ135.70, 132.10, 127.62, 126.46, 126.45, 121.93 (d, J=274.8 Hz), 71.27, 70.54, 70.52, 70.25, 70.05, 69.76, 45.00, 39.91, 32.50, 29.35, 28.36 (d, J=40.5 Hz), 26.64, 25.36. HRMS-DART: m/z calcd for 479.1799, measured for 480.1871 [M+H]$^+$.

VL1 Synthesis 3-(6-azido-1,3-dioxo-1H-benzo[de]isoquinolin-2(3H)-yl) propanoic acid (compound 11, 180 mg, 0.582 mmol) was placed in 1 mL of DMF in a 10 mL round bottom flask with HATU (254 mg, 0.67 mmol) and DIPEA (240 μL, 1.3 mmol), and the reaction mixture was stirred at room temperature for 30 minutes until it became a yellow precipitate. Next, NH$_2$-PEG2-HTL (compound 7) was added with 1 mL of DMF, and the reaction mixture briefly turned to a homogeneous liquid and then precipitated again, and after maintaining stirring for an additional 1 hour, a workup was performed using EtOAc and water. and the organic layer was dried over Na$_2$SO$_4$ and purified using a silica gel column (1% MeOH in CHCl$_3$) to obtain 180 mg of a yellow powder (60%).

$^1$H NMR (400 MHz, CDCl$_3$) δ (dd, J=7.3, 1.1 Hz, 1H), 8.59 (d, J=8.0 Hz, 1H), 8.45 (dd, J=8.4, 1.0 Hz, 1H), 7.75 (dd, J=8.4, 7.4 Hz, 1H), 7.48 (d, J=8.0 Hz, 1H), 6.28 (s, 1H), 4.54-4.44 (m, 2H), 3.62-3.38 (m, 11H), 2.71-2.61 (m, 2H), 1.81-1.69 (m, 2H), 1.58 (d, J=7.4 Hz, 2H), 1.48-1.31 (m, 4H). $^{13}$C NMR (100 MHz, CDCl3) δ163.97, 163.53, 143.73, 132.44, 131.95, 129.28, 129.04, 126.99, 124.46, 122.55, 118.81, 114.80, 77.16, 71.37, 70.35, 70.10, 69.90, 45.15, 39.32, 37.02, 34.86, 32.61, 29.55, 26.79, 25.52.

VL2 Synthesis 3-(6-azido-1,3-dioxo-1H-benzo[de]isoquinolin-2(3H)-yl) propanoic acid (compound 11, 116 mg, 0.37 mmol) was placed in 1 mL of DMF in a 10 mL round bottom flask with HATU (160 mg, 0.42 mmol) and DIPEA (255 μL), and the reaction mixture was stirred at room temperature for 30 minutes until it became a yellow precipitate. Next, NH$_2$-

PEG3-HTL (compound 4) was added with 1 mL of DMF, and the reaction mixture briefly turned to a homogeneous liquid and then precipitated again, and after maintaining stirring for an additional 1 hour, a workup was performed with EtOAc and water. and the organic layer was dried over $Na_2SO_4$ and purified using a silica gel column (1% MeOH in $CHCl_3$) to obtain a yellow powder (55%).

$^1$H NMR (400 MHz, $CDCl_3$) δ(dd, J=7.3, 1.0 Hz, 1H), 8.59 (d, J=8.0 Hz, 1H), 8.45 (dd, J=8.4, 1.0 Hz, 1H), 7.75 (dd, J=8.3, 7.4 Hz, 1H), 7.48 (d, J=8.0 Hz, 1H), 6.40 (s, 1H), 4.53-4.46 (m, 2H), 3.65-3.53 (m, 9H), 3.50 (t, J=6.7 Hz, 2H), 3.45 (dt, J=11.0, 6.0 Hz, 4H), 2.70-2.61 (m, 2H), 1.79-1.69 (m, 2H), 1.56 (dd, J=14.5, 7.0 Hz, 2H), 1.37 (ddd, J=23.3, 15.9, 8.7 Hz, 4H). $^{13}$C NMR (101 MHz, $CDCl_3$) δ170.42, 163.96, 163.51, 143.70, 132.42, 131.93, 129.28, 129.01, 126.98, 124.46, 122.58, 118.85, 114.79, 71.36, 70.63 (d, J=4.7 Hz), 70.26 (d, J=15.8 Hz), 69.95, 45.14, 39.38, 37.04, 34.81, 32.63, 29.52, 26.78, 25.51.

By using X-ray protein structural analysis of the co-crystalized holo-protein complex of HaloTag-UL2 and Halotag-VL1, it was confirmed that the para-azidophenyl moiety of UL2 and the AzNP moiety of VL1 were well exposed on the surface of HaloTag (FIG. 2).

Example 2. Plasmid Construction and Cloning

Genes were cloned into designated vectors using restriction enzymes and T4 DNA ligase. In order to add a tag (e.g., V5 epitope or AviTag) or signal sequence to the protein, the tag sequence was included in the primers used to PCR amplify the genes. The PCR product was digested with a restriction enzyme and ligated to a vector digested with a restriction enzyme (e.g., pcDNA3, pCDNA5, pDisplay, pET21a and pH6HTN). For expression in mammalian cells, the CMV promoter was used. [Table 1] below shows the plasmids used in the present invention

TABLE 1

| Name | Features | Promotor/Vector | Details |
| --- | --- | --- | --- |
| Nucleocapsid-Halotag | KpnI-Nucleocapsid-TEV-NheI-V5-Halotag-TEV-AviTag-Stop-NotI | CMV/pCDNA5 | AviTag: GLNDIFEAQKIEWHE<br>V5: GKPIPNPLLGLDST<br>TEV: ENLYFQSENLYFQS |
| N-Halo Tag-TurboID | KpnI-Nucleocapsid-TEV-NheI-HaloTag-BamHI-V5-TurboID-Flag-NotI | CMV/pCDNA5 | Flag: DYKDDDDK |
| Halotag-(33aa)-G3BP1 | KpnI-AviTag-NheI-V5-Halo Tag-BamHI-TEV-Flag-G3BP1-Stop-NotI | CMV/pCDNA5 | AviTag: GLNDIFEAQKIEWHE<br>V5: GKPIPNPLLGLDST<br>TEV: ENLYFQSENLYFQS<br>HA: YPYDVPDYA |
| Halotag-(11 aa)-G3BP1 | HindIII-V5-HaloTag-Flag-ClaI-G3BP1-GSG-His6-Stop | CMV/pCDNA5 | Flag: DYKDDDDK<br>V5: GKPIPNPLLGLDST |
| G3BP1-Halotag | KpnI-G3BP1-BamHI-V5-Halotag-TEV-GSG-His6-Stop | CMV/pCDNA5 | V5: GKPIPNPLLGLDST<br>TEV: ENLYFQSENLYFQS |
| G3BP1-BFP-Halotag | KpnI-G3BP1-BamHI-Linker-EBFP-AgeI-V5-Halotag-TEV-His6-Stop-XhoI | CMV/pCDNA5 | Linker: GAPGSAGSAAGSG<br>V5: GKPIPNPLLGLDST<br>TEV: ENLYFQSENLYFQS |
| FKBP25-V5-Halo Tag-AviTag | KpnI-FKBP25-BamHI-NheI-V5-Halo Tag-Avitag-Stop-NotI | CMV/pCDNA5 | V5: GKPIPNPLLGLDST<br>AviTag: GLNDIFEAQKIEWHE |
| FKBP12-Halotag-TurboID-Flag | SpnI-FKBP12-NheI-HaloTag-BamHI-V5-TurboID-Flag-NotI | CMV/pCDNA5 | V5: GKPIPNPLLGLDST<br>Flag:DYKDDDDKDYKDDDDK |
| EGFP-FRB | AgeI-EGFP-HindIII-EcoRI-FRB-Stop-BamHI | CMV/pEGFP | EGFP: Enhanced green fluorescent protein<br>FRB: FK506 rapamycin binding domain of mTOR |
| V5-LaminA/C-Halotag | KpnI-AviTag-NheI-V5-Halotag--EcoRI-LaminA/C-Stop-NotI | CMV/pCDNA5 | AviTag: GLNDIFEAQKIEWHE<br>V5: GKPIPNPLLGLDST |
| Tom20-V5-Halotag | KpnI-Tom20-Linker-NheI-V5-Halotag-TEV-AviTag-Stop-NotI | CMV/pCDNA5 | Linker: GGSGDPPVAT<br>AviTag: GLNDIFEAQKIEWHE<br>V5: GKPIPNPLLGLDST |
| P80Coilin-V5-Halotag | KpnI-p80Coilin-BamHI-V5-Halotag-TEV-AviTag-Stop-NotI | CMV/pCDNA5 | AviTag: GLNDIFEAQKIEWHE<br>V5: GKPIPNPLLGLDST |
| MRPL12-V5-Halotag | KpnI-MRPL12-NheI-V5-Halotag-Strep2-STOP-NotI | CMV/pCDNA5 | V5: GKPIPNPLLGLDST<br>Strep2: WSHPQFEK |

TABLE 1-continued

| Name | Features | Promotor/Vector | Details |
|---|---|---|---|
| HNRNPD-V5-Halotag | KpnI-HRNPD-NheI-Linker-TEV-V5-AViTag-Halotag-His6-Stop-NotI | CMV/pCDNA5 | Linker: GGSG |
| V5-Halotag-Sec61b | AflII-V5-Halotag-TEV-AviTag-NheI-Sec61Beta-Stop-XhoI | CMV/pCDNA5 | AviTag: GLNDIFEAQKIEWHE<br>V5: GKPIPNPLLGLDST |
| FKBP12-EGFP | NdeI-FKBP12-HindIII-NotI-EGFP-XhoI-His6-Stop | T7/pET21a | His6: Six histidine for Ni-NTA affinity purification<br>EGFP: Enhanced green fluorescent protein |
| FRB-V5-HaloTag | NotI-His6-FRB-V5-SacII-Halo Tag-Stop-NotI | T7/pH6HTN | His6: Six histidine for Ni-NTA affinity purification<br>FRB: FK506 rapamycin binding domain of mTOR<br>V5: GKPIPNPLLGLDST |
| BirA-His6 | XbaI-BirA-HindIII-NotI-His6-Stop | T7/pET28a | His6: Six histidine for Ni-NTA affinity purification |
| Nucleocapsid-GFP | KpnI-Nucleocapsid-BsiWI-Linker-NheI-EGFP-Stop-NotI | CMV/pCDNA5 | EGFP: Enhanced green fluorescent protein<br>Linker: GAPGSAGSAAGSG |
| EGFP | KpnI-EGFP-Stop-NotI | CMV/pCDNA5 | EGFP: Enhanced green fluorescent protein |
| HA-FRB | HindIII-HA-MluI-FRB-Stop | CMV/PRK5 | FRB: FK506 rapamycin binding domain of mTOR<br>HA: YPYDVPDYA |

Example 3. Confirmation of Photo-Crosslinking Activity of HaloTag-Specific AzNP Ligand FKBP25-HaloTag (64 kDa) and EGFP-FRB (48 kDa) were co-expressed in HEK293T cells (ATCC), and the photo-crosslinking activity of the ligand was tested using the rapamycin-inducible FKBP25-FRB protein complex.

HEK293T cells were cultured in DMEM (hyclone, SH30243) supplemented with 10% FBS, 2 mM L-glutamine, 50 units/mL penicillin, and 50 μg/mL streptomycin at 37° C. and 5% $CO_2$ conditions. In a 12-well plate at 60 to 70% confluency, 1,000 ng of plasmid DNA was mixed with 21 μg of polyethyleneimine (PEI, Polysciences, 23966) using 100 μL no-FBS and DMEM and added to each well, and after 2 to 3 hours, the medium was exchanged with a complete medium. After 24 hours following transfection, cells were treated with DMEM supplemented with 10 μM VL1 for 1 hour. Next, the cells were washed 3 times with DPBS and irradiated with blue LED light for 10 minutes. After removing the DPBS, the cells were lysed with RIPA lysis buffer (Elpis biotech, EBA-1149) at 4° C. for 30 minutes according to the manufacturer's instructions. The sample was then placed on a 6% SDS-PAGE gel and run at 150V for 60 minutes. The protein on the gel was transferred to a nitrocellulose membrane at 400 mA for 90 minutes. Protein loading levels were confirmed by Ponce staining. After blocking with TBST containing 2% skim milk for 1 hour, it was exchanged with a primary antibody (mouse anti-V5 antibody, Invitrogen, Cat. No. R960-25, 1:5,000 dilution or mouse anti-GFP antibody, Invitrogen, Cat No. 33-2600, 1:1,000 dilution) diluted in TBST containing 2% skim milk and incubated for 1 hour. After washing 4 times (5 minutes each) with 1×TBST buffer, it was incubated for 30 minutes with a secondary antibody (goat anti-mouse HRP conjugated antibody, BioRad, Cat. No. 1706516, 1:1,000 dilution) diluted in TB ST containing 2% skim milk. After washing 4 times with 1×TBST buffer, it was developed with an ECL kit (Biorad, 1705061), and images were taken with a Gel doc machine (Genesys).

Figures 2A, 2B:
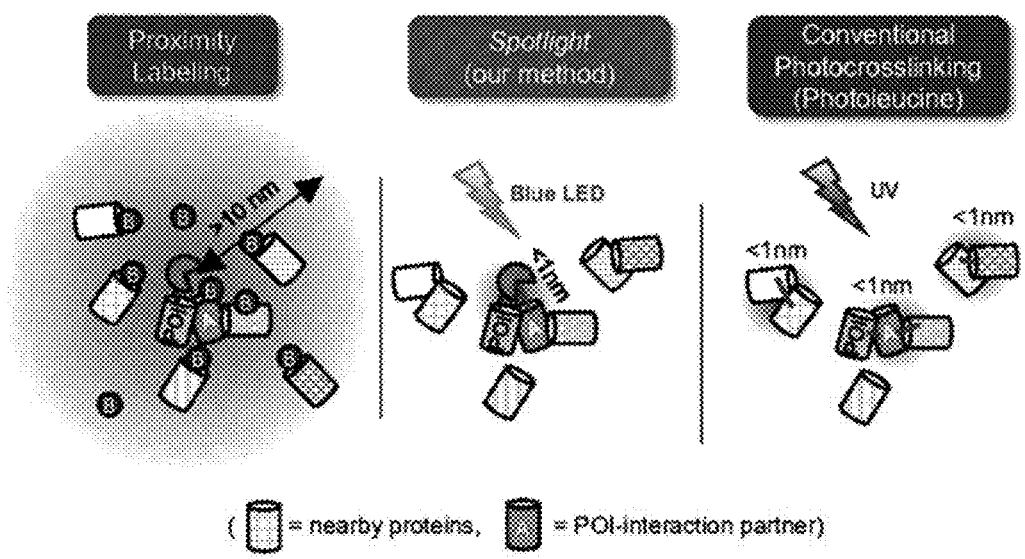
FIG. 2A is mimetic diagrams showing proximity labeling, the proximity labeling according to the present invention and a conventional photo-crosslinking reaction.
FIG. 2B is a table comparing the characteristics of proximity labeling, the proximity labeling according to the present invention and a conventional photo-crosslinking reaction.
Figure 2C:
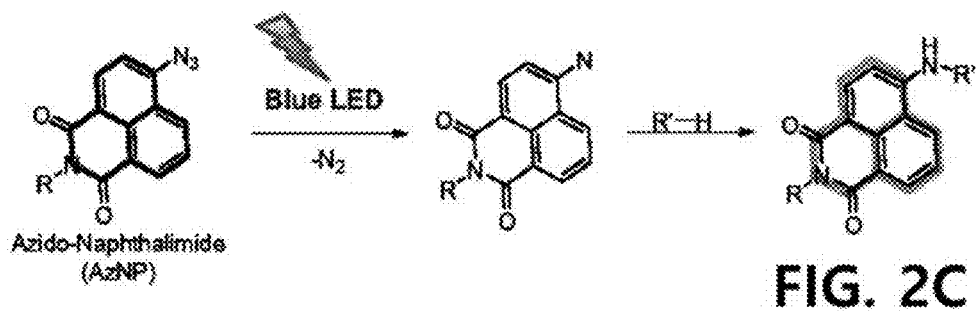
FIG. 2C shows the photo-activation reaction mechanism of the AzNP moiety.
Figure 2D:
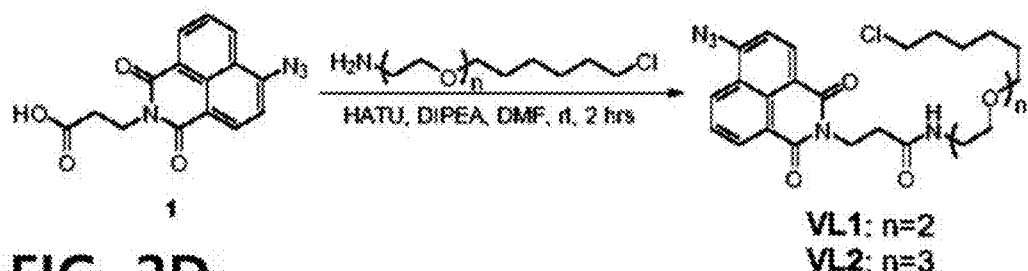
FIG. 2D shows the probe synthesis reaction of the HaloTag-conjugated version of the AzNP moiety.
Figure 2E:
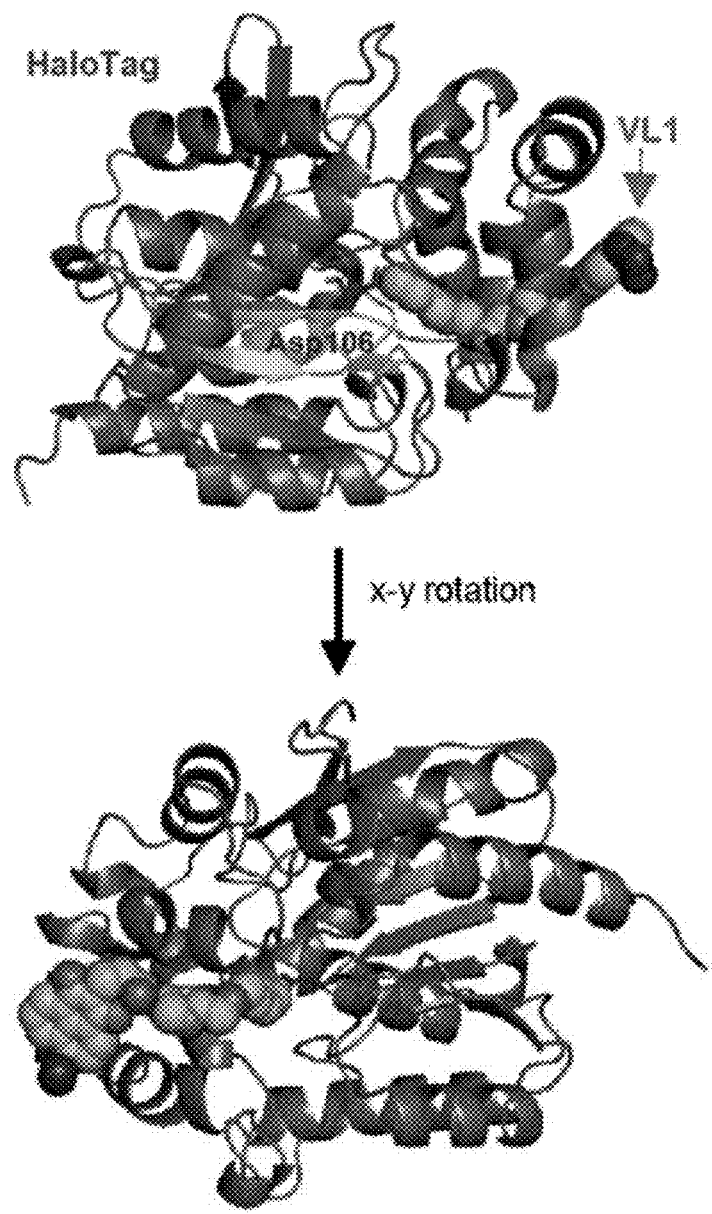
FIG. 2E shows the X-ray structures of co-crystallized HaloTag and VL1.
Figure 3A:
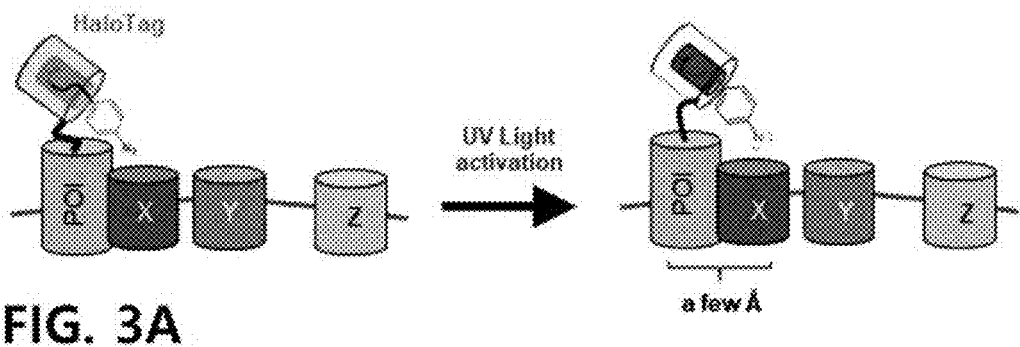
FIG. 3A is mimetic diagrams showing proximity photo-crosslinking using a phenylazide-conjugated HaloTag ligand.
Figure 3B:
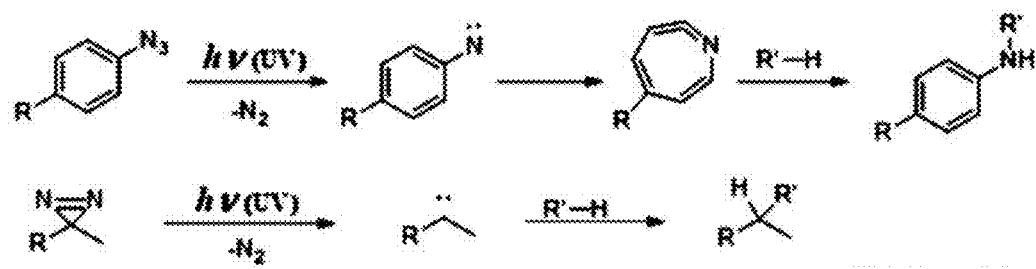
FIG. 3B shows the reaction mechanism of UV-activated photo-crosslinkers (i.e., phenylazide, diazirine).
Figure 3C:
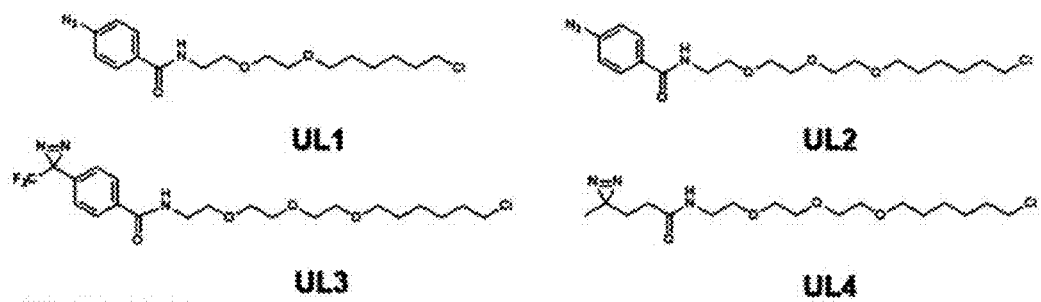
FIG. 3C shows the chemical structures (UL1, UL2, UL3, UL4) of UV-activated para-azidophenyl and diazirine conjugated probes.
Figure 3D:
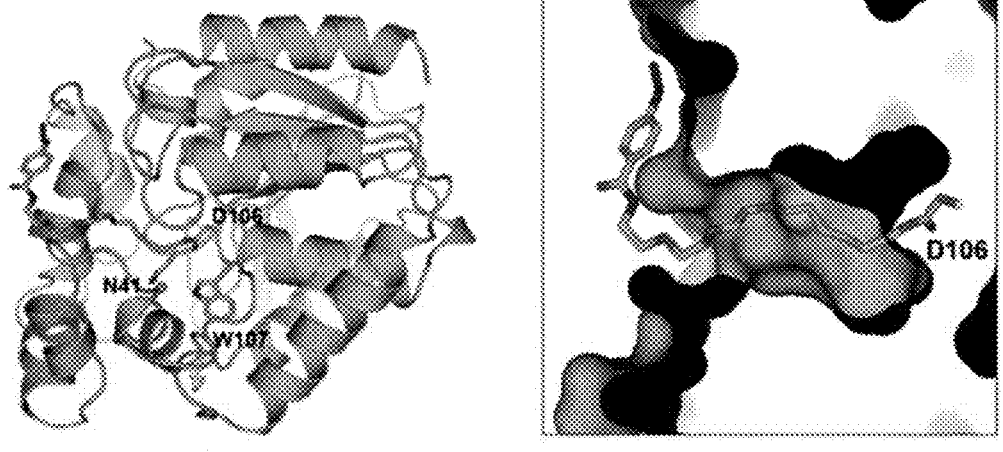
FIG. 3D shows the co-crystal structures of HaloTag and UL2.
Figure 3E:
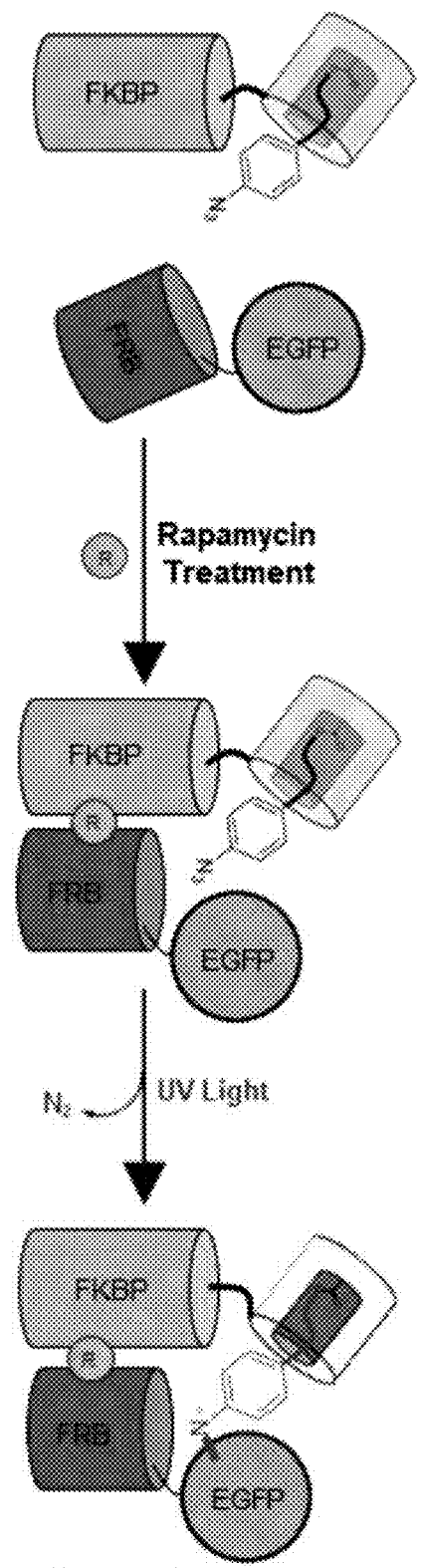
FIG. 3E shows mimetic diagrams of UL probe-mediated FKBP-FRB photo-crosslinking in the presence of rapamycin and UV light.
Figure 3F:
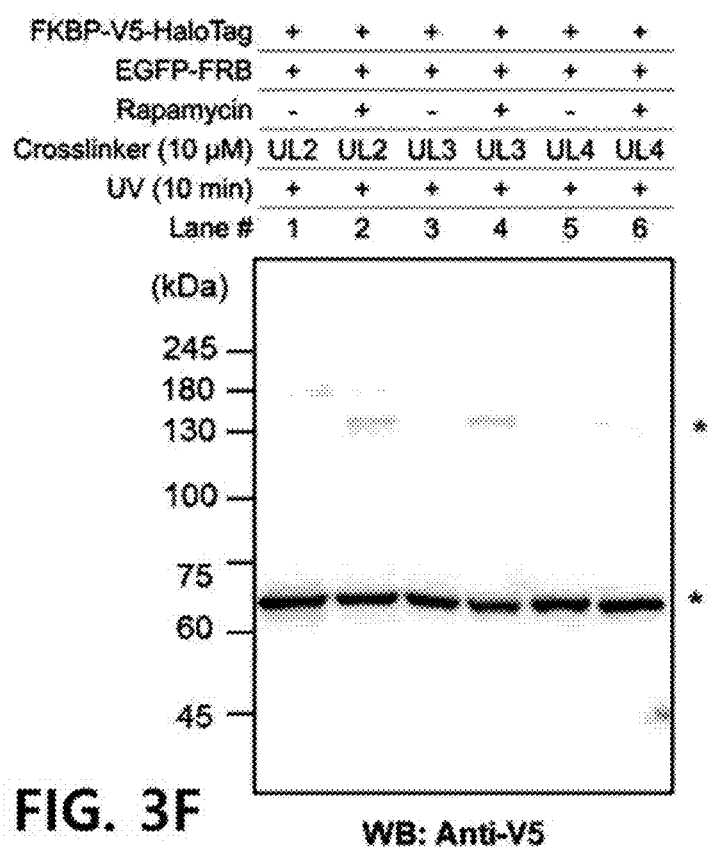
FIG. 3F shows the photo-crosslinking test results of EGFP-FRB and FKBP25-V5-HaloTag using various UV-activated photo-crosslinking probes. EGFP-FRB and FKBP25-V5-HaloTag crosslinked products are indicated by red asterisks, and uncrosslinked FKBP25-V5-HaloTag and EGFP-FRB are indicated by blue asterisks.
Figure 3G:
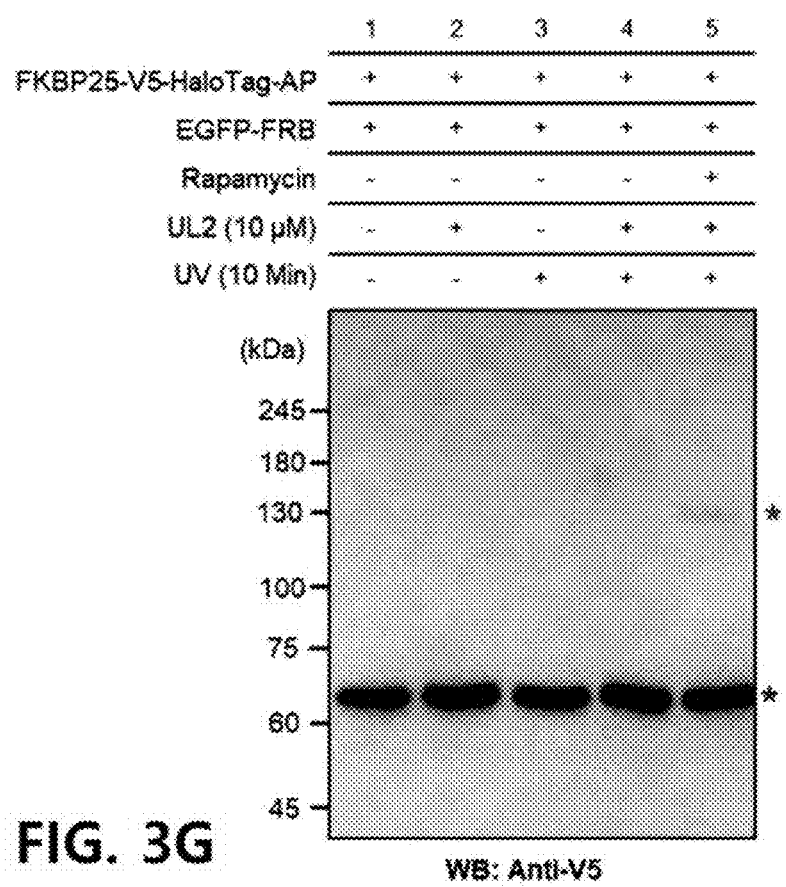
FIG. 3G shows the Western blot results of UL2-mediated photo-crosslinking of FKBP25-V5-HaloTag and EGFP-FRB using rapamycin (100 nM) and UV light illumination (10 min) in living cells. EGFP-FRB and FKBP25-V5-HaloTag crosslinked products are indicated by red asterisks, and uncrosslinked FKBP25-V5-HaloTag and EGFP-FRB are indicated by blue asterisks.
Figure 3H:
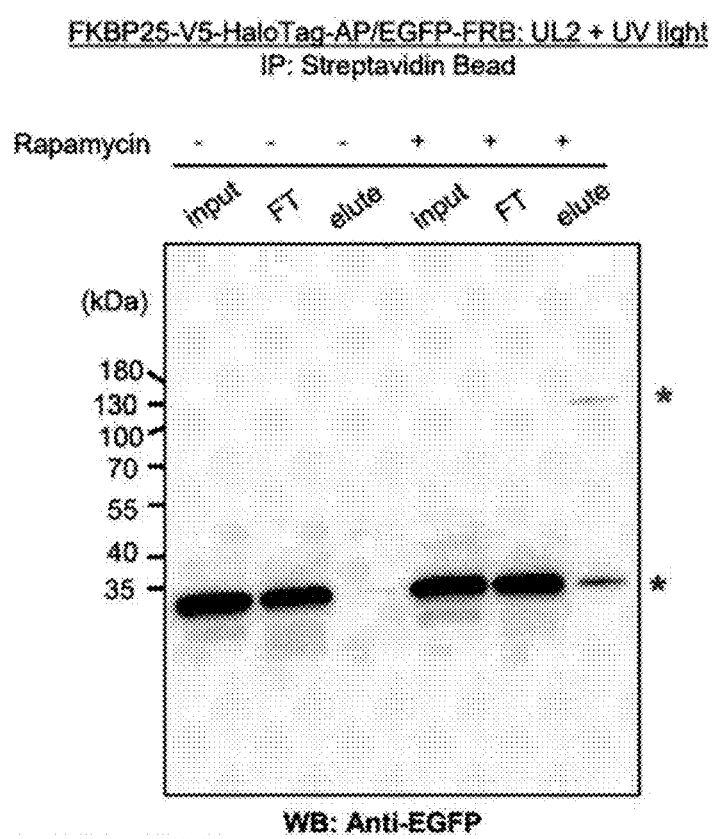
FIG. 3H shows the Western blot results of crosslinked FKBP25-V5-HaloTag and EGFP-FRB according to immunoprecipitation of FKBP25-V5-HaloTag via C-terminal-tagged biotinylated receptor peptide (AP). In the cell lysate, AP was biotinylated by the addition of biotin ligase (BirA), biotin and ATP, and the biotinylated protein was concentrated by streptavidin magnetic beads. In the eluted fraction, crosslinked EGFP-FRB and FKBP25-V5-HaloTag products (red asterisks) and uncrosslinked EGFP-FRB (blue asterisks) were all observed in the rapamycin-treated samples. Anti-EGFP antibody was used for the detection of EGFP-FRB.
Figure 3I:
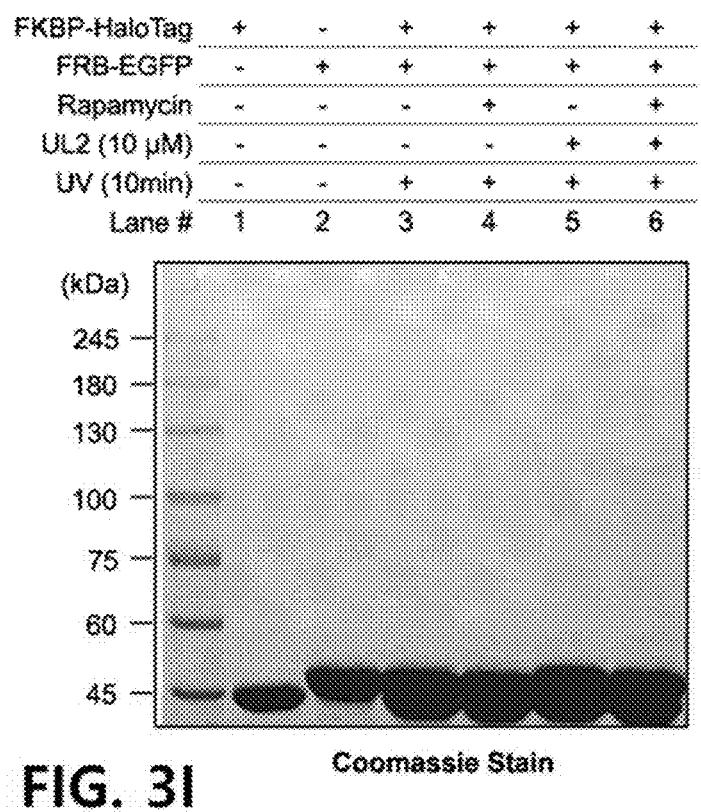
FIG. 3I is the Coomassie staining results of purified FKBP12-HaloTag crosslinking using purified FRB-EGFP in lane 6 showing that FKBP12-HaloTag was crosslinked with FRB-EGFP by UL2 probe after rapamycin pretreatment.

As a result, it was confirmed that VL1 successfully produced the photo-crosslinking products of FKBP25-HaloTag and EGFP-FRB, which appeared at about 110 to 120 kDa only under the blue LED lighting condition in which rapamycin was added. In this response to FKBP25-HaloTag, VL1 including a PEG1 linker showed stronger crosslinking efficiency with EGFP-FRB compared to VL2 including a PEG2 linker (FIG. 2G).

Meanwhile, in order to verify the above results, even in the results of additional experiments using HA-FRB (13 kDa) and FKBP25-V5-HaloTag, VL1-mediated photo-crosslinking products were identified at about 80 kDa (data not illustrated), which was close to the expected molecular weight of the crosslinked product of HA-FRB and FKBP25-V5-HaloTag.

These results indicate that VL1 selectively crosslinks the interactome of HaloTag-conjugated POI (POI-HaloTag) regardless of the tag protein size of the interaction partner. Meanwhile, none of UL1 to UL4, which produced photo-crosslinked products under UV light illumination, generated photo-crosslinked products under the blue LED illumination condition (FIG. 2G).

Example 4. Reduction of Proximity Labeling Radius According to TurboID Fusion

Figure 4A:
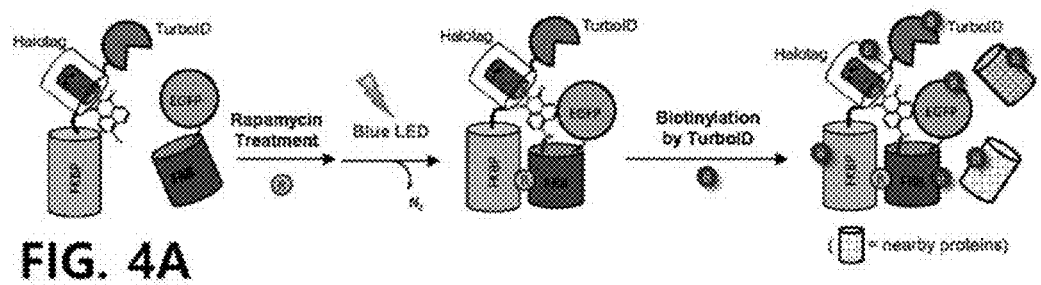
FIG. 4A is mimetic diagrams showing the sequential reactions of VL1-mediated photo-crosslinking and biotin labeling of FKBP12-V5-HaloTag-TurboID in living cells.

It was attempted to confirm whether FRB could be photo-crosslinked and biotinylated by tagging the FKBP12 protein with HaloTag and TurboID and treating with rapamycin (FIG. 4A).

HEK293T cells were cultured using DMEM supplemented with 10% FBS, 2 mM L-glutamine, 50 unit/mL penicillin and 50 μg/mL streptomycin at 5% $CO_2$ and 37° C. When cells were 60 to 70% confluent, for 12-well plates, 1,000 ng of plasmid DNA was mixed with 2 μg of polyethyleneimine (PEI, Polysciences, 23966) using 100 μL of no-FBS DMEM and added to a well, and after 2 to 3 hours following the addition, the medium was replaced with a complete medium again. After 24 hours following transfection, 10 μM of VL1 in DMEM was treated intracellularly for 1 hour.

For imaging experiments, cells were washed three times with DPBS (Thermo Fisher, 21300), and the cells were fixed with a 4% paraformaldehyde solution (Chembio, CBPF-9004) in DPBS for 15 minutes at room temperature. The cells were washed twice with DPBS and permeabilized with cold methanol at −20° C. for 5 minutes. The cells were washed twice again with DPBS and blocked with 2% BSA in DPBS (Millipore, 82-100-6) (blocking buffer) at room temperature for 30 minutes. In order to detect the expression of the HaloTag fusion protein, the cells were incubated with mouse anti-V5 antibody (Invitrogen, Cat. No. R960-25, 1:5,000 dilution) for 1 hour at room temperature. After washing 4 times with TBST for 5 minutes each, the cells were incubated concurrently with secondary Alexa Fluor 568-goat anti-mouse IgG (Invitrogen, Cat. No. A-11004, 1:1,000 dilution) for 30 minutes at room temperature.

For the Western blot experiments, cells were washed 3 times with DPBS, irradiated with Blue LED light for 10 minutes, and after DPBS was removed, the RIPA lysis buffer (Elpis Biotech, EBA-1149) was added. The cells were lysed at 4° C. for 30 minutes. Samples were placed on a 6% SDS-PAGE gel and developed at 150V for 60 minutes, and then the proteins separated on the gel were transferred to a nitrocellulose membrane at 400 mA for 90 minutes. The protein loading level was confirmed by Ponce staining, and the Ponce was removed with 1×TBST buffer. It was blocked with 2% skim milk in TBST for 1 hour, and after replacing the blocking solution with a primary antibody (mouse anti-V5 antibody (Invitrogen, Cat. No. R960-25, 1:5,000 dilution)) diluted in 2% skim milk solution, it was incubated for 1 hour. After washing 4 times (5 min each) with 1×TBST buffer, the membranes were incubated with a secondary antibody (goat anti-mouse HRP conjugated antibody, Bio-Rad, Cat. No. 1706516, 1:1,000 dilution) diluted in 2% skim milk solution in TB ST for 30 minutes. After washing 4 times with 1×TBST buffer, it was developed with an ECL kit (Biorad, 1705061), and images were taken with a Gel doc machine (Genesys).

Figure 4B:
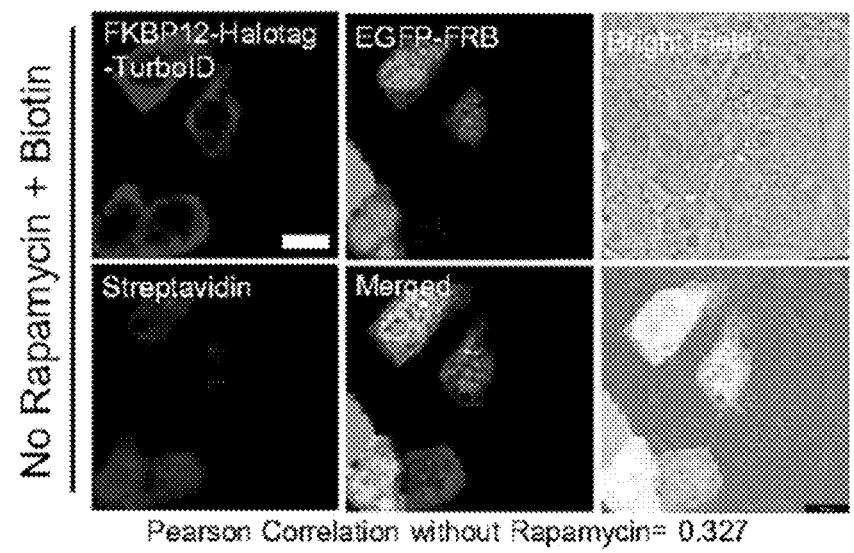
FIG. 4B is the results of observation of the expressions of FKBP12-V5-HaloTag-TurboID and EGFP-FRB in HEK293T cells treated with rapamycin (100 nM) or a vehicle for 1 hour in confocal images. Cells were fixed and permeabilized after incubation with biotin (50 µM) for 30 minutes. FKBP25-V5-HaloTag-TruboID was visualized with anti-V5 antibody and anti-mouse Alexa Fluor 568. Biotinylated proteins were visualized with SA-647 antibody after fixation and permeabilization. The green channel shows the EGFP signal. Scale bar=10 µm.
Figure 4B:
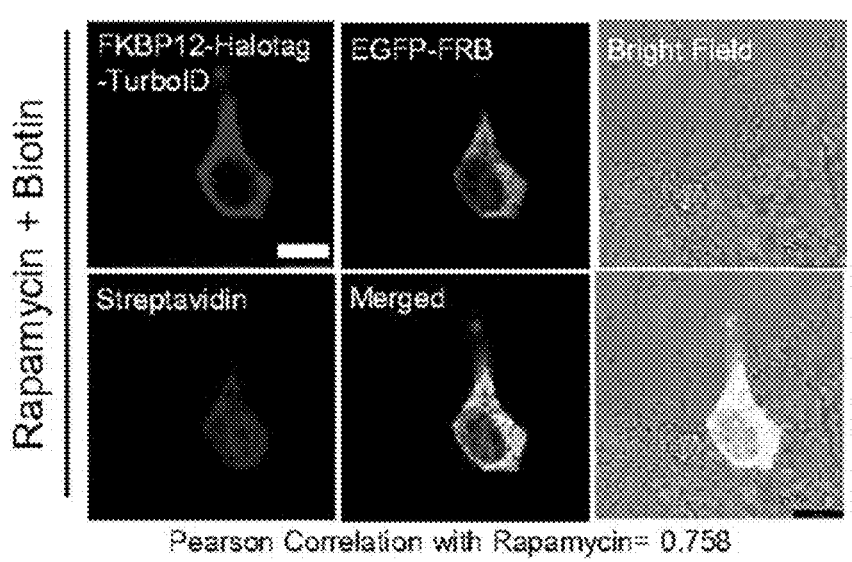
Figure 4C:
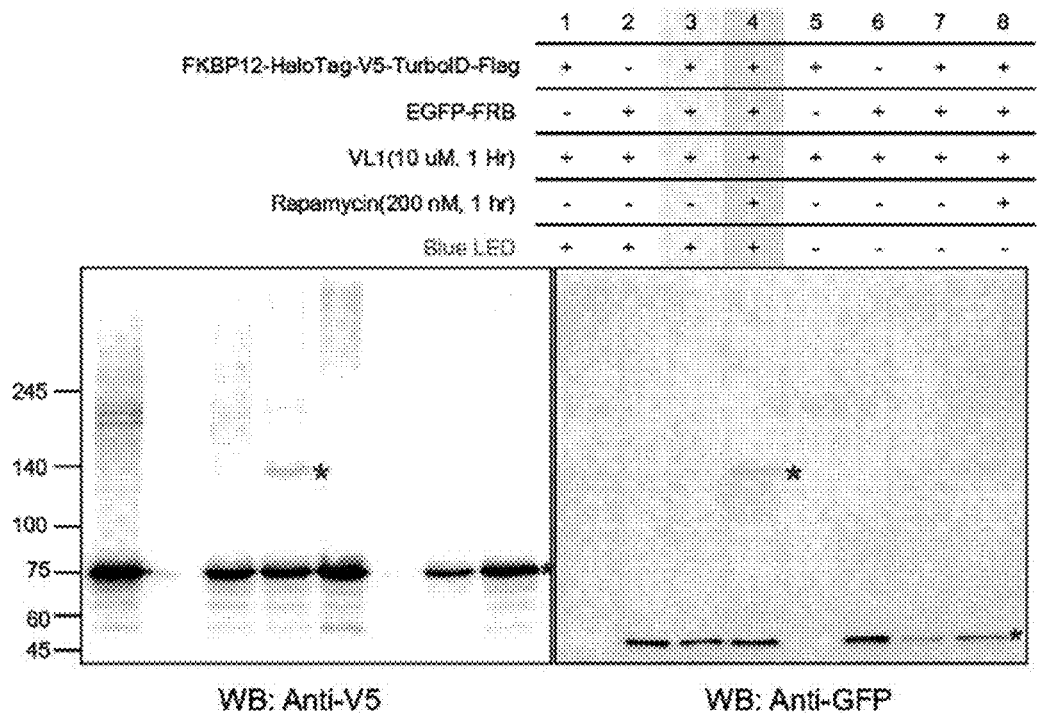
FIG. 4C shows the Western blot results of VL-1 mediated FKBP12-V5-HaloTag and EGFP-FRB photo-crosslinking under blue LED light. Photo-crosslinked products are indicated by red asterisks and uncrosslinked monomers are indicated by blue asterisks.
Figure 4D:
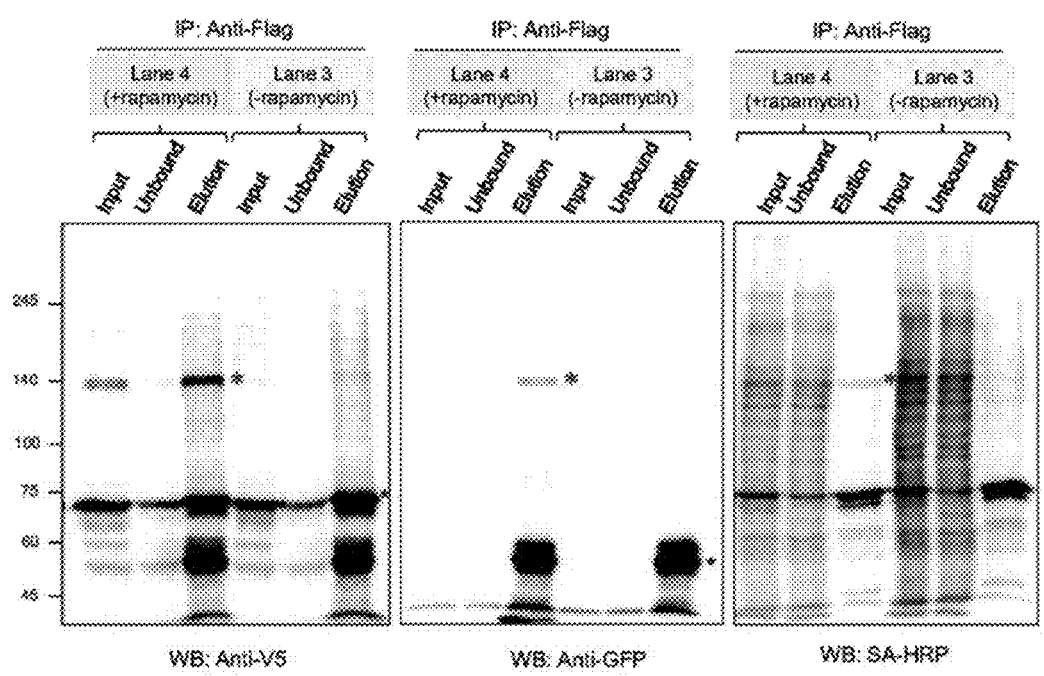
FIG. 4D shows the anti-Flag concentration results of FKBP12-HaloTag-V5-TruboID-Flag in the samples from lanes 3 and 4 of FIG. 4C. VL-1 mediated crosslinked products (red asterisks) in anti-V5 and anti-GFP blots are shown as biotinylated proteins in the SA-HRP Western blots. Uncrosslinked monomers are indicated by blue asterisks.

As a result of the imaging experiments, under rapamycin treatment, FKBP12-HaloTag-TurboID was co-localized with EGFP-FRB, which indicates that the conjugated FKBP12 could functionally form a complex with the FRB domain (FIG. 4B). In the Western blot results, the crosslinked products of EGFP-FRB (48 kDa) and FKBP12-HaloTag-V5-TurboID (84 kDa) were found at about 140 kDa only in the rapamycin-treated sample (FIG. 4C), and in lane 1 and lanes 3 and 4, a sharp change in the crosslinking pattern indicates a dramatic change in the protein interactome of FKBP12. After anti-Flag (mouse anti-Flag, Sigma Aldrich Cat. No. F1804) immunoprecipitation, the SA-HRP (Pierce Cat. No, 21130) Western blot results showed that FKBP12 and FRB crosslinked products were biotinylated (FIG. 4D). In addition to these crosslinked FKBP12 and FRB products, numerous proteins biotinylated by TurboID that were not crosslinked with VL1 were detected in the flow-through fraction. This is because the conventional proximity labeling method (i.e., TurboID method) falsely labels not only the interactome but also all nearby proteins present within the labeling radius, whereas the present invention (Spotlight) is a method that more strictly identifies physically interacting proteins (FIG. 4A).

Example 5. Identification of Protein-Protein Interactions in Intracellular Compartments by Photo-Crosslinked Compounds The purpose of this study was to test the specificity between the HaloTag protein and the AzNP-conjugated HaloTag ligand (VL1) and whether they can capture a narrow protein-protein interaction (PPI) network in various subcellular compartments of living cells.

Because VL1 emits green fluorescence ($\lambda$, =540 nm) and its fluorescence increases after photo-crosslinking reaction, VL1 targeting and formation of POI-HaloTag in living cells can be easily tracked in real time, whereas it was expected that other UV crosslinking ligands (e.g., phenyl azide, diazirine) would not be visualized by microscopic imaging due to negligible fluorescence emission.

Figure 5A:
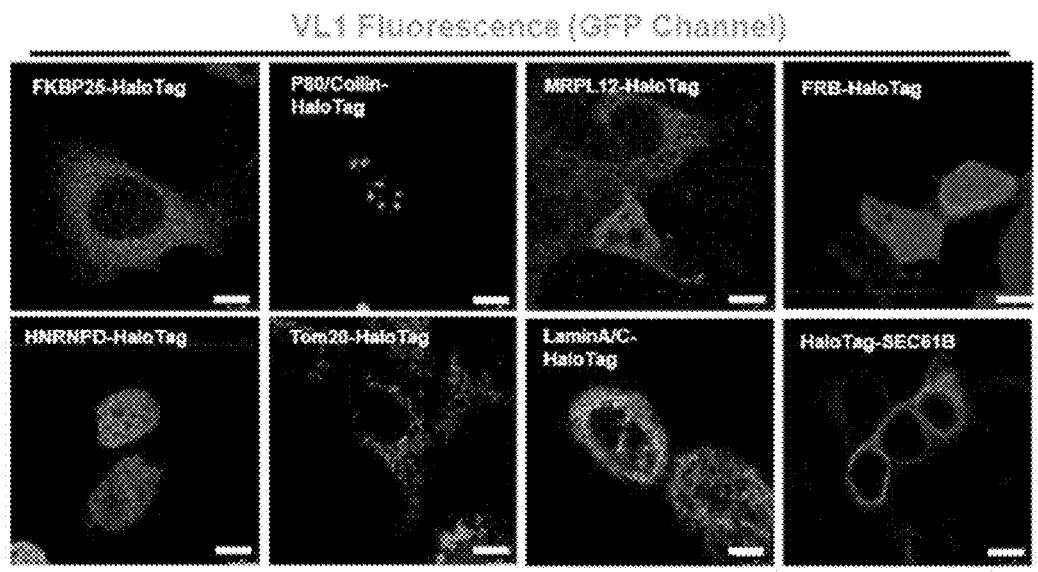
FIG. 5A shows the fluorescence images of HaloTag-conjugated POIs and VLs localized in various cells. Scale bar=10 µm. VL1 fluorescence was observed in the GFP channel of a confocal microscope (excitation wavelength=488 nm).

In order to confirm this, the fluorescence image was observed in a manner similar to that described in Example 4, and Western blot experiments were performed using a mouse anti-V5 antibody (Invitrogen, Cat. No. R960-25, 1:5000 dilution). As expected, fluorescence imaging experiments showed that green fluorescent VL1 targeted a variety of HaloTag proteins in various intracellular compartments, including the inner nuclear membrane (Lamin-AC), Cajal body (p80-coilin), SAM68 body (HNRNPD), mitochondrial matrix (MRPL12), mitochondrial outer membrane (Tom20), endoplasmic reticulum membrane (SEC61B) and stress granules (G3BP1) (FIG. 5A).

Figure 5B:
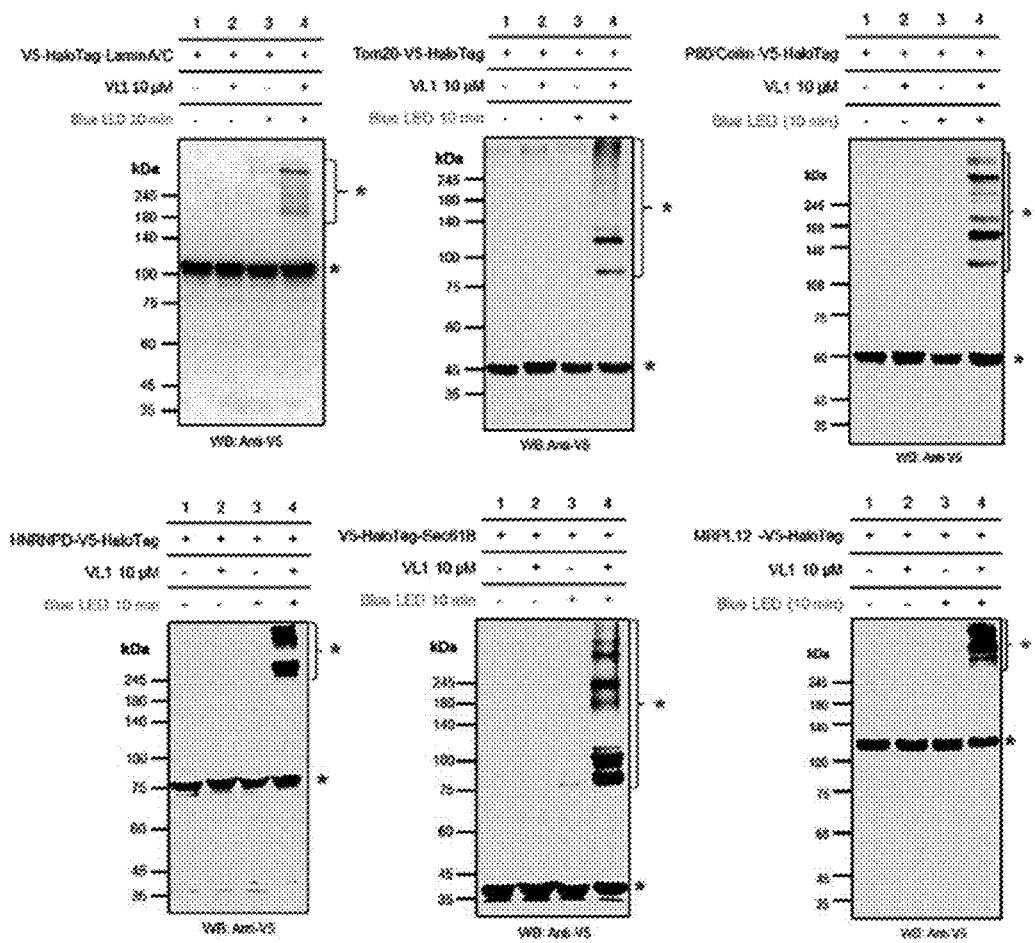
FIG. 5B is the Western blot analysis results using an anti-V5 antibody against VL-1 mediated photo-crosslinking products of various Halotag-V5-POIs. Photo-crosslinked products are indicated by red asterisks and uncrosslinked POI-HaloTag proteins are indicated by blue asterisks.

The Western blot results showed that all of POI-HaloTag structures of various intracellular organelles produced crosslinked products with VL1 under blue LED illumination (FIG. 5B). Interestingly, each POI-HaloTag showed a unique VL1 crosslinking pattern that could reflect the local microenvironment. These results support that VL1 has good membrane permeability and can reach internal parts of organelles, such as mitochondrial matrix protein (i.e., MRPL12), and capture interacting proteins in each compartment with blue LED light activation.

Figure 6A:
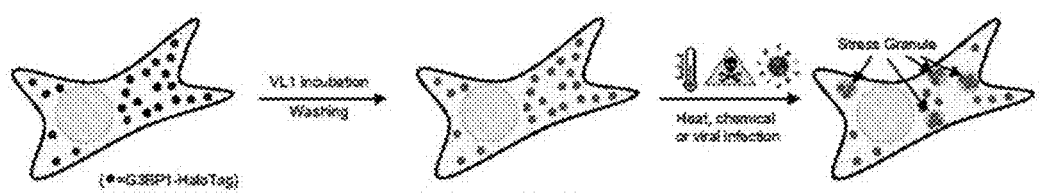
FIG. 6A is mimetic diagrams showing the process of monitoring the stress granule formation of G3BP1-HaloTag with VL1 fluorescence under various stress conditions (e.g., heat, chemical treatment or viral infection).

Example 6. Identification of Spatiotemporal Changes of Interactomes of Photo-Crosslinked Compounds Under Stress Conditions HEK293 T cells expressing HaloTag-EBFP-V5-G3BP1 (hereinafter, HaloTag-G3BP1) were prepared to confirm that VL1 has stability to capture the spatiotemporal changes of the interactome under stress conditions (FIG. 6A).

Figure 6B:
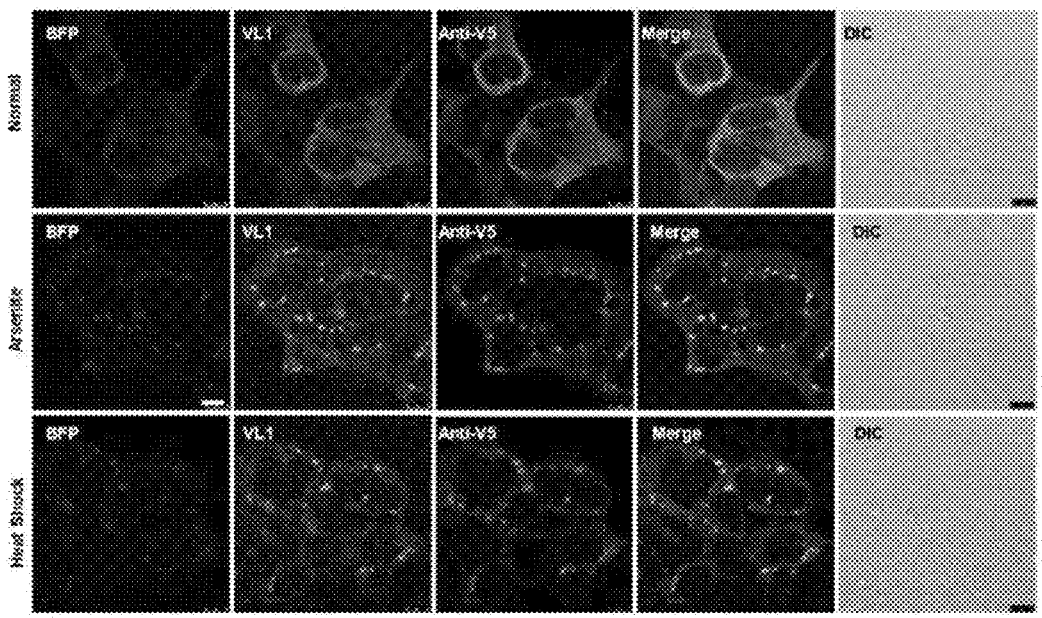
FIG. 6B shows the results of confocal images of G3BP1-EBFP-V5-Halotag treated with 500µM arsenite or VL1-treated according to heat shock (43° C.) for 1 hour. The EGFP fluorescence of G3BP1-EBFP-V5-Halotag was observed with BFP channel. VL1 fluorescence was observed with GFP channel, and anti-V5 immunofluorescence was visualized with a secondary antibody conjugated to Alexa Fluor 647. Scale bar=10 µm.

The cells were incubated with VL1 for 1 hour, washed and stimulated for 1 hour under oxidative stress or thermal stress by treatment with sodium arsenite ($As_2O_3$, 500 μM) at 43° C. As known in previous studies, HaloTag-G3BP1 formed stress granules (e.g., BFP and anti-V5 antibodies) by G3BP1, and HaloTag-targeted VL1 fluorescence also overlapped well with BFP and anti-V5 signals (FIG. 6B).

Figure 6C:
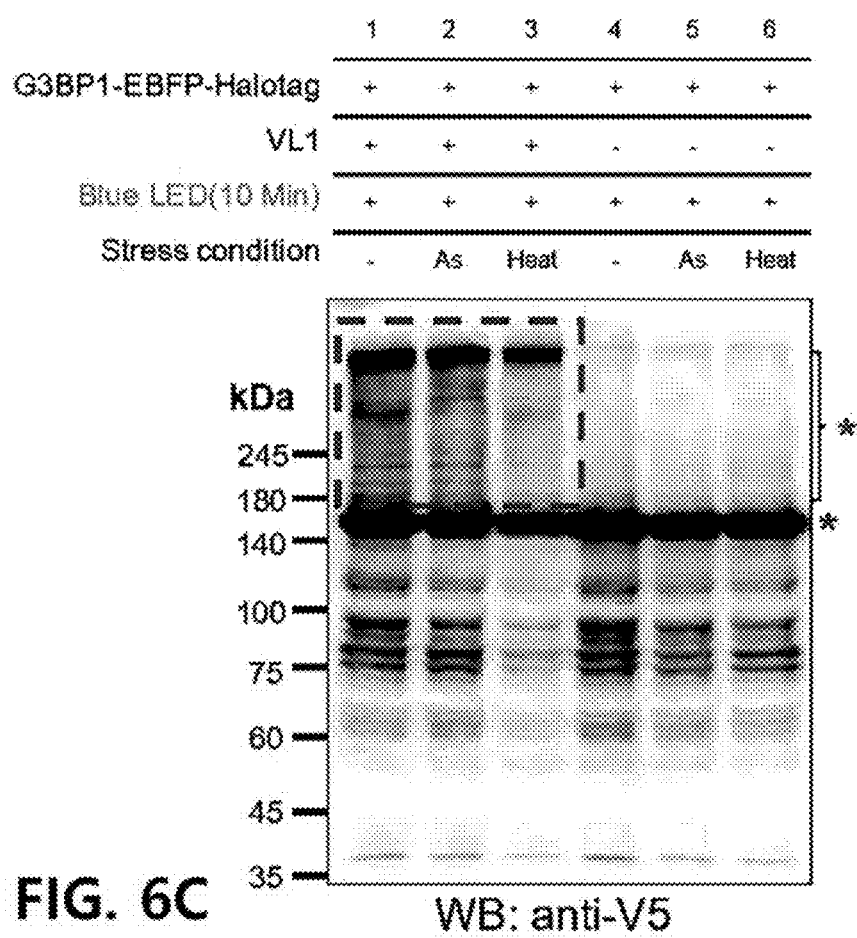
FIG. 6C shows the Western blot results of the VL1-mediated crosslinked product of G3BP1-EGFP-HaloTag under various stress conditions of FIG. 6b. An ophthalmic sample not incubated with VL1 was used as a negative control.
Figure 6D:
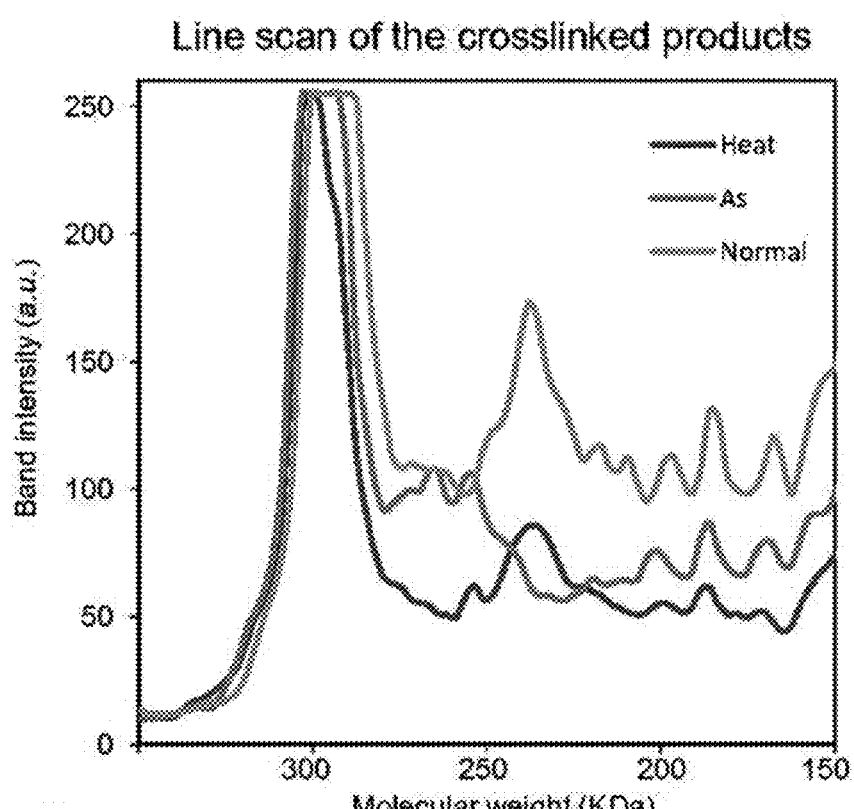
FIG. 6D is the results of line scan analysis of the band intensity of the crosslinked product of FIG. 6B.

These results indicate that VL1 can be used for real-time visualization of a protein of interest (POI) under various stimuli. In addition, by confirming that the VL1-mediated photo-crosslinking product was changed by stress conditions (e.g., sodium arsenite, heat shock), it was confirmed that the present invention can capture the change of the G3BP1 interactome according to the environmental change (FIGS. 6c and 6d).

Meanwhile, changes in the G3BP1 interactome were reproducible in the G3BP1-GFP and GFP-binding protein (GBP)-HaloTag systems (data not illustrated), and therefore, it was found that the GFP tag could be useful for rapid interactome mapping of existing clone libraries of designated target proteins (POIs). The present invention using VL1 for activation in blue LED light showed more cross-linked proteins under UV light compared to using UL2, which is interpreted to be mainly attributed to the superior cell penetration of visible light than UV light.

Example 7. Identification of Interactomes Using SARS-CoV-2-Nucleocapsid (N) Protein-HaloTag in Living Cells It was attempted to identify the interactome in the host of $^{SARS-CoV-2}$N using the system of the present invention. $^{SARS-CoV-2}$N is one of the key protein components of viral particles with RNA-binding domains that play an important role in replication and repackaging of the viral genome in host cells, and the study of host proteins that interact with viruses is essential to understanding the mechanisms of viral replication in host cells. Previous research methods for the host interactome of $^{SARS-CoV-2}$N were mainly by affinity purification mass spectrometry (AP-MS) and conventional proximity labeling methods. However, AP-MS data may indicate artificial interaction partners due to dissolution conditions, and the existing proximity labeling method identifies non-physiological interaction partners due to the aforementioned diffusion labeling properties.

Therefore, in the present invention, it is predicted that another important information on the physical interaction of $^{SARS-CoV-2}$N can be provided, and in order to identify the host interaction network of $^{SARS-CoV-2}$N in human cells, a $^{SARS-CoV-2}$N-V5-HaloTag-AP construct (hereinafter, SARS-CoV-2N-HaloTag) was cloned, and a cell line stably expressing the same in HEK293T-rex cells was prepared.

Figure 7A:
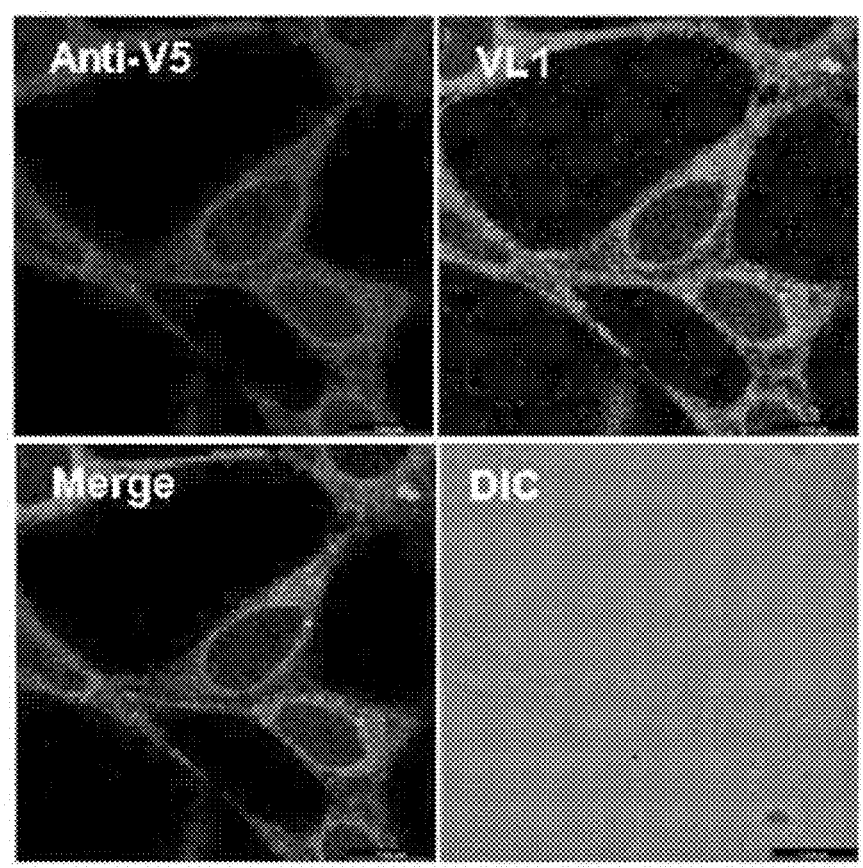
FIG. 7A is the results of confocal imaging of N-HaloTag ($^{SARs-CoV-2}$N-V5-HaloTag).
Figure 7B:
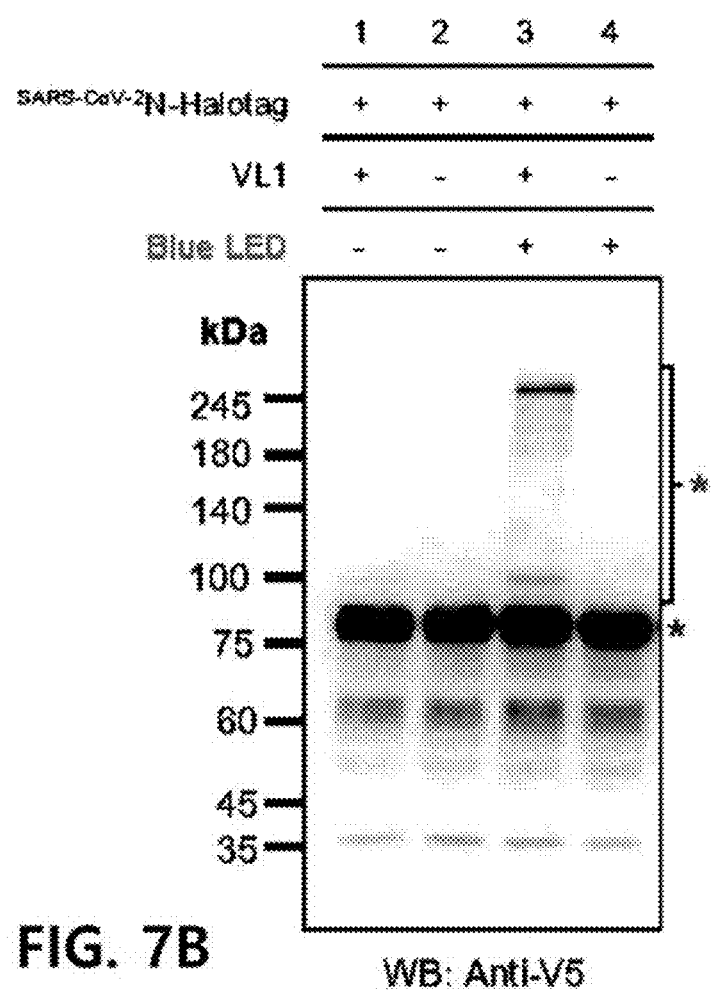
FIG. 7B is the Western blot results of the VL-mediated crosslinked product of N-HaloTag (indicated by red asterisks). Uncrosslinked N-HaloTags are indicated by blue asterisks.
Figure 7C:
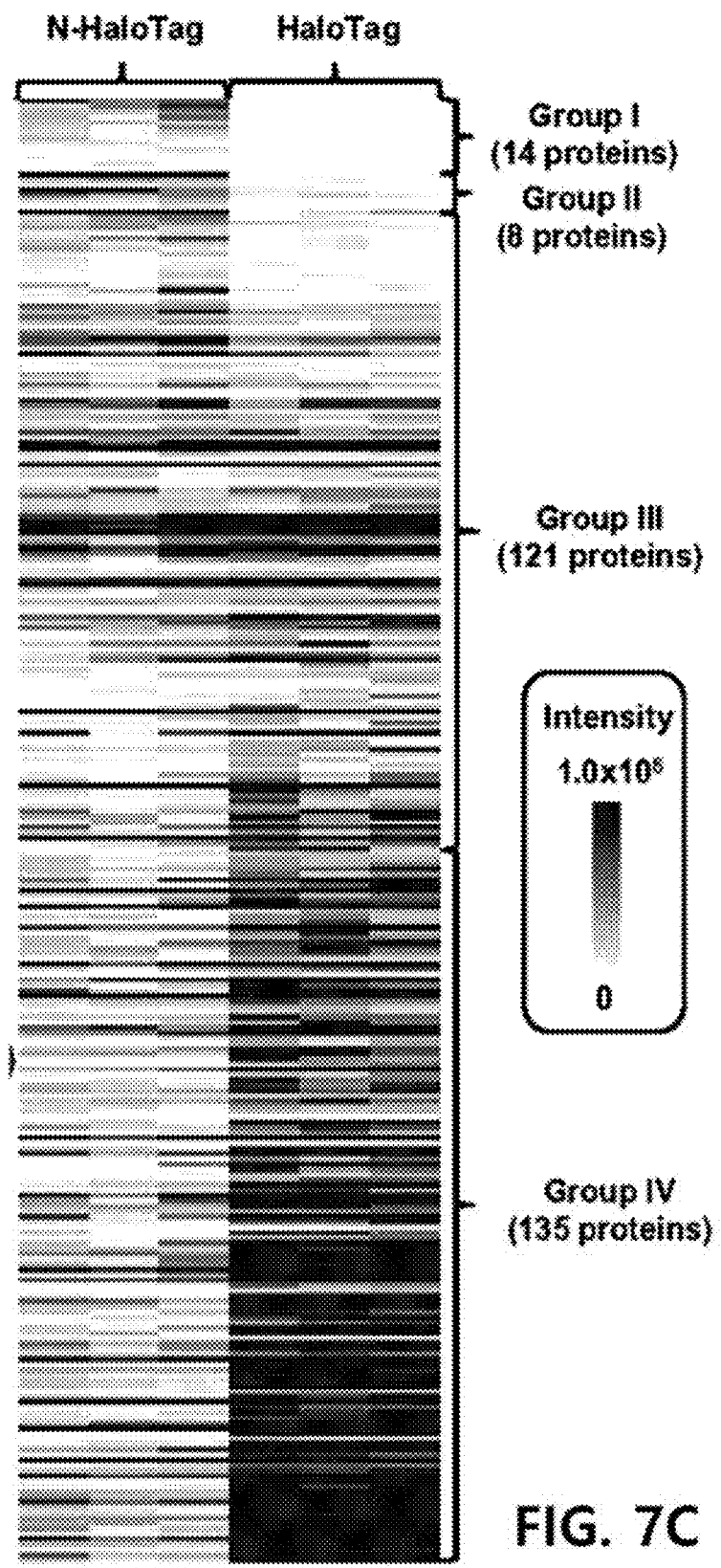
FIG. 7C schematically shows the VL1-crosslinking proteins of N-HaloTag and HaloTag. The table shows the mass spectrometry protein results tested in triplicate. The intensity of color indicates the mass intensity of peptides per VL-crosslinked protein identified with N-HaloTag or HaloTag.
Figure 7D:
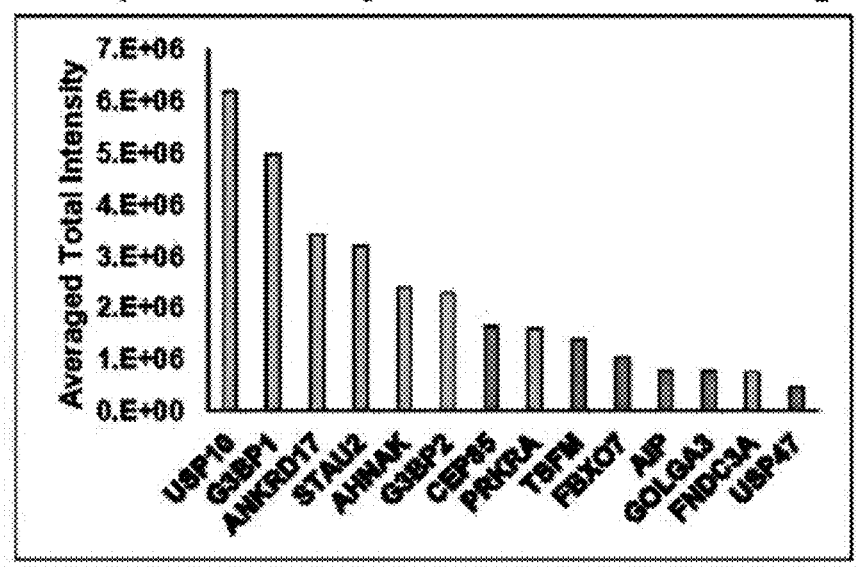
FIG. 7D shows the normalized mass intensities of the 14 proteins of Group I of FIG. 7C. RBP is shown in yellow and non-RBP is shown in blue.
Figure 7E:
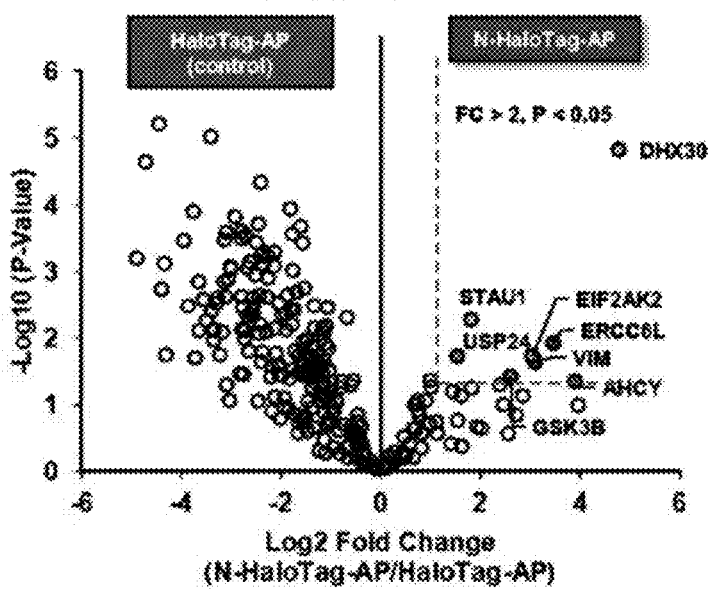
FIG. 7E shows the Volcano plots of Groups II to IV of FIG. 7C showing statistically significant concentration of VL1-crosslinked proteins of N-Halotag (8 proteins, Group II) with respect to VL1-crosslinked proteins of HaloTag alone.
Figure 7F:
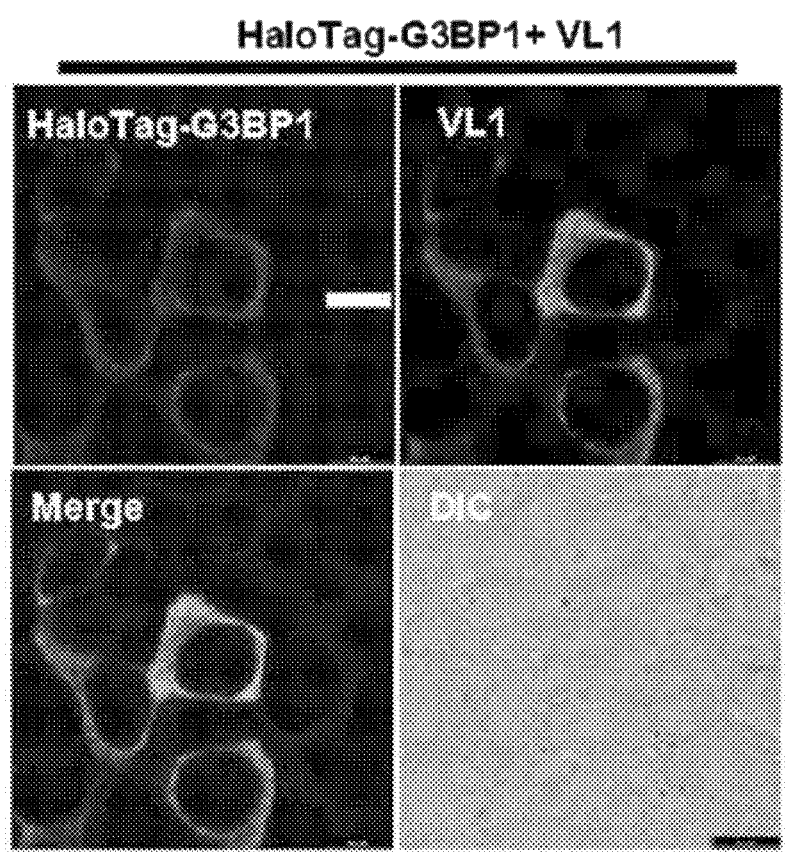
FIG. 7F shows the confocal microscopy images of HAloTag-G3BP1 and VL1 in 293T cells. Scale bar=10 µm.
Figure 7G:
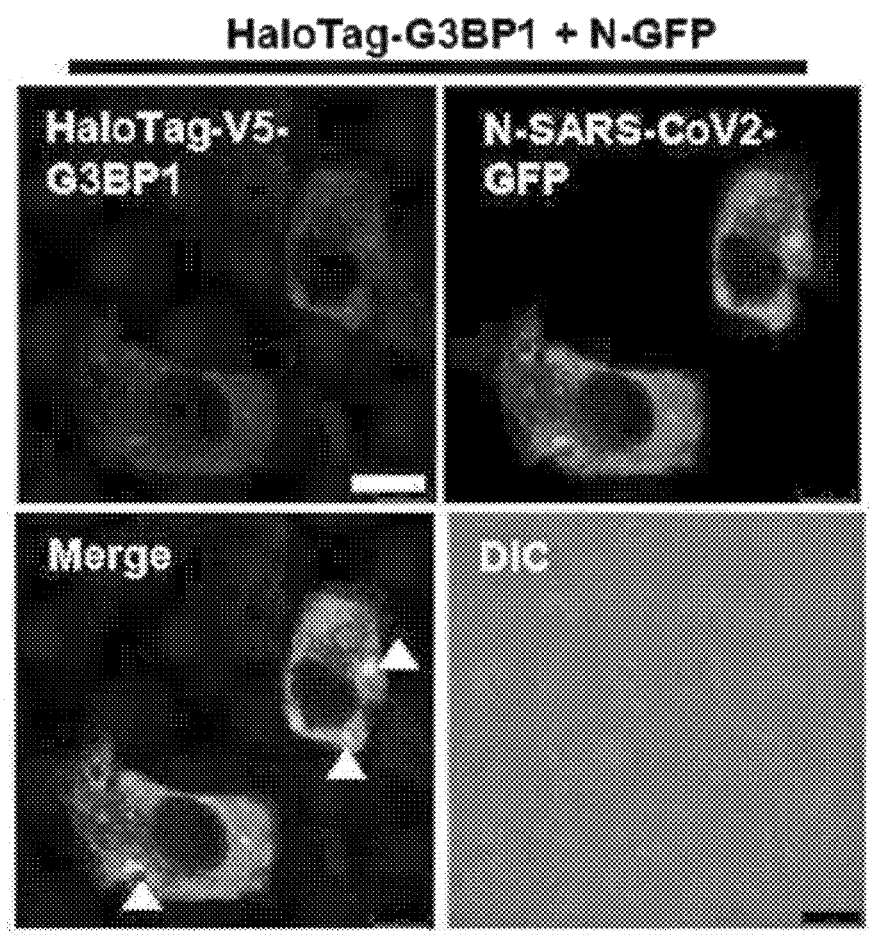
FIG. 7G shows the confocal microscopy images of N-GFP co-expressed with HaloTag-V5-G3BP1 in 293T cells. HaloTag-V5-G3BP1 was observed with an anti-V5 antibody (AF568-conjugated secondary antibody, red fluorescence channel), VL1 and N-GFP with GFP channel. Arrows indicate stress granule formation. Scale bar=10 µm.
Figure 7H:
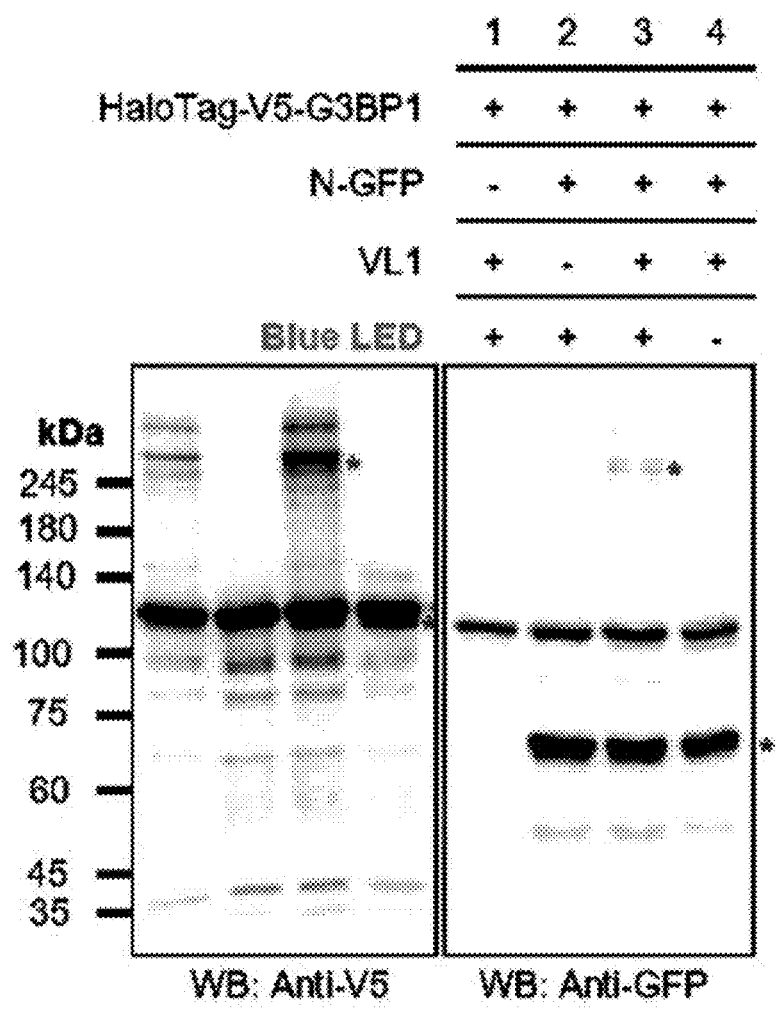
FIG. 7H is the anti-V5 and anti-GFP Western blot results of the VL1-crosslinked products of HaloTag-V5-G3BP1 and N-GFP. The photo-crosslinked product is indicated by a red asterisk, and the uncrosslinked N-HaloTag protein is indicated by a blue asterisk.
Figure 7I:
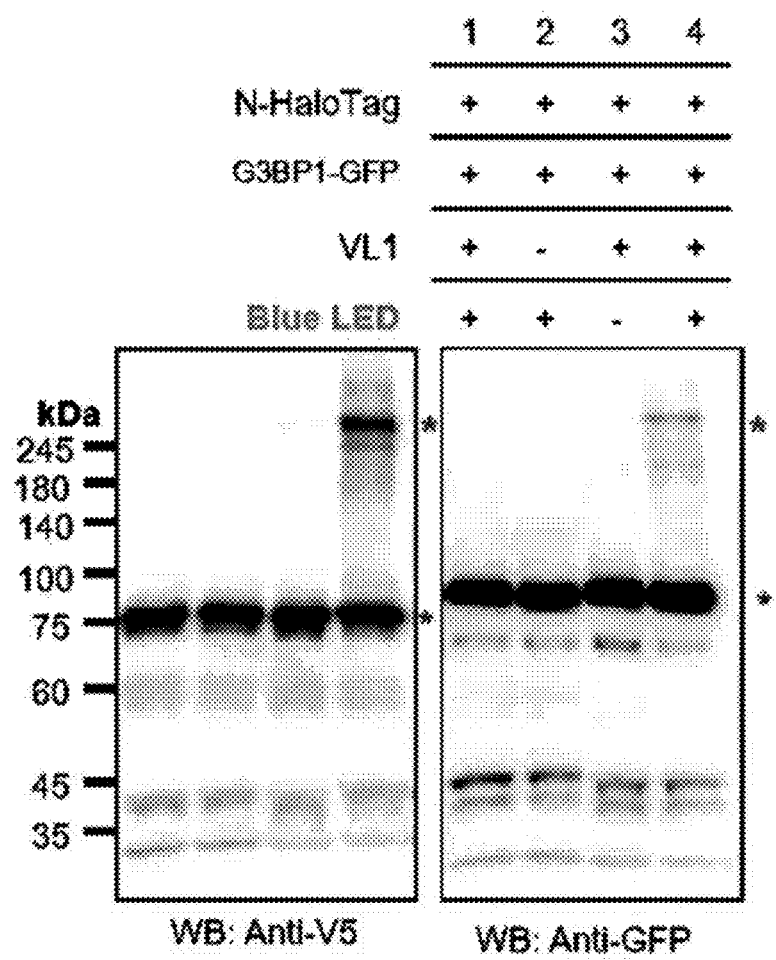
FIG. 7I is the anti-V5 and anti-GFP Western blot results of the VL1-crosslinked products of N-HaloTag and G3BP1-GFP. The photo-crosslinked product is indicated by a red asterisk, and the uncrosslinked N-HaloTag protein is indicated by a blue asterisk.
Figure 8A:
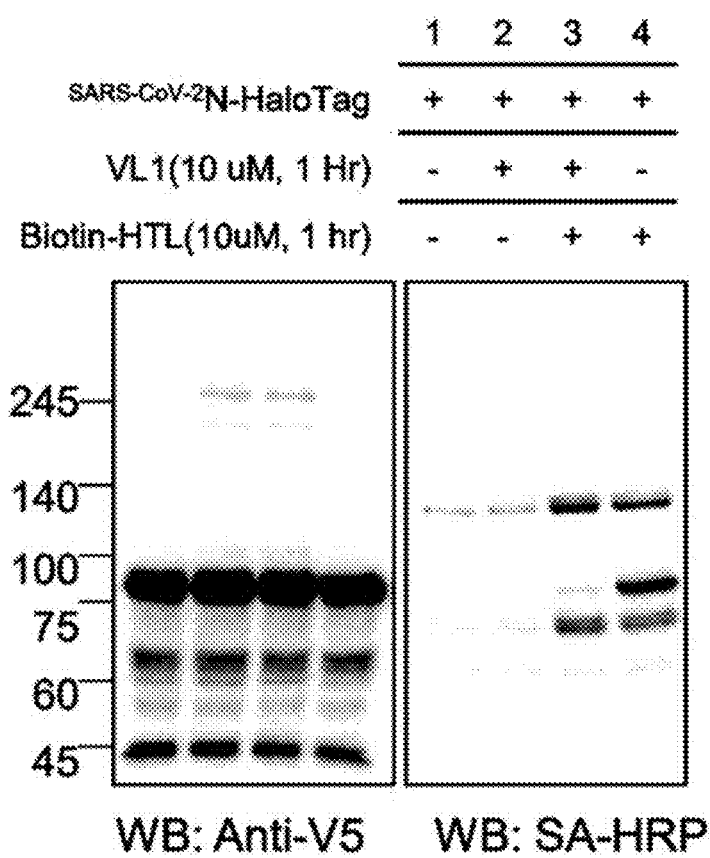
FIG. 8A shows the complete binding assay of VL1 using biotin-HTL in N-HaloTag-expressing HEK293T cells. After incubation with VL1 (10 µM) for 60 minutes, biotin-HTL (10 µM) was treated for 60 minutes. Biotin-HTL can label the empty N-HaloTag protein with or without VL1 pretreatment, and streptavidin-HRP can detect this population in Western blot analysis.
Figure 8B:
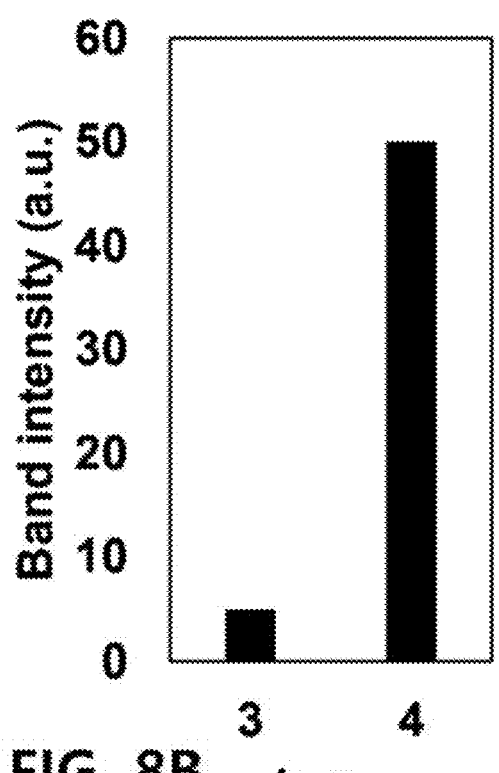
FIG. 8B is a bar graph showing the band intensities of biotin-HTL labeled signals.
Figure 8C:
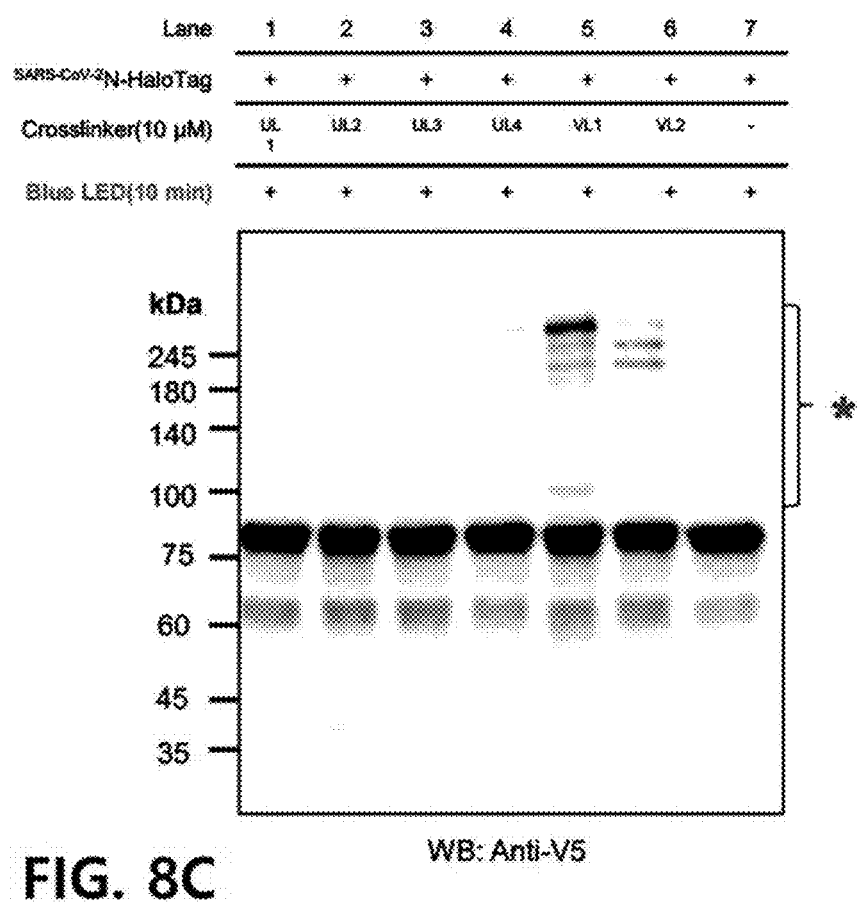
FIG. 8C is the comparison results of the photo-crosslinking efficiency of VL and UL probes for $^{SARS-CoV-2}$N-HaloTag under blue LED illumination. Anti-V5 antibody was used for the detection of N-HaloTag.
Figure 8D:
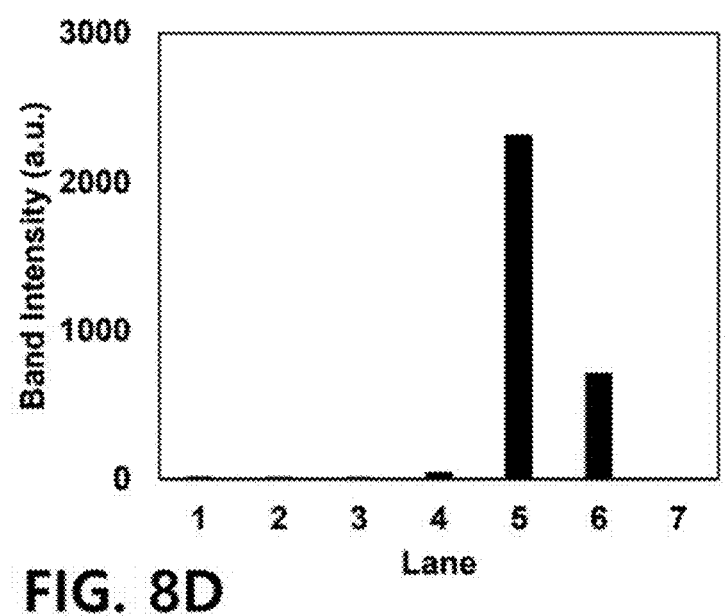
FIG. 8D is a bar graph showing the band intensities of the photo-crosslinked products of FIG. 8C.
Figure 8E:
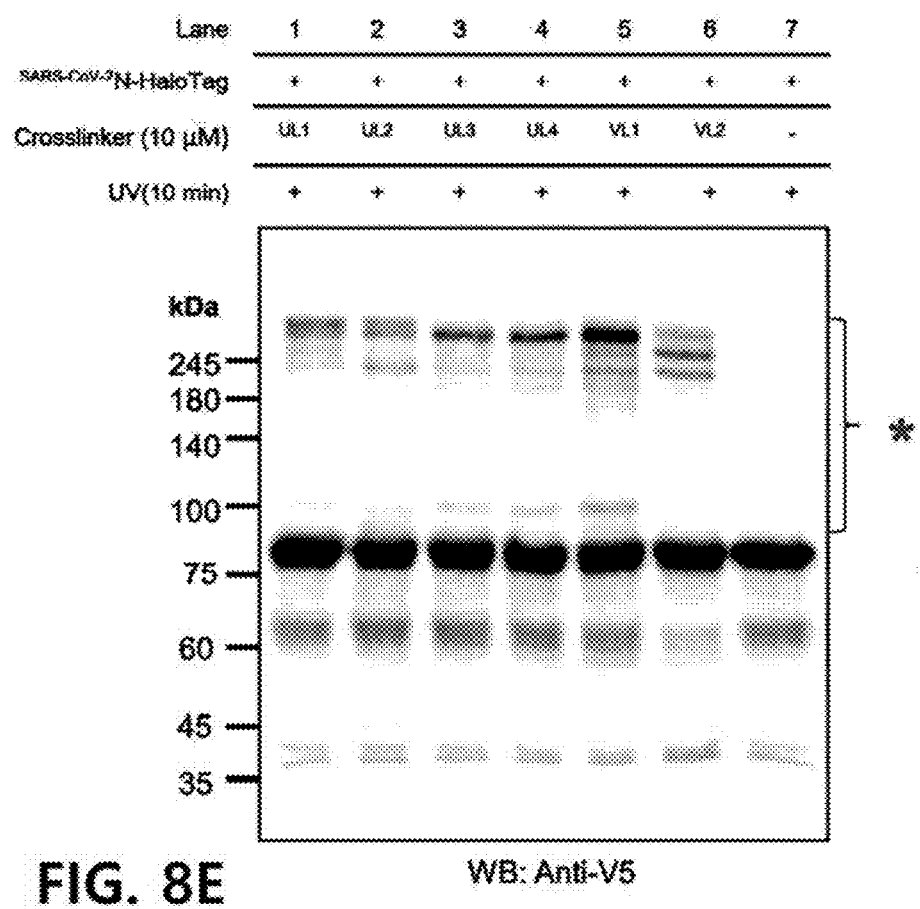
FIG. 8E is the comparison results of photo-crosslinking efficiency of VL and UL probes for $^{SARS-CoV-2}$N-HaloTag under UV illumination. Anti-V5 antibody was used for the detection of N-HaloTag.
Figure 8F:
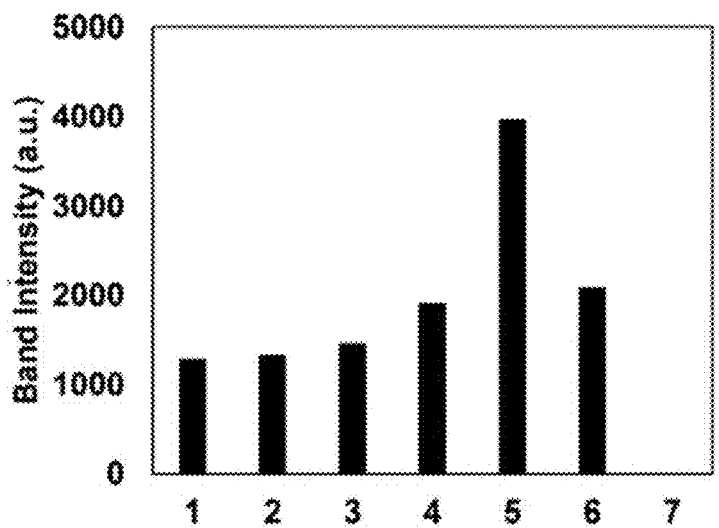
FIG. 8F is a bar graph showing the band intensities of the photo-crosslinked products of FIG. 8E.
Figure 8G:
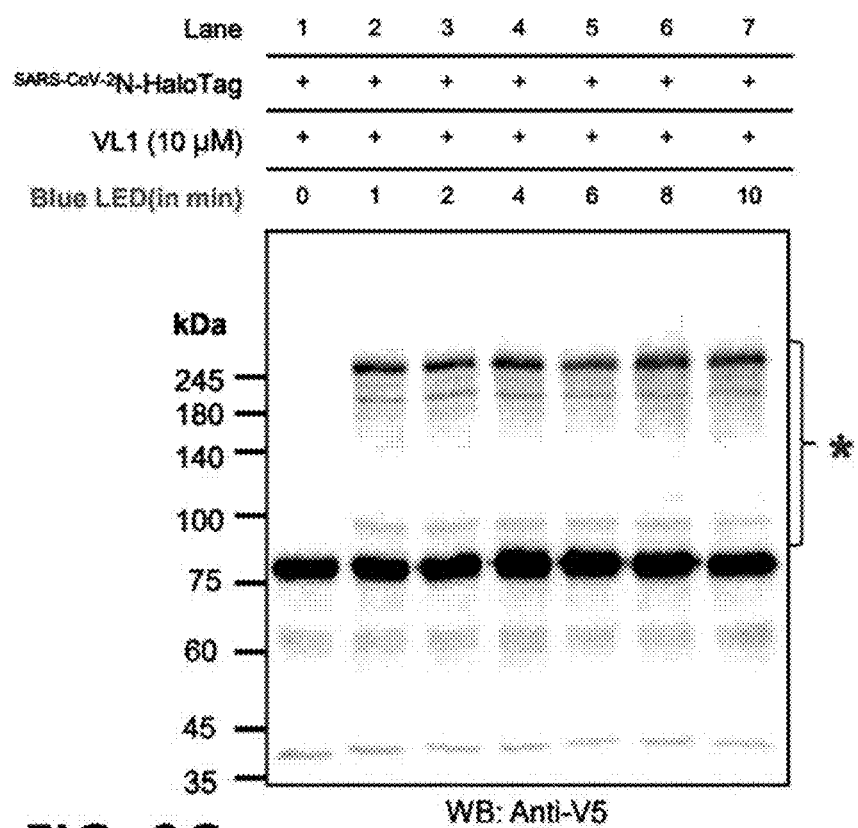
FIG. 8G shows the VL1-mediated photo-crosslinked products of N-HaloTag over time during blue LED illumination (0 to 10 minutes).
Figure 8H:
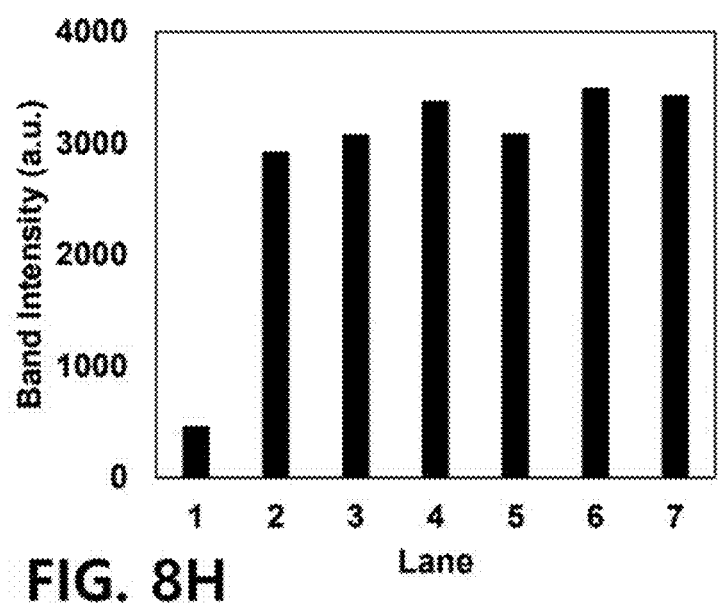
FIG. 8H is a bar graph showing the band intensities of the photo-crosslinked products of FIG. 8G.

In sequential imaging and Western blot experiments, VL1 successfully targeted the $^{SARS-CoV-2}$N-HaloTag protein and crosslinked adjacent proteins (FIGS. 7a and 7b). Moreover, almost all cells expressing $^{SARS-CoV-2}$N-HaloTag were labeled with VL1, and therefore, post-treated biotin-HTL was negligibly conjugated with $^{SARS-CoV-2}$N-HaloTag after VL1 treatment (FIGS. 8a and 8b). In addition, VL1 showed particularly strong crosslinking efficiency for $^{SARS-CoV-2}$N-HaloTag compared to other photo-crosslinking ligands (VL2 and UL probe) under blue LED illumination (FIGS. 8c to 8f), and the photo-crosslinking reaction for $^{SARS-CoV-2}$N-HaloTag was efficiently completed within 1 minute after treatment with blue LED illumination. (FIGS. 8g and 8h).

Figure 9A:
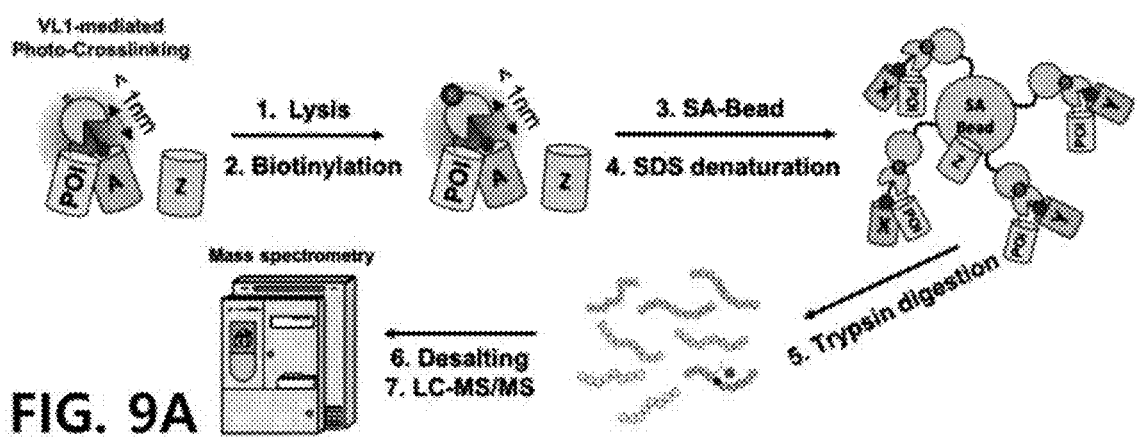
FIG. 9A shows the flow chart of a sample preparation process for mass spectrometry of the crosslinked samples according to the present invention.
Figure 9B:
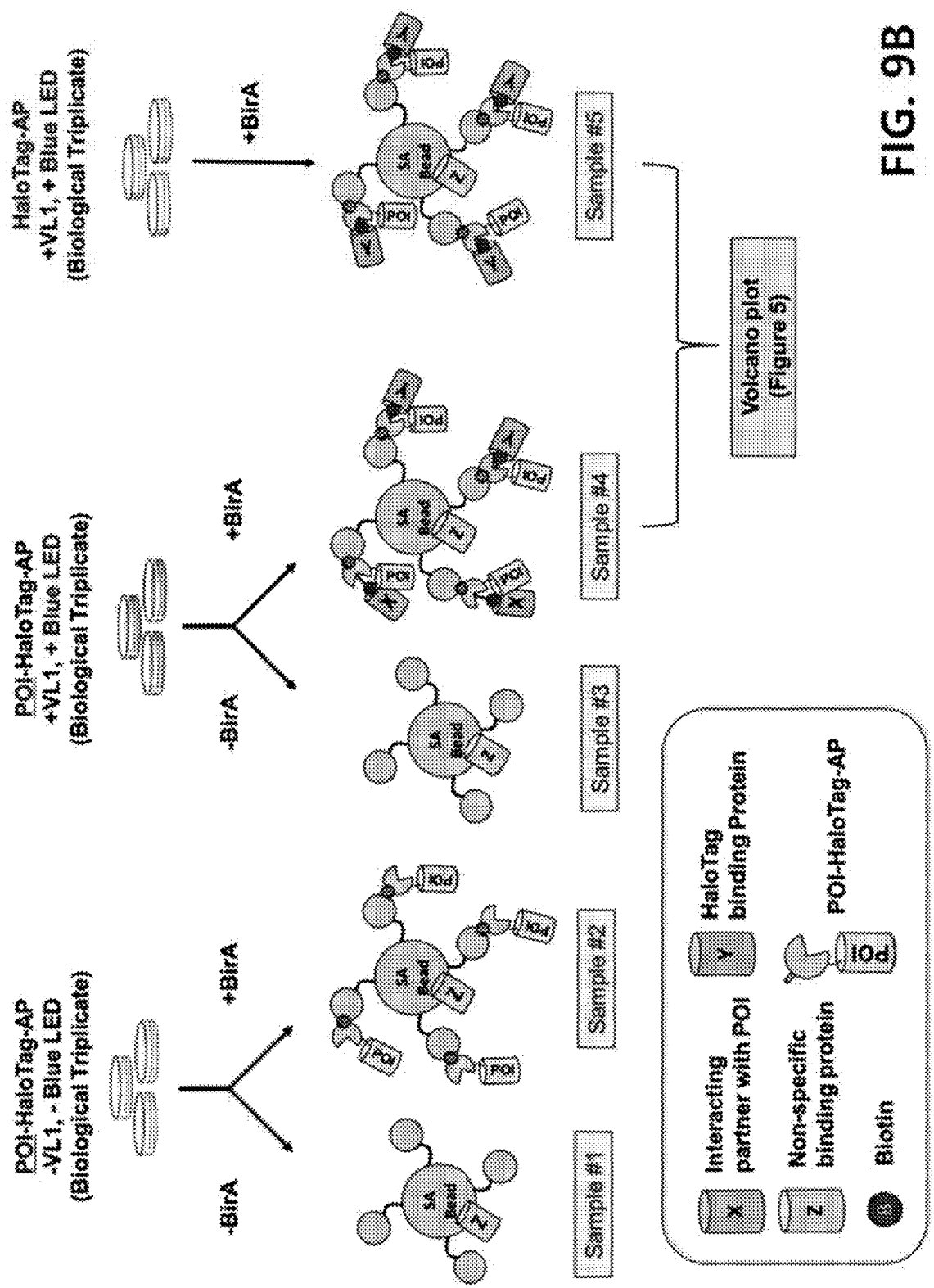
FIG. 9B is mimetic diagrams showing the processing conditions of each sample used for mass analysis of the crosslinked samples according to the present invention.
Figure 10A:
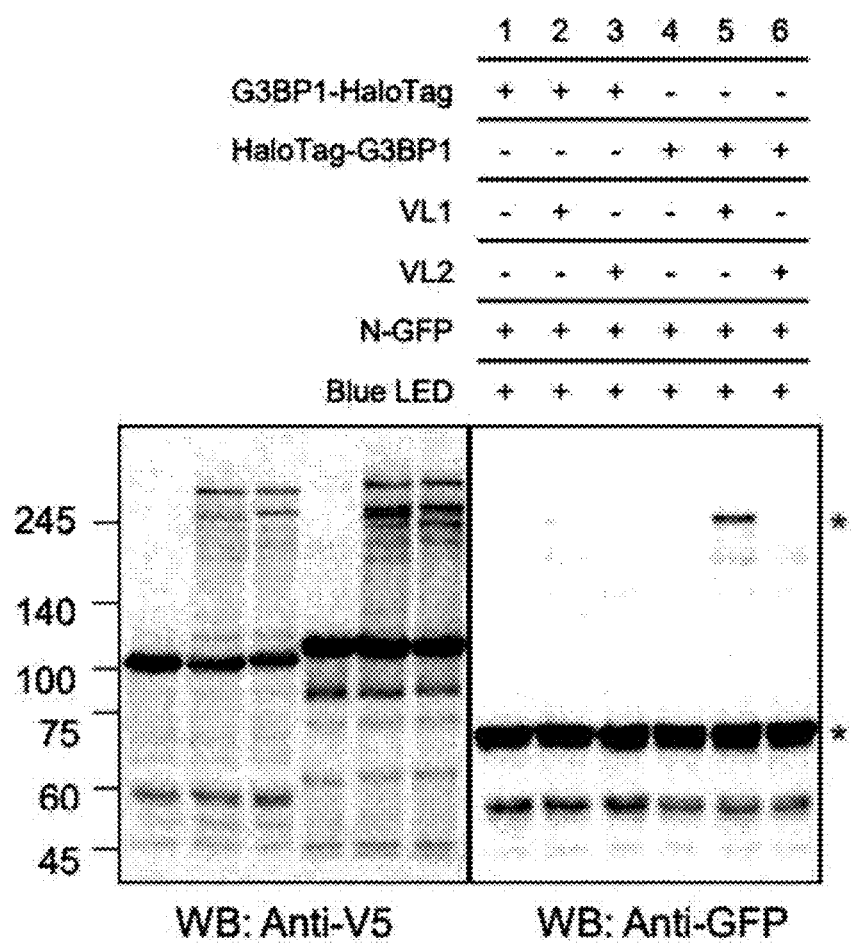
FIG. 10A is the results of confirming protein-protein interaction by VL-crosslinking analysis.
Figure 10B:
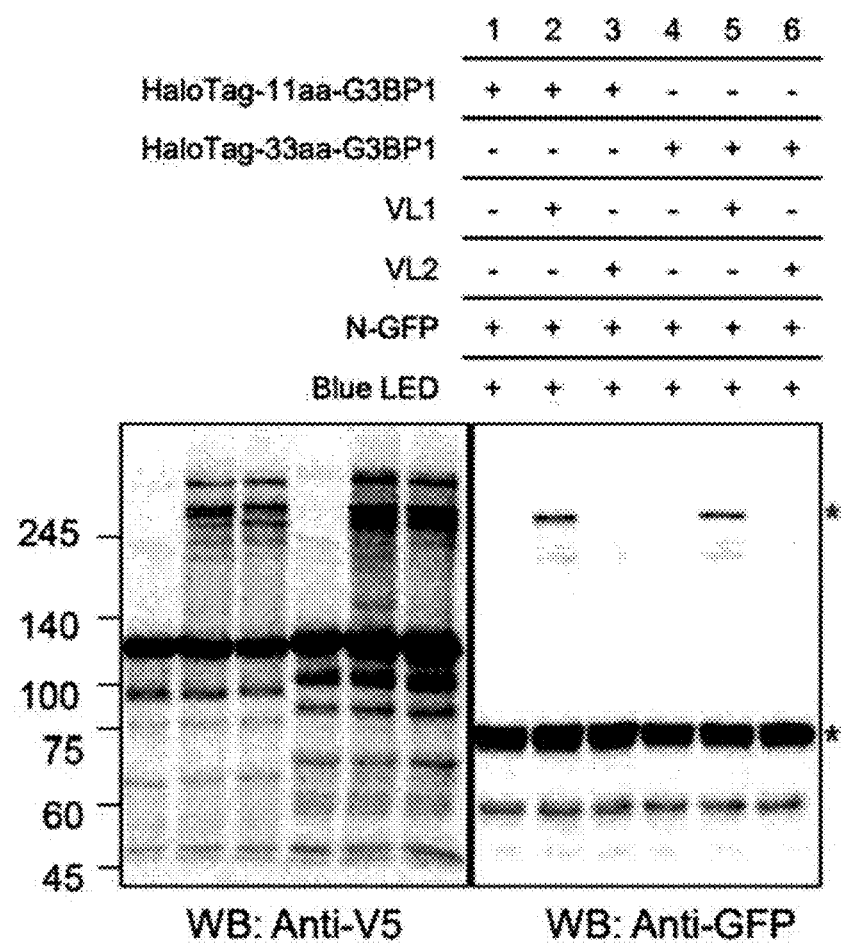
FIG. 10B is the results of comparing the crosslinking effect according to the linker length of HaloTag-G3BP1.

In order to identify the physical interactome of $^{SARS-CoV-2}$N in the host cell, triplicate biological samples for LC-MS/MS analysis were prepared for the above composition or control group (FIG. 9).

Specifically, for mass spectrometry of crosslinked products, HEK293T cells were grown to 60 to 70% in 100 Φ plates. 8,000 ng of plasmid DNA was transfected using the PEI transfection reagent, and the medium was replaced with a complete medium after 3 hours. After 24 hours following transfection, it was incubated with 10 μM VL1 for 1 hour and washed 3 times with cold DPBS before crosslinking in blue LED for 10 minutes. Cells were collected in DPBS, the pellet was lysed with RIPA buffer, and the lysate was in vitro-biotinylated using recombinant wild-type BirA solution (10 μM BirA, 10 μM biotin, 200 μM ATP and 500 μM MgCl$_2$) at room temperature for 12 hours. In order to remove free biotin, the lysate was loaded onto an amicon filter and centrifuged at 12,000×g for 4×15 minutes. 1×TBS buffer was added to up to 400 μL of the concentrated lysate followed by adding 100 μL of washed streptavidin beads. After 10 minutes of incubation, 2 mL of SDS in TBS was added to a final concentration of 2 to 10% and incubated for 1 hour. Beads were washed 4 times with 2% SDS in TBS buffer and incubated with 10 mM DTT in 50 mM ABC buffer for 1 hour at 37° C. Alkylation was performed with 55 mM IAM in ABC buffer at 37° C. under dark conditions. After incubating for 1 hour, the solution was replaced with 200 μL of a trypsin solution (2 μg trypsin and 1 mM CaCl$_2$ in 50 mM ABC buffer) and mixed at 37° C. for 12 hours. Next, the supernatant was desalted using a zip-tip (Thermo Fisher, 87784), and the eluted fractions were dried using a speed vac and stored in a freezer until loading into LC-MS/MS.

Peptides were analyzed with a Thermo-Scientific Q Exactive Plus equipped with a nanoelectrospray ion source. The peptide mixture was separated by using a C18 reverse-phase HPLC column (500 mm×75 μm i.d.) using a 2.4 to 17.6% acetonitrile/0.1% formic acid gradient at a flow rate of 300 nL/min for 120 minutes. For MS/MS analysis, precursor ion scan MS spectra (m/z 350 to 2,000) were acquired by using an Orbitrap spectrometer at a resolution of 70K at 200 m/z with an internal lock mass. A resolution of 17,500 at m/z 200 was set for the HCD spectrum, and the 15 most concentrated ions were separated and fragmented by higher energy collision dissociation (HCD). For protein identification, MS/MS-based peptide and protein identification was validated by using Scaffold (version 4.11.0, Proteome Software Inc., Portland, OR).

Peptide identification was allowed if it could be established with a probability of 95.0% or more by the Scaffold Local FDR algorithm. Protein identification was allowed if it could be established with a probability of 99.0% or more and it included at least two identified peptides. Protein probabilities were assigned by the Protein Prophet algorithm. Proteins that contained 5 similar peptides and could not be differentiated by MS/MS analysis alone were classified to satisfy the principles of parsimony.

Tandem mass spectra from database searches were extracted by Proteome Discoverer (version 2.2, Thermo Fisher Scientific, San Jose, CA). All MS/MS samples were analyzed using Sequest (XCorr only). Sequest was set up to search the *Homo sapiens* protein sequence database (42230 entries, UniProt (http://www.uniprot.org/)), assuming digestion with trypsin. Sequest was searched with a fragment ion mass tolerance of 0.80 Da and a parent ion tolerance of 10.0 PPM. The carbamidomethyl of cysteine was designated as a fixed modification in Sequest. The oxidation of methionine and acetyl at the N-terminus was designated as a variable modification in Sequest. For volcano plot analysis, 5 multiple substitutions of missing values were used via PANDA-View Software 6.

In order to concentrate the VL1-crosslinked product of $^{SARS-CoV-2}$N-HaloTag, the C-terminus of the $^{SARS-CoV-2}$N-HaloTag structure was genetically conjugated with a receptor peptide (AP, also known as Avitag), and after the in vitro biotinylation reaction using purified biotin ligase (BirA), it was allowed to be concentrated in streptavidin (SA) beads. N-HaloTag was biotinylated by adding BirA and biotin/ATP to the mixture. Depending on the femtomolar level of binding affinity between biotin and streptavidin, the biotinylated N-HaloTag after streptavidinbead concentration did not remain in the flow-through fraction at all or was negligible. This strong binding affinity made it possible to use 10% sodium dodecyl sulfate (SDS) buffer as a culture and wash buffer in the concentration step, which was useful for efficiently removing non-covalent binders of bait proteins. In fact, only 4 proteins (including bait proteins) were significantly concentrated in the $^{SARS-CoV-2}$N-HaloTag-AP sample that was not VL1 crosslinked and biotinylated compared to the non-biotinylated sample. In contrast, since 161 proteins were identified in the VL1-SARS-CoV crosslinked and biotinylated $^{SARS-CoV-2}$N-HaloTag-AP sample (i.e., +VL1, +BirA), numerous VL1-crosslinking proteins survived with the $^{SARS-CoV-2}$N-HaloTag-AP protein.

Due to the possibility that some unknown endogenous protein with intrinsic affinity for HaloTag may also crosslink with VL1, as a control group, a VL1 crosslinked product was generated under blue LED lighting to confirm the VL1 binding affinity for the free HaloTag-AP structure as well.

The HaloTag-AP result according to the same mass spectrometry method provided detailed background protein information, and based on this, the N-interactome could be obtained by filtering the VL1 crosslinked protein information of $^{SARS\text{-}CoV\text{-}2}$N-HaloTag-AP. 14 proprietary proteins (G3BP1, G3BP2, STAU2, AHNAK, ANKRD17, PRKRA, CEP85, FBXO7, FNDC3A, GOLGA3, TSFM AIP, USP10 and USP47) were confirmed in the VL1-crosslinked N-HaloTag sample by comparing MS1 signal intensities in both samples (Group I, FIG. 7D). In addition, the other 8 proteins (ERCC6L, USP24, GSK3B, STAU1, EIF2AK2, VIM, AHCY and DHX30) of the overlapping proteins between N-HaloTag and HaloTag (Groups II to IV) were significantly more abundant in the VL1-crosslinked N-HaloTag sample compared to the VL1-crosslinked HaloTag-AP samples (FIG. 7E). In this relative quantitative analysis, a total of 22 proteins could be selected as "N-interactomes". 11 of these proteins (USP10, G3BP1, ANKRD17, STAU2, AHNAK, G3BP2, PRKRA, FNDC3A, STAU1, EIF2AK2 and DHX30) are characterized as RBPs. This proportion of RBP in the N-interactomes (50%, 11/22) was significantly higher compared to the human proteome (about 5%, 1072/20,380). In particular, 7 out of 22 proteins (32%) of the N interactomes were also found in stress granules where viral RNA could reside (e.g., G3BP1, G3BP2, STAU1, STAU240, USP10, PRKRA, EIF2AK2 and CEP85), and this data suggests that SARS-CoV-2N does not promiscuously interact with any RBP or any resident protein in the stress granules. Meanwhile, PABPC1 and THRAP3, which are well-known stress granule resident RBPs, were not crosslinked with N-HaloTag-AP but were abundant in samples crosslinked with free HaloTag-AP.

In order to verify that $^{SARS\text{-}CoV\text{-}2}$N and N-interactome are within the VL1-mediated crosslinking radius, G3BP1, which is well known as RBP and a stress granule marker protein, was selected. A HaloTag-G3BP1 construct was constructed in which the entire HaloTag was spliced at the N-terminus of G3BP1. The construct was expressed in the cytoplasm in the basal state, and VL1 anchoring did not change this pattern (FIG. 7F), but when $^{SARS\text{-}CoV\text{-}2}$N-GFP was co-expressed, HaloTag-G3BP1 formed granules and co-localized with $^{SARS\text{-}CoV\text{-}2}$N, which means that G3BP1 and $^{SARS\text{-}CoV\text{-}2}$N are in close proximity (FIG. 7G).

The Western blot results also showed that HaloTag-G3BP1 formed a $^{SARS\text{-}CoV\text{-}2}$N-GFP and VL1-crosslinked product under blue LED illumination and $^{SARS\text{-}CoV\text{-}2}$N-HaloTag also formed a G3BP1-GFP and VL1-crosslinked product (FIG. 7I and FIG. 7H).

As a result of performing anti-Flag IP on the N protein using N-Halotag-TurboID-Flag depending on whether G3BP1-GFP was co-expressed, G3BP1 could be observed in the concentrated fractions after western blot, but GFP signal was not observed in the pass-through fractions, and from these results, it was found that G3BP1 physically interacts with $^{SARS\text{-}CoV\text{-}2}$N. This is also consistent with recent publications showing that G3BP1 is a physical interaction partner based on various validation methods of $^{SARS\text{-}CoV\text{-}2}$N (Gordon, D. E. et al., *Nature* 2020, 583, 459-468; Nabeel-Shah, S. et al., *bioRxiv* 2020, 2020.2010.2023.342113).

It was further confirmed that the crosslinked product as above was generated specifically for the HaloTag-G3BP1 construct (i.e., not generated in G3BP1-HaloTag) (FIG. 10A), which means that the interaction between G3BP1 and $^{SARS\text{-}CoV\text{-}2}$N takes place in the N-terminal domain of G3BP1. In addition, when the HaloTag-2×TEV-Flag-G3BP1 construct having a longer linker (33 amino acids) than the linker (11 amino acids) used in Halotag-Flag-G3BP1 was used, almost the same crosslinking results were obtained. and it was found that this system was independent of the linker size between HaloTag and POI (FIG. 10B). In contrast, when VL2 (PEG3 linker, 3.43 Å longer than VL1) was used, different crosslinking results were obtained compared to the results obtained using VL1 when it was performed on HaloTag-2×TEV-Flag-G3BP1 or Halotag-Flag-G3BP1 (FIG. 10B).

So far, with respect to the present invention, the preferred exemplary embodiments have been reviewed. Those of ordinary skill in the art to which the present invention pertains will understand that the present invention may be implemented in a modified form without departing from the essential characteristics of the present invention. Therefore, the disclosed exemplary embodiments are to be considered in an illustrative sense rather than a restrictive sense. The scope of the present invention is indicated by the claims rather than the foregoing description, and all differences within the scope equivalent thereto should be construed as being included in the present invention.

GOVERNMENT SUPPORT

This study was supported by the National R&D Program for Dementia (HU20C0326, Project ID: 9991007689, Ministry of Health and Welfare & Ministry of Science and ICT, managed by the Korea Health Industry Development Institute), and was carried out by the Seoul National University R&DB Foundation under the project titled "Analysis of the binding proteome of TREM2 in MAM using Spot-TurboID to elucidate the pathogenesis of Alzheimer's disease.

INDUSTRIAL APPLICABILITY

The novel compounds according to the present invention can be photo-crosslinked with a protein or peptide that physically interacts with a target protein or target nucleic acid by the property of being photo-crosslinked to the proximal protein or peptide by irradiation with visible light by binding to the target protein or target nucleic acid, and thus, there are advantages in that it is possible to overcome diffusive labeling, which is a limitation of the conventional proximity labeling technology, by photo-crosslinking by visible light irradiation, which is a safe method for a living body, and to improve the accuracy of protein interactome identification.

The invention claimed is:

1. A compound represented by [Chemical Formula 1'] below:

[Chemical Formula 1']

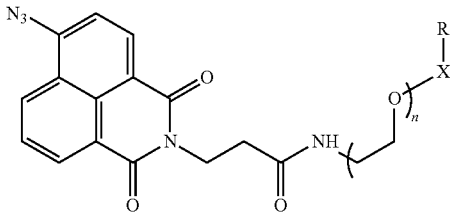

wherein in [Chemical Formula 1'] above,
n is an integer of 0 to 10,
X is straight-chain or branched $-(CH_2)m-$, m is an integer of 1 to 20, and R is a halogen.

2. The compound of claim 1, wherein the compound is a compound represented by [Chemical Formula 3] below:

[Chemical Formula 3]

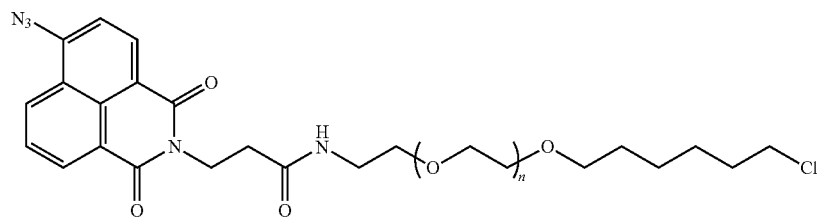

wherein in [Chemical Formula 3] above, n is an integer of 1 to 5.

3. The compound of claim 1, wherein the compound has protein-binding ability.

4. The compound of claim 1, wherein the compound is able to be bound to a target protein or target nucleic acid, and upon binding with the target protein or target nucleic acid, the target protein or target nucleic acid having the compound bound thereto is able to be photo-crosslinked via the compound to a protein or peptide that interacts with the target protein or target nucleic acid.

5. The compound of claim 4, wherein the target protein is an antibody or peptide.

6. The compound of claim 4, wherein the target nucleic acid is DNA or RNA.

7. The compound of claim 4, wherein the target protein or target nucleic acid having the compound bound thereto is able to be photo-crosslinked via the compound to the protein or peptide that interacts with the target protein or target nucleic acid by irradiation with visible light.

8. The compound of claim 4, wherein the radius of the photo-crosslinking is 0.01 to 1 nm.

9. A method for identifying an interacting protein of a target protein, comprising the steps of:
(a) expressing a target protein in a cell;
(b) treating the cell with the compound of claim 1;
(c) irradiating visible light to the cell; and
(d) lysing the cell to identify the protein that is photo-crosslinked with the compound as an interacting protein of the target protein.

10. The method of claim 9, wherein the target protein is conjugated with an epitope peptide tag.

11. The method of claim 10, wherein in step (d), the target protein is precipitated with an epitope peptide-specific antibody to identify the protein that is photo-crosslinked with the compound as an interacting protein of the target protein.

12. The method of claim 9, wherein step (d) is identified by mass spectrometry.

\* \* \* \* \*

SEQUENCE LISTING

<160> NUMBER OF SEQ ID NOS: 50

<210> SEQ ID NO 1
<211> LENGTH: 15
<212> TYPE: PRT
<213> ORGANISM: Artificial Sequence
<220> FEATURE:
<223> OTHER INFORMATION: AviTag

<400> SEQUENCE: 1

Gly Leu Asn Asp Ile Phe Glu Ala Gln Lys Ile Glu Trp His Glu
1               5                   10                  15

<210> SEQ ID NO 2
<211> LENGTH: 14
<212> TYPE: PRT
<213> ORGANISM: Artificial Sequence
<220> FEATURE:
<223> OTHER INFORMATION: V5

<400> SEQUENCE: 2

Gly Lys Pro Ile Pro Asn Pro Leu Leu Gly Leu Asp Ser Thr
1               5                   10

<210> SEQ ID NO 3
<211> LENGTH: 14
<212> TYPE: PRT
<213> ORGANISM: Artificial Sequence
<220> FEATURE:
<223> OTHER INFORMATION: TEV

<400> SEQUENCE: 3

Glu Asn Leu Tyr Phe Gln Ser Glu Asn Leu Tyr Phe Gln Ser
1               5                   10

<210> SEQ ID NO 4
<211> LENGTH: 8
<212> TYPE: PRT
<213> ORGANISM: Artificial Sequence
<220> FEATURE:
<223> OTHER INFORMATION: Flag

<400> SEQUENCE: 4

Asp Tyr Lys Asp Asp Asp Asp Lys
1               5

<210> SEQ ID NO 5
<211> LENGTH: 9
<212> TYPE: PRT
<213> ORGANISM: Artificial Sequence
<220> FEATURE:
<223> OTHER INFORMATION: HA

<400> SEQUENCE: 5

Tyr Pro Tyr Asp Val Pro Asp Tyr Ala
1               5

<210> SEQ ID NO 6
<211> LENGTH: 13
<212> TYPE: PRT
<213> ORGANISM: Artificial Sequence
<220> FEATURE:
<223> OTHER INFORMATION: Linker

<400> SEQUENCE: 6

Gly Ala Pro Gly Ser Ala Gly Ser Ala Ala Gly Ser Gly
1               5                   10

<210> SEQ ID NO 7
<211> LENGTH: 10
<212> TYPE: PRT
<213> ORGANISM: Artificial Sequence
<220> FEATURE:
<223> OTHER INFORMATION: Linker

<400> SEQUENCE: 7

Gly Gly Ser Gly Asp Pro Pro Val Ala Thr
1               5                   10

<210> SEQ ID NO 8
<211> LENGTH: 8
<212> TYPE: PRT
<213> ORGANISM: Artificial Sequence
<220> FEATURE:
<223> OTHER INFORMATION: Strep2

<400> SEQUENCE: 8

Trp Ser His Pro Gln Phe Glu Lys
1               5

<210> SEQ ID NO 9
<211> LENGTH: 4
<212> TYPE: PRT
<213> ORGANISM: Artificial Sequence
<220> FEATURE:
<223> OTHER INFORMATION: Linker

<400> SEQUENCE: 9

Gly Gly Ser Gly
1

<210> SEQ ID NO 10
<211> LENGTH: 562
<212> TYPE: PRT
<213> ORGANISM: Artificial Sequence
<220> FEATURE:
<223> OTHER INFORMATION: FKBP25-V5-HaloTag (64kDa)

<400> SEQUENCE: 10

Met Ala Ala Ala Val Pro Gln Arg Ala Trp Thr Val Glu Gln Leu Arg
1               5                   10                  15

Ser Glu Gln Leu Pro Lys Lys Asp Ile Ile Lys Phe Leu Gln Glu His
            20                  25                  30

Gly Ser Asp Ser Phe Leu Ala Glu His Lys Leu Leu Gly Asn Ile Lys
        35                  40                  45

Asn Val Ala Lys Thr Ala Asn Lys Asp His Leu Val Thr Ala Tyr Asn
    50                  55                  60

His Leu Phe Glu Thr Lys Arg Phe Lys Gly Thr Glu Ser Ile Ser Lys
65                  70                  75                  80

Val Ser Glu Gln Val Lys Asn Val Lys Leu Asn Glu Asp Lys Pro Lys
                85                  90                  95

Glu Thr Lys Ser Glu Glu Thr Leu Asp Glu Gly Pro Pro Lys Tyr Thr
            100                 105                 110

Lys Ser Val Leu Lys Lys Gly Asp Lys Thr Asn Phe Pro Lys Lys Gly
        115                 120                 125

Asp Val Val His Cys Trp Tyr Thr Gly Thr Leu Gln Asp Gly Thr Val
    130                 135                 140

Phe Asp Thr Asn Ile Gln Thr Ser Ala Lys Lys Lys Lys Asn Ala Lys
145                 150                 155                 160

```
Pro Leu Ser Phe Lys Val Gly Val Gly Lys Val Ile Arg Gly Trp Asp
                165                 170                 175

Glu Ala Leu Leu Thr Met Ser Lys Gly Glu Lys Ala Arg Leu Glu Ile
            180                 185                 190

Glu Pro Glu Trp Ala Tyr Gly Lys Lys Gly Gln Pro Asp Ala Lys Ile
        195                 200                 205

Pro Pro Asn Ala Lys Leu Thr Phe Glu Val Glu Leu Val Asp Ile Asp
    210                 215                 220

Lys Asp Pro Leu Ala Gly Lys Pro Ile Pro Asn Pro Leu Leu Gly Leu
225                 230                 235                 240

Asp Ser Thr Met Ala Glu Ile Gly Thr Gly Phe Pro Phe Asp Pro His
                245                 250                 255

Tyr Val Glu Val Leu Gly Glu Arg Met His Tyr Val Asp Val Gly Pro
            260                 265                 270

Arg Asp Gly Thr Pro Val Leu Phe Leu His Gly Asn Pro Thr Ser Ser
        275                 280                 285

Tyr Val Trp Arg Asn Ile Ile Pro His Val Ala Pro Thr His Arg Cys
    290                 295                 300

Ile Ala Pro Asp Leu Ile Gly Met Gly Lys Ser Asp Lys Pro Asp Leu
305                 310                 315                 320

Gly Tyr Phe Phe Asp Asp His Val Arg Phe Met Asp Ala Phe Ile Glu
                325                 330                 335

Ala Leu Gly Leu Glu Glu Val Val Leu Val Ile His Asp Trp Gly Ser
            340                 345                 350

Ala Leu Gly Phe His Trp Ala Lys Arg Asn Pro Glu Arg Val Lys Gly
        355                 360                 365

Ile Ala Phe Met Glu Phe Ile Arg Pro Ile Pro Thr Trp Asp Glu Trp
    370                 375                 380

Pro Glu Phe Ala Arg Glu Thr Phe Gln Ala Phe Arg Thr Thr Asp Val
385                 390                 395                 400

Gly Arg Lys Leu Ile Ile Asp Gln Asn Val Phe Ile Glu Gly Thr Leu
                405                 410                 415

Pro Met Gly Val Val Arg Pro Leu Thr Glu Val Glu Met Asp His Tyr
            420                 425                 430

Arg Glu Pro Phe Leu Asn Pro Val Asp Arg Glu Pro Leu Trp Arg Phe
        435                 440                 445

Pro Asn Glu Leu Pro Ile Ala Gly Glu Pro Ala Asn Ile Val Ala Leu
    450                 455                 460

Val Glu Glu Tyr Met Asp Trp Leu His Gln Ser Pro Val Pro Lys Leu
465                 470                 475                 480

Leu Phe Trp Gly Thr Pro Gly Val Leu Ile Pro Pro Ala Glu Ala Ala
                485                 490                 495

Arg Leu Ala Lys Ser Leu Pro Asn Cys Lys Ala Val Asp Ile Gly Pro
            500                 505                 510

Gly Leu Asn Leu Leu Gln Glu Asp Asn Pro Asp Leu Ile Gly Ser Glu
        515                 520                 525

Ile Ala Arg Trp Leu Ser Thr Leu Glu Ile Ser Gly Glu Asn Leu Tyr
    530                 535                 540

Phe Gln Ser Gly Leu Asn Asp Ile Phe Glu Ala Gln Lys Ile Glu Trp
545                 550                 555                 560

His Glu
```

<210> SEQ ID NO 11
<211> LENGTH: 31
<212> TYPE: DNA
<213> ORGANISM: Artificial Sequence
<220> FEATURE:
<223> OTHER INFORMATION: Forward Primer for FKBP25-V5-HaloTag (64kDa)

<400> SEQUENCE: 11
tagtagggta ccatggcggc ggccgttcca c                            31

<210> SEQ ID NO 12
<211> LENGTH: 52
<212> TYPE: DNA
<213> ORGANISM: Artificial Sequence
<220> FEATURE:
<223> OTHER INFORMATION: Reverse Primer for FKBP25-V5-HaloTag (64kDa)

<400> SEQUENCE: 12
tagtaggcta gcggatcctt atcaatatcc actaattcca cttcaaaagt ga     52

<210> SEQ ID NO 13
<211> LENGTH: 352
<212> TYPE: PRT
<213> ORGANISM: Artificial Sequence
<220> FEATURE:
<223> OTHER INFORMATION: EGFP-FRB (48kDa)

<400> SEQUENCE: 13

Met Ala Ser Arg Ile Leu Trp His Glu Met Trp His Glu Gly Leu Glu
1               5                   10                  15

Glu Ala Ser Arg Leu Tyr Phe Gly Glu Arg Asn Val Lys Gly Met Phe
            20                  25                  30

Glu Val Leu Glu Pro Leu His Ala Met Met Glu Arg Gly Pro Gln Thr
        35                  40                  45

Leu Lys Glu Thr Ser Phe Asn Gln Ala Tyr Gly Arg Asp Leu Met Glu
    50                  55                  60

Ala Gln Glu Trp Cys Arg Lys Tyr Met Lys Ser Gly Asn Val Lys Asp
65                  70                  75                  80

Leu Leu Gln Ala Trp Asp Leu Tyr Tyr His Val Phe Arg Arg Ile Ser
                85                  90                  95

Lys Thr Ser Lys Leu Ala Ala Ala Val Ser Lys Gly Glu Glu Leu Phe
            100                 105                 110

Thr Gly Val Val Pro Ile Leu Val Glu Leu Asp Gly Asp Val Asn Gly
        115                 120                 125

His Lys Phe Ser Val Ser Gly Glu Gly Glu Gly Asp Ala Thr Tyr Gly
    130                 135                 140

Lys Leu Thr Leu Lys Phe Ile Cys Thr Thr Gly Lys Leu Pro Val Pro
145                 150                 155                 160

Trp Pro Thr Leu Val Thr Thr Leu Thr Tyr Gly Val Gln Cys Phe Ser
                165                 170                 175

Arg Tyr Pro Asp His Met Lys Gln His Asp Phe Phe Lys Ser Ala Met
            180                 185                 190

Pro Glu Gly Tyr Val Gln Glu Arg Thr Ile Phe Phe Lys Asp Asp Gly
        195                 200                 205

Asn Tyr Lys Thr Arg Ala Glu Val Lys Phe Glu Gly Asp Thr Leu Val
    210                 215                 220

Asn Arg Ile Glu Leu Lys Gly Ile Asp Phe Lys Glu Asp Gly Asn Ile
225                 230                 235                 240

Leu Gly His Lys Leu Glu Tyr Asn Tyr Asn Ser His Asn Val Tyr Ile

```
            245                 250                 255
Met Ala Asp Lys Gln Lys Asn Gly Ile Lys Val Asn Phe Lys Ile Arg
            260                 265                 270

His Asn Ile Asp Asp Gly Ser Val Gln Leu Ala Asp His Tyr Gln Gln
            275                 280                 285

Asn Thr Pro Ile Gly Asp Gly Pro Val Leu Leu Pro Asp Asn His Tyr
            290                 295                 300

Leu Ser Thr Gln Ser Ala Leu Ser Lys Asp Pro Asn Glu Lys Arg Asp
305                 310                 315                 320

His Met Val Leu Leu Glu Phe Val Thr Ala Ala Gly Ile Thr Leu Gly
            325                 330                 335

Met Asp Glu Leu Tyr Lys Gly Gly Ser Gly Gly Ser Gly Gly Ser Arg
            340                 345                 350

<210> SEQ ID NO 14
<211> LENGTH: 48
<212> TYPE: DNA
<213> ORGANISM: Artificial Sequence
<220> FEATURE:
<223> OTHER INFORMATION: Forward primer for EGFP-FRB (48kDa)

<400> SEQUENCE: 14
tagtaggcgg ccgccaccat ggcttctaga atcctctggc atgagatg                    48

<210> SEQ ID NO 15
<211> LENGTH: 45
<212> TYPE: DNA
<213> ORGANISM: Artificial Sequence
<220> FEATURE:
<223> OTHER INFORMATION: Reverse primer for EGFP-FRB (48kDa)

<400> SEQUENCE: 15
tagtagctcg agtcattatc tagatccacc agatccacca gatcc                       45

<210> SEQ ID NO 16
<211> LENGTH: 224
<212> TYPE: PRT
<213> ORGANISM: Artificial Sequence
<220> FEATURE:
<223> OTHER INFORMATION: FKBP25

<400> SEQUENCE: 16

Met Ala Ala Ala Val Pro Gln Arg Ala Trp Thr Val Glu Gln Leu Arg
1               5                   10                  15

Ser Glu Gln Leu Pro Lys Lys Asp Ile Ile Lys Phe Leu Gln Glu His
            20                  25                  30

Gly Ser Asp Ser Phe Leu Ala Glu His Lys Leu Leu Gly Asn Ile Lys
        35                  40                  45

Asn Val Ala Lys Thr Ala Asn Lys Asp His Leu Val Thr Ala Tyr Asn
    50                  55                  60

His Leu Phe Glu Thr Lys Arg Phe Lys Gly Thr Glu Ser Ile Ser Lys
65                  70                  75                  80

Val Ser Glu Gln Val Lys Asn Val Lys Leu Asn Glu Asp Lys Pro Lys
            85                  90                  95

Glu Thr Lys Ser Glu Glu Thr Leu Asp Glu Gly Pro Pro Lys Tyr Thr
            100                 105                 110

Lys Ser Val Leu Lys Lys Gly Asp Lys Thr Asn Phe Pro Lys Lys Gly
        115                 120                 125

Asp Val Val His Cys Trp Tyr Thr Gly Thr Leu Gln Asp Gly Thr Val
```

```
                130                 135                 140
Phe Asp Thr Asn Ile Gln Thr Ser Ala Lys Lys Lys Asn Ala Lys
145                 150                 155                 160

Pro Leu Ser Phe Lys Val Gly Val Gly Lys Val Ile Arg Gly Trp Asp
                165                 170                 175

Glu Ala Leu Leu Thr Met Ser Lys Gly Glu Lys Ala Arg Leu Glu Ile
                180                 185                 190

Glu Pro Glu Trp Ala Tyr Gly Lys Lys Gly Gln Pro Asp Ala Lys Ile
                195                 200                 205

Pro Pro Asn Ala Lys Leu Thr Phe Glu Val Glu Leu Val Asp Ile Asp
            210                 215                 220

<210> SEQ ID NO 17
<211> LENGTH: 99
<212> TYPE: PRT
<213> ORGANISM: Artificial Sequence
<220> FEATURE:
<223> OTHER INFORMATION: FRB

<400> SEQUENCE: 17

Met Ala Ser Arg Ile Leu Trp His Glu Met Trp His Glu Gly Leu Glu
1               5                   10                  15

Glu Ala Ser Arg Leu Tyr Phe Gly Glu Arg Asn Val Lys Gly Met Phe
                20                  25                  30

Glu Val Leu Glu Pro Leu His Ala Met Met Glu Arg Gly Pro Gln Thr
            35                  40                  45

Leu Lys Glu Thr Ser Phe Asn Gln Ala Tyr Gly Arg Asp Leu Met Glu
    50                  55                  60

Ala Gln Glu Trp Cys Arg Lys Tyr Met Lys Ser Gly Asn Val Lys Asp
65                  70                  75                  80

Leu Leu Gln Ala Trp Asp Leu Tyr Tyr His Val Phe Arg Arg Ile Ser
                85                  90                  95

Lys Thr Ser

<210> SEQ ID NO 18
<211> LENGTH: 297
<212> TYPE: PRT
<213> ORGANISM: Artificial Sequence
<220> FEATURE:
<223> OTHER INFORMATION: HaloTag

<400> SEQUENCE: 18

Met Ala Glu Ile Gly Thr Gly Phe Pro Phe Asp Pro His Tyr Val Glu
1               5                   10                  15

Val Leu Gly Glu Arg Met His Tyr Val Asp Val Gly Pro Arg Asp Gly
                20                  25                  30

Thr Pro Val Leu Phe Leu His Gly Asn Pro Thr Ser Ser Tyr Val Trp
            35                  40                  45

Arg Asn Ile Ile Pro His Val Ala Pro Thr His Arg Cys Ile Ala Pro
    50                  55                  60

Asp Leu Ile Gly Met Gly Lys Ser Asp Lys Pro Asp Leu Gly Tyr Phe
65                  70                  75                  80

Phe Asp Asp His Val Arg Phe Met Asp Ala Phe Ile Glu Ala Leu Gly
                85                  90                  95

Leu Glu Glu Val Val Leu Val Ile His Asp Trp Gly Ser Ala Leu Gly
                100                 105                 110

Phe His Trp Ala Lys Arg Asn Pro Glu Arg Val Lys Gly Ile Ala Phe
```

```
                 115                 120                 125
Met Glu Phe Ile Arg Pro Ile Pro Thr Trp Asp Glu Trp Pro Glu Phe
    130                 135                 140

Ala Arg Glu Thr Phe Gln Ala Phe Arg Thr Thr Asp Val Gly Arg Lys
145                 150                 155                 160

Leu Ile Ile Asp Gln Asn Val Phe Ile Glu Gly Thr Leu Pro Met Gly
                165                 170                 175

Val Val Arg Pro Leu Thr Glu Val Glu Met Asp His Tyr Arg Glu Pro
            180                 185                 190

Phe Leu Asn Pro Val Asp Arg Glu Pro Leu Trp Arg Phe Pro Asn Glu
        195                 200                 205

Leu Pro Ile Ala Gly Glu Pro Ala Asn Ile Val Ala Leu Val Glu Glu
    210                 215                 220

Tyr Met Asp Trp Leu His Gln Ser Pro Val Pro Lys Leu Leu Phe Trp
225                 230                 235                 240

Gly Thr Pro Gly Val Leu Ile Pro Pro Ala Glu Ala Ala Arg Leu Ala
                245                 250                 255

Lys Ser Leu Pro Asn Cys Lys Ala Val Asp Ile Gly Pro Gly Leu Asn
            260                 265                 270

Leu Leu Gln Glu Asp Asn Pro Asp Leu Ile Gly Ser Glu Ile Ala Arg
        275                 280                 285

Trp Leu Ser Thr Leu Glu Ile Ser Gly
    290                 295

<210> SEQ ID NO 19
<211> LENGTH: 757
<212> TYPE: PRT
<213> ORGANISM: Artificial Sequence
<220> FEATURE:
<223> OTHER INFORMATION: FKBP12-HaloTag-TurboID-Flag

<400> SEQUENCE: 19

Met Gly Val Gln Val Glu Thr Ile Ser Pro Gly Asp Gly Arg Thr Phe
1               5                   10                  15

Pro Lys Arg Gly Gln Thr Cys Val Val His Tyr Thr Gly Met Leu Glu
            20                  25                  30

Asp Gly Lys Lys Phe Asp Ser Ser Arg Asp Arg Asn Lys Pro Phe Lys
        35                  40                  45

Phe Met Leu Gly Lys Gln Glu Val Ile Arg Gly Trp Glu Glu Gly Val
    50                  55                  60

Ala Gln Met Ser Val Gly Gln Arg Ala Lys Leu Thr Ile Ser Pro Asp
65                  70                  75                  80

Tyr Ala Tyr Gly Ala Thr Gly His Pro Gly Ile Ile Pro Pro His Ala
                85                  90                  95

Thr Leu Val Phe Asp Val Glu Leu Leu Lys Leu Glu Lys Leu Ala Met
            100                 105                 110

Ala Glu Ile Gly Thr Gly Phe Pro Phe Asp Pro His Tyr Val Glu Val
        115                 120                 125

Leu Gly Glu Arg Met His Tyr Val Asp Val Gly Pro Arg Asp Gly Thr
    130                 135                 140

Pro Val Leu Phe Leu His Gly Asn Pro Thr Ser Ser Tyr Val Trp Arg
145                 150                 155                 160

Asn Ile Ile Pro His Val Ala Pro Thr His Arg Cys Ile Ala Pro Asp
                165                 170                 175

Leu Ile Gly Met Gly Lys Ser Asp Lys Pro Asp Leu Gly Tyr Phe Phe
```

```
                180                 185                 190
Asp Asp His Val Arg Phe Met Asp Ala Phe Ile Glu Ala Leu Gly Leu
            195                 200                 205
Glu Glu Val Val Leu Val Ile His Asp Trp Gly Ser Ala Leu Gly Phe
            210                 215                 220
His Trp Ala Lys Arg Asn Pro Glu Arg Val Lys Gly Ile Ala Phe Met
225                 230                 235                 240
Glu Phe Ile Arg Pro Ile Pro Thr Trp Asp Glu Trp Pro Glu Phe Ala
                245                 250                 255
Arg Glu Thr Phe Gln Ala Phe Arg Thr Thr Asp Val Gly Arg Lys Leu
            260                 265                 270
Ile Ile Asp Gln Asn Val Phe Ile Glu Gly Thr Leu Pro Met Gly Val
            275                 280                 285
Val Arg Pro Leu Thr Glu Val Glu Met Asp His Tyr Arg Glu Pro Phe
            290                 295                 300
Leu Asn Pro Val Asp Arg Glu Pro Leu Trp Arg Phe Pro Asn Glu Leu
305                 310                 315                 320
Pro Ile Ala Gly Glu Pro Ala Asn Ile Val Ala Leu Val Glu Glu Tyr
                325                 330                 335
Met Asp Trp Leu His Gln Ser Pro Val Pro Lys Leu Leu Phe Trp Gly
                340                 345                 350
Thr Pro Gly Val Leu Ile Pro Pro Ala Glu Ala Ala Arg Leu Ala Lys
            355                 360                 365
Ser Leu Pro Asn Cys Lys Ala Val Asp Ile Gly Pro Gly Leu Asn Leu
            370                 375                 380
Leu Gln Glu Asp Asn Pro Asp Leu Ile Gly Ser Glu Ile Ala Arg Trp
385                 390                 395                 400
Leu Ser Thr Leu Glu Ile Ser Gly Lys Asp Pro Gly Lys Pro Ile Pro
                405                 410                 415
Asn Pro Leu Leu Gly Leu Asp Ser Thr Lys Asp Asn Thr Val Pro Leu
            420                 425                 430
Lys Leu Ile Ala Leu Leu Ala Asn Gly Glu Phe His Ser Gly Glu Gln
            435                 440                 445
Leu Gly Glu Thr Leu Gly Met Ser Arg Ala Ala Ile Asn Lys His Ile
            450                 455                 460
Gln Thr Leu Arg Asp Trp Gly Val Asp Val Phe Thr Val Pro Gly Lys
465                 470                 475                 480
Gly Tyr Ser Leu Pro Glu Pro Ile Pro Leu Leu Asn Ala Lys Gln Ile
                485                 490                 495
Leu Gly Gln Leu Asp Gly Gly Ser Val Ala Val Leu Pro Val Val Asp
            500                 505                 510
Ser Thr Asn Gln Tyr Leu Leu Asp Arg Ile Gly Glu Leu Lys Ser Gly
            515                 520                 525
Asp Ala Cys Ile Ala Glu Tyr Gln Gln Ala Gly Arg Gly Ser Arg Gly
            530                 535                 540
Arg Lys Trp Phe Ser Pro Phe Gly Ala Asn Leu Tyr Leu Ser Met Phe
545                 550                 555                 560
Trp Arg Leu Lys Arg Gly Pro Ala Ala Ile Gly Leu Gly Pro Val Ile
                565                 570                 575
Gly Ile Val Met Ala Glu Ala Leu Arg Lys Leu Gly Ala Asp Lys Val
                580                 585                 590
Arg Val Lys Trp Pro Asn Asp Leu Tyr Leu Gln Asp Arg Lys Leu Ala
            595                 600                 605
```

```
Gly Ile Leu Val Glu Leu Ala Gly Ile Thr Gly Asp Ala Ala Gln Ile
            610                 615                 620

Val Ile Gly Ala Gly Ile Asn Val Ala Met Arg Arg Val Glu Glu Ser
625                 630                 635                 640

Val Val Asn Gln Gly Trp Ile Thr Leu Gln Glu Ala Gly Ile Asn Leu
                645                 650                 655

Asp Arg Asn Thr Leu Ala Ala Thr Leu Ile Arg Glu Leu Arg Ala Ala
                660                 665                 670

Leu Glu Leu Phe Glu Gln Gly Leu Ala Pro Tyr Leu Pro Arg Trp
            675                 680                 685

Glu Lys Leu Asp Asn Phe Ile Asn Arg Pro Val Lys Leu Ile Ile Gly
            690                 695                 700

Asp Lys Glu Ile Phe Gly Ile Ser Arg Gly Ile Asp Lys Gln Gly Ala
705                 710                 715                 720

Leu Leu Leu Glu Gln Asp Gly Val Ile Lys Pro Trp Met Gly Glu
                725                 730                 735

Ile Ser Leu Arg Ser Ala Glu Lys Asp Tyr Lys Asp Asp Asp Lys
            740                 745                 750

Ala Ala Ala Arg Val
        755

<210> SEQ ID NO 20
<211> LENGTH: 37
<212> TYPE: DNA
<213> ORGANISM: Artificial Sequence
<220> FEATURE:
<223> OTHER INFORMATION: Forward primer for FKBP12-HaloTag-TurboID-Flag

<400> SEQUENCE: 20
tagtagggta ccatgggagt gcaggtggaa accatct                                37

<210> SEQ ID NO 21
<211> LENGTH: 45
<212> TYPE: DNA
<213> ORGANISM: Artificial Sequence
<220> FEATURE:
<223> OTHER INFORMATION: Reverse primer for FKBP12-HaloTag-TurboID-Flag

<400> SEQUENCE: 21
tagtaggcta gcttttccag ttttagaagc tccacatcga agacg                       45

<210> SEQ ID NO 22
<211> LENGTH: 108
<212> TYPE: PRT
<213> ORGANISM: Artificial Sequence
<220> FEATURE:
<223> OTHER INFORMATION: FKBP12

<400> SEQUENCE: 22

Met Gly Val Gln Val Glu Thr Ile Ser Pro Gly Asp Gly Arg Thr Phe
1               5                   10                  15

Pro Lys Arg Gly Gln Thr Cys Val Val His Tyr Thr Gly Met Leu Glu
            20                  25                  30

Asp Gly Lys Lys Phe Asp Ser Ser Arg Asp Arg Asn Lys Pro Phe Lys
        35                  40                  45

Phe Met Leu Gly Lys Gln Glu Val Ile Arg Gly Trp Glu Glu Gly Val
    50                  55                  60

Ala Gln Met Ser Val Gly Gln Arg Ala Lys Leu Thr Ile Ser Pro Asp
65                  70                  75                  80
```

-continued

Tyr Ala Tyr Gly Ala Thr Gly His Pro Gly Ile Ile Pro Pro His Ala
                85                  90                  95

Thr Leu Val Phe Asp Val Glu Leu Leu Lys Leu Glu
                100                 105

<210> SEQ ID NO 23
<211> LENGTH: 320
<212> TYPE: PRT
<213> ORGANISM: Artificial Sequence
<220> FEATURE:
<223> OTHER INFORMATION: TurboID

<400> SEQUENCE: 23

Met Lys Asp Asn Thr Val Pro Leu Lys Leu Ile Ala Leu Leu Ala Asn
1               5                   10                  15

Gly Glu Phe His Ser Gly Glu Gln Leu Gly Thr Leu Gly Met Ser
                20                  25                  30

Arg Ala Ala Ile Asn Lys His Ile Gln Thr Leu Arg Asp Trp Gly Val
                35                  40                  45

Asp Val Phe Thr Val Pro Gly Lys Gly Tyr Ser Leu Pro Glu Pro Ile
        50                  55                  60

Pro Leu Leu Asn Ala Lys Gln Ile Leu Gly Gln Leu Asp Gly Gly Ser
65                  70                  75                  80

Val Ala Val Leu Pro Val Val Asp Ser Thr Asn Gln Tyr Leu Leu Asp
                85                  90                  95

Arg Ile Gly Glu Leu Lys Ser Gly Asp Ala Cys Ile Ala Glu Tyr Gln
                100                 105                 110

Gln Ala Gly Arg Gly Ser Arg Gly Arg Lys Trp Phe Ser Pro Phe Gly
                115                 120                 125

Ala Asn Leu Tyr Leu Ser Met Phe Trp Arg Leu Lys Arg Gly Pro Ala
            130                 135                 140

Ala Ile Gly Leu Gly Pro Val Ile Gly Ile Val Met Ala Glu Ala Leu
145                 150                 155                 160

Arg Lys Leu Gly Ala Asp Lys Val Arg Val Lys Trp Pro Asn Asp Leu
                165                 170                 175

Tyr Leu Gln Asp Arg Lys Leu Ala Gly Ile Leu Val Glu Leu Ala Gly
                180                 185                 190

Ile Thr Gly Asp Ala Ala Gln Ile Val Ile Gly Ala Gly Ile Asn Val
            195                 200                 205

Ala Met Arg Arg Val Glu Glu Ser Val Val Asn Gln Gly Trp Ile Thr
210                 215                 220

Leu Gln Glu Ala Gly Ile Asn Leu Asp Arg Asn Thr Leu Ala Ala Thr
225                 230                 235                 240

Leu Ile Arg Glu Leu Arg Ala Ala Leu Glu Leu Phe Glu Gln Glu Gly
                245                 250                 255

Leu Ala Pro Tyr Leu Pro Arg Trp Glu Lys Leu Asp Asn Phe Ile Asn
                260                 265                 270

Arg Pro Val Lys Leu Ile Ile Gly Asp Lys Glu Ile Phe Gly Ile Ser
            275                 280                 285

Arg Gly Ile Asp Lys Gln Gly Ala Leu Leu Glu Gln Asp Gly Val
            290                 295                 300

Ile Lys Pro Trp Met Gly Gly Glu Ile Ser Leu Arg Ser Ala Glu Lys
305                 310                 315                 320

<210> SEQ ID NO 24

```
<211> LENGTH: 997
<212> TYPE: PRT
<213> ORGANISM: Artificial Sequence
<220> FEATURE:
<223> OTHER INFORMATION: Lamin-AC-V5-HaloTag

<400> SEQUENCE: 24
```

| Met | Gly | Leu | Asn | Asp | Ile | Phe | Glu | Ala | Gln | Lys | Ile | Glu | Trp | His | Glu |
|---|---|---|---|---|---|---|---|---|---|---|---|---|---|---|---|
| 1 | | | | 5 | | | | | 10 | | | | | 15 | |

| Ala | Ser | Gly | Lys | Pro | Ile | Pro | Asn | Pro | Leu | Leu | Gly | Leu | Asp | Ser | Thr |
|---|---|---|---|---|---|---|---|---|---|---|---|---|---|---|---|
| | | | 20 | | | | | 25 | | | | | 30 | | |

| Met | Ala | Glu | Ile | Gly | Thr | Gly | Phe | Pro | Phe | Asp | Pro | His | Tyr | Val | Glu |
|---|---|---|---|---|---|---|---|---|---|---|---|---|---|---|---|
| | | 35 | | | | | 40 | | | | | 45 | | | |

| Val | Leu | Gly | Glu | Arg | Met | His | Tyr | Val | Asp | Val | Gly | Pro | Arg | Asp | Gly |
|---|---|---|---|---|---|---|---|---|---|---|---|---|---|---|---|
| | 50 | | | | | 55 | | | | | 60 | | | | |

| Thr | Pro | Val | Leu | Phe | Leu | His | Gly | Asn | Pro | Thr | Ser | Ser | Tyr | Val | Trp |
|---|---|---|---|---|---|---|---|---|---|---|---|---|---|---|---|
| 65 | | | | | 70 | | | | | 75 | | | | | 80 |

| Arg | Asn | Ile | Ile | Pro | His | Val | Ala | Pro | Thr | His | Arg | Cys | Ile | Ala | Pro |
|---|---|---|---|---|---|---|---|---|---|---|---|---|---|---|---|
| | | | | 85 | | | | | 90 | | | | | 95 | |

| Asp | Leu | Ile | Gly | Met | Gly | Lys | Ser | Asp | Lys | Pro | Asp | Leu | Gly | Tyr | Phe |
|---|---|---|---|---|---|---|---|---|---|---|---|---|---|---|---|
| | | | | 100 | | | | | 105 | | | | | 110 | |

| Phe | Asp | Asp | His | Val | Arg | Phe | Met | Asp | Ala | Phe | Ile | Glu | Ala | Leu | Gly |
|---|---|---|---|---|---|---|---|---|---|---|---|---|---|---|---|
| | | | 115 | | | | | 120 | | | | | 125 | | |

| Leu | Glu | Glu | Val | Val | Leu | Val | Ile | His | Asp | Trp | Gly | Ser | Ala | Leu | Gly |
|---|---|---|---|---|---|---|---|---|---|---|---|---|---|---|---|
| | 130 | | | | | 135 | | | | | 140 | | | | |

| Phe | His | Trp | Ala | Lys | Arg | Asn | Pro | Glu | Arg | Val | Lys | Gly | Ile | Ala | Phe |
|---|---|---|---|---|---|---|---|---|---|---|---|---|---|---|---|
| 145 | | | | | 150 | | | | | 155 | | | | | 160 |

| Met | Glu | Phe | Ile | Arg | Pro | Ile | Pro | Thr | Trp | Asp | Glu | Trp | Pro | Glu | Phe |
|---|---|---|---|---|---|---|---|---|---|---|---|---|---|---|---|
| | | | | 165 | | | | | 170 | | | | | 175 | |

| Ala | Arg | Glu | Thr | Phe | Gln | Ala | Phe | Arg | Thr | Thr | Asp | Val | Gly | Arg | Lys |
|---|---|---|---|---|---|---|---|---|---|---|---|---|---|---|---|
| | | | | 180 | | | | | 185 | | | | | 190 | |

| Leu | Ile | Ile | Asp | Gln | Asn | Val | Phe | Ile | Glu | Gly | Thr | Leu | Pro | Met | Gly |
|---|---|---|---|---|---|---|---|---|---|---|---|---|---|---|---|
| | | | 195 | | | | | 200 | | | | | 205 | | |

| Val | Val | Arg | Pro | Leu | Thr | Glu | Val | Glu | Met | Asp | His | Tyr | Arg | Glu | Pro |
|---|---|---|---|---|---|---|---|---|---|---|---|---|---|---|---|
| | 210 | | | | | 215 | | | | | 220 | | | | |

| Phe | Leu | Asn | Pro | Val | Asp | Arg | Glu | Pro | Leu | Trp | Arg | Phe | Pro | Asn | Glu |
|---|---|---|---|---|---|---|---|---|---|---|---|---|---|---|---|
| 225 | | | | | 230 | | | | | 235 | | | | | 240 |

| Leu | Pro | Ile | Ala | Gly | Glu | Pro | Ala | Asn | Ile | Val | Ala | Leu | Val | Glu | Glu |
|---|---|---|---|---|---|---|---|---|---|---|---|---|---|---|---|
| | | | | 245 | | | | | 250 | | | | | 255 | |

| Tyr | Met | Asp | Trp | Leu | His | Gln | Ser | Pro | Val | Pro | Lys | Leu | Leu | Phe | Trp |
|---|---|---|---|---|---|---|---|---|---|---|---|---|---|---|---|
| | | | | 260 | | | | | 265 | | | | | 270 | |

| Gly | Thr | Pro | Gly | Val | Leu | Ile | Pro | Pro | Ala | Glu | Ala | Ala | Arg | Leu | Ala |
|---|---|---|---|---|---|---|---|---|---|---|---|---|---|---|---|
| | | 275 | | | | | 280 | | | | | 285 | | | |

| Lys | Ser | Leu | Pro | Asn | Cys | Lys | Ala | Val | Asp | Ile | Gly | Pro | Gly | Leu | Asn |
|---|---|---|---|---|---|---|---|---|---|---|---|---|---|---|---|
| | 290 | | | | | 295 | | | | | 300 | | | | |

| Leu | Leu | Gln | Glu | Asp | Asn | Pro | Asp | Leu | Ile | Gly | Ser | Glu | Ile | Ala | Arg |
|---|---|---|---|---|---|---|---|---|---|---|---|---|---|---|---|
| 305 | | | | | 310 | | | | | 315 | | | | | 320 |

| Trp | Leu | Ser | Thr | Leu | Glu | Ile | Ser | Gly | Glu | Phe | Leu | Lys | Met | Glu | Thr |
|---|---|---|---|---|---|---|---|---|---|---|---|---|---|---|---|
| | | | | 325 | | | | | 330 | | | | | 335 | |

| Pro | Ser | Gln | Arg | Arg | Ala | Thr | Arg | Ser | Gly | Ala | Gln | Ala | Ser | Ser | Thr |
|---|---|---|---|---|---|---|---|---|---|---|---|---|---|---|---|
| | | | | 340 | | | | | 345 | | | | | 350 | |

| Pro | Leu | Ser | Pro | Thr | Arg | Ile | Thr | Arg | Leu | Gln | Glu | Lys | Glu | Asp | Leu |
|---|---|---|---|---|---|---|---|---|---|---|---|---|---|---|---|
| | | | 355 | | | | | 360 | | | | | 365 | | |

| Gln | Glu | Leu | Asn | Asp | Arg | Leu | Ala | Val | Tyr | Ile | Asp | Arg | Val | Arg | Ser |
|---|---|---|---|---|---|---|---|---|---|---|---|---|---|---|---|
| | 370 | | | | | 375 | | | | | 380 | | | | |

```
Leu Glu Thr Glu Asn Ala Gly Leu Arg Leu Arg Ile Thr Glu Ser Glu
385                 390                 395                 400

Glu Val Val Ser Arg Glu Val Ser Gly Ile Lys Ala Ala Tyr Glu Ala
            405                 410                 415

Glu Leu Gly Asp Ala Arg Lys Thr Leu Asp Ser Val Ala Lys Glu Arg
            420                 425                 430

Ala Arg Leu Gln Leu Glu Leu Ser Lys Val Arg Glu Glu Phe Lys Glu
            435                 440                 445

Leu Lys Ala Arg Asn Thr Lys Lys Glu Gly Asp Leu Ile Ala Ala Gln
450                 455                 460

Ala Arg Leu Lys Asp Leu Glu Ala Leu Leu Asn Ser Lys Glu Ala Ala
465                 470                 475                 480

Leu Ser Thr Ala Leu Ser Glu Lys Arg Thr Leu Glu Gly Glu Leu His
                485                 490                 495

Asp Leu Arg Gly Gln Val Ala Lys Leu Glu Ala Ala Leu Gly Glu Ala
            500                 505                 510

Lys Lys Gln Leu Gln Asp Glu Met Leu Arg Val Asp Ala Glu Asn
            515                 520                 525

Arg Leu Gln Thr Met Lys Glu Glu Leu Asp Phe Gln Lys Asn Ile Tyr
            530                 535                 540

Ser Glu Glu Leu Arg Glu Thr Lys Arg Arg His Glu Thr Arg Leu Val
545                 550                 555                 560

Glu Ile Asp Asn Gly Lys Gln Arg Glu Phe Glu Ser Arg Leu Ala Asp
                565                 570                 575

Ala Leu Gln Glu Leu Arg Ala Gln His Glu Asp Gln Val Glu Gln Tyr
            580                 585                 590

Lys Lys Glu Leu Glu Lys Thr Tyr Ser Ala Lys Leu Asp Asn Ala Arg
            595                 600                 605

Gln Ser Ala Glu Arg Asn Ser Asn Leu Val Gly Ala Ala His Glu Glu
            610                 615                 620

Leu Gln Gln Ser Arg Ile Arg Ile Asp Ser Leu Ser Ala Gln Leu Ser
625                 630                 635                 640

Gln Leu Gln Lys Gln Leu Ala Ala Lys Glu Ala Lys Leu Arg Asp Leu
                645                 650                 655

Glu Asp Ser Leu Ala Arg Glu Arg Asp Thr Ser Arg Arg Leu Leu Ala
            660                 665                 670

Glu Lys Glu Arg Glu Met Ala Glu Met Arg Ala Arg Met Gln Gln Gln
            675                 680                 685

Leu Asp Glu Tyr Gln Glu Leu Leu Asp Ile Lys Leu Ala Leu Asp Met
690                 695                 700

Glu Ile His Ala Tyr Arg Lys Leu Leu Glu Gly Glu Glu Arg Leu
705                 710                 715                 720

Arg Leu Ser Pro Ser Pro Thr Ser Gln Arg Ser Arg Gly Arg Ala Ser
                725                 730                 735

Ser His Ser Ser Gln Thr Gln Gly Gly Gly Ser Val Thr Lys Lys Arg
            740                 745                 750

Lys Leu Glu Ser Thr Glu Ser Arg Ser Ser Phe Ser Gln His Ala Arg
            755                 760                 765

Thr Ser Gly Arg Val Ala Val Glu Glu Val Asp Glu Glu Gly Lys Phe
            770                 775                 780

Val Arg Leu Arg Asn Lys Ser Asn Glu Asp Gln Ser Met Gly Asn Trp
785                 790                 795                 800
```

-continued

```
Gln Ile Lys Arg Gln Asn Gly Asp Asp Pro Leu Leu Thr Tyr Arg Phe
                805                 810                 815

Pro Pro Lys Phe Thr Leu Lys Ala Gly Gln Val Val Thr Ile Trp Ala
            820                 825                 830

Ala Gly Ala Gly Ala Thr His Ser Pro Pro Thr Asp Leu Val Trp Lys
        835                 840                 845

Ala Gln Asn Thr Trp Gly Cys Gly Asn Ser Leu Arg Thr Ala Leu Ile
    850                 855                 860

Asn Ser Thr Gly Glu Glu Val Ala Met Arg Lys Leu Val Arg Ser Val
865                 870                 875                 880

Thr Val Val Glu Asp Asp Glu Asp Glu Asp Gly Asp Asp Leu Leu His
                885                 890                 895

His His His Gly Ser His Cys Ser Ser Ser Gly Asp Pro Ala Glu Tyr
            900                 905                 910

Asn Leu Arg Ser Arg Thr Val Leu Cys Gly Thr Cys Gly Gln Pro Ala
        915                 920                 925

Asp Lys Ala Ser Ala Ser Gly Ser Gly Ala Gln Val Gly Gly Pro Ile
    930                 935                 940

Ser Ser Gly Ser Ser Ala Ser Ser Val Thr Val Thr Arg Ser Tyr Arg
945                 950                 955                 960

Ser Val Gly Gly Ser Gly Gly Ser Phe Gly Asp Asn Leu Val Thr
                965                 970                 975

Arg Ser Tyr Leu Leu Gly Asn Ser Ser Pro Arg Thr Gln Ser Pro Gln
            980                 985                 990

Asn Cys Ser Ile Met
        995
```

<210> SEQ ID NO 25
<211> LENGTH: 34
<212> TYPE: DNA
<213> ORGANISM: Artificial Sequence
<220> FEATURE:
<223> OTHER INFORMATION: Forward primer for Lamin-AC-V5-HaloTag

<400> SEQUENCE: 25
tagtagggta ccatgggcct gaacgacatc ttcg                              34

<210> SEQ ID NO 26
<211> LENGTH: 40
<212> TYPE: DNA
<213> ORGANISM: Artificial Sequence
<220> FEATURE:
<223> OTHER INFORMATION: Reverse primer for Lamin-AC-V5-HaloTag

<400> SEQUENCE: 26
tagtaggcgg ccgctcatta catgatgctg cagttctggg                        40

<210> SEQ ID NO 27
<211> LENGTH: 914
<212> TYPE: PRT
<213> ORGANISM: Artificial Sequence
<220> FEATURE:
<223> OTHER INFORMATION: P80-coilin-V5-HaloTag

<400> SEQUENCE: 27

```
Met Ala Ala Ser Glu Thr Val Arg Leu Arg Leu Gln Phe Asp Tyr Pro
1               5                  10                  15

Pro Pro Ala Thr Pro His Cys Thr Ala Phe Trp Leu Leu Val Asp Leu
            20                  25                  30
```

-continued

```
Asn Arg Cys Arg Val Val Thr Asp Leu Ile Ser Leu Ile Arg Gln Arg
         35                  40                  45
Phe Gly Phe Ser Ser Gly Ala Phe Leu Gly Leu Tyr Leu Glu Gly Gly
 50                  55                  60
Leu Leu Pro Pro Ala Glu Ser Ala Arg Leu Val Arg Asp Asn Asp Cys
 65                  70                  75                  80
Leu Arg Val Lys Leu Glu Glu Arg Gly Val Ala Glu Asn Ser Val Val
                 85                  90                  95
Ile Ser Asn Gly Asp Ile Asn Leu Ser Leu Arg Lys Ala Lys Lys Arg
                 100                 105                 110
Ala Phe Gln Leu Glu Glu Gly Glu Thr Glu Pro Asp Cys Lys Tyr
                 115                 120                 125
Ser Lys Lys His Trp Lys Ser Arg Glu Asn Asn Asn Asn Asn Glu Lys
         130                 135                 140
Val Leu Asp Leu Glu Pro Lys Ala Val Thr Asp Gln Thr Val Ser Lys
 145                 150                 155                 160
Lys Asn Lys Arg Lys Asn Lys Ala Thr Cys Gly Thr Val Gly Asp Asp
                 165                 170                 175
Asn Glu Glu Ala Lys Arg Lys Ser Pro Lys Lys Glu Lys Cys Glu
                 180                 185                 190
Tyr Lys Lys Lys Ala Lys Asn Pro Lys Ser Pro Lys Val Gln Ala Val
                 195                 200                 205
Lys Asp Trp Ala Asn Gln Arg Cys Ser Ser Pro Lys Gly Ser Ala Arg
         210                 215                 220
Asn Ser Leu Val Lys Ala Lys Arg Lys Gly Ser Val Ser Val Cys Ser
 225                 230                 235                 240
Lys Glu Ser Pro Ser Ser Ser Glu Ser Glu Ser Cys Asp Glu Ser
                 245                 250                 255
Ile Ser Asp Gly Pro Ser Lys Val Thr Leu Glu Ala Arg Asn Ser Ser
                 260                 265                 270
Glu Lys Leu Pro Thr Glu Leu Ser Lys Glu Glu Pro Ser Thr Lys Asn
         275                 280                 285
Thr Thr Ala Asp Lys Leu Ala Ile Lys Leu Gly Phe Ser Leu Thr Pro
 290                 295                 300
Ser Lys Gly Lys Thr Ser Gly Thr Thr Ser Ser Ser Asp Ser Ser
 305                 310                 315                 320
Ala Glu Ser Asp Asp Gln Cys Leu Met Ser Ser Thr Pro Glu Cys
                 325                 330                 335
Ala Ala Gly Phe Leu Lys Thr Val Gly Leu Phe Ala Gly Arg Gly Arg
                 340                 345                 350
Pro Gly Pro Gly Leu Ser Ser Gln Thr Ala Gly Ala Gly Trp Arg
                 355                 360                 365
Arg Ser Gly Ser Asn Gly Gly Gly Gln Ala Pro Gly Ala Ser Pro Ser
         370                 375                 380
Val Ser Leu Pro Ala Ser Leu Gly Arg Gly Trp Gly Arg Glu Glu Asn
 385                 390                 395                 400
Leu Phe Ser Trp Lys Gly Ala Lys Gly Arg Gly Met Arg Gly Arg Gly
                 405                 410                 415
Arg Gly Arg Gly His Pro Val Ser Cys Val Val Asn Arg Ser Thr Asp
                 420                 425                 430
Asn Gln Arg Gln Gln Leu Asn Asp Val Val Lys Asn Ser Ser Thr
         435                 440                 445
Ile Ile Gln Asn Pro Val Glu Thr Pro Lys Lys Asp Tyr Ser Leu Leu
```

```
            450                 455                 460
Pro Leu Leu Ala Ala Ala Pro Gln Val Gly Glu Lys Ile Ala Phe Lys
465                 470                 475                 480

Leu Leu Glu Leu Thr Ser Ser Tyr Ser Pro Asp Val Ser Asp Tyr Lys
                485                 490                 495

Glu Gly Arg Ile Leu Ser His Asn Pro Glu Thr Gln Gln Val Asp Ile
            500                 505                 510

Glu Ile Leu Ser Ser Leu Pro Ala Leu Arg Glu Pro Gly Lys Phe Asp
            515                 520                 525

Leu Val Tyr His Asn Glu Asn Gly Ala Glu Val Val Glu Tyr Ala Val
            530                 535                 540

Thr Gln Glu Ser Lys Ile Thr Val Phe Trp Lys Glu Leu Ile Asp Pro
545                 550                 555                 560

Arg Leu Ile Ile Glu Ser Pro Ser Asn Thr Ser Thr Glu Pro Ala
                565                 570                 575

Lys Asp Pro Leu Ala Gly Lys Pro Ile Pro Asn Pro Leu Leu Gly Leu
            580                 585                 590

Asp Ser Thr Met Ala Glu Ile Gly Thr Gly Phe Pro Phe Asp Pro His
            595                 600                 605

Tyr Val Glu Val Leu Gly Glu Arg Met His Tyr Val Asp Val Gly Pro
            610                 615                 620

Arg Asp Gly Thr Pro Val Leu Phe Leu His Gly Asn Pro Thr Ser Ser
625                 630                 635                 640

Tyr Val Trp Arg Asn Ile Ile Pro His Val Ala Pro Thr His Arg Cys
                645                 650                 655

Ile Ala Pro Asp Leu Ile Gly Met Gly Lys Ser Asp Lys Pro Asp Leu
                660                 665                 670

Gly Tyr Phe Phe Asp Asp His Val Arg Phe Met Asp Ala Phe Ile Glu
                675                 680                 685

Ala Leu Gly Leu Glu Glu Val Val Leu Val Ile His Asp Trp Gly Ser
            690                 695                 700

Ala Leu Gly Phe His Trp Ala Lys Arg Asn Pro Glu Arg Val Lys Gly
705                 710                 715                 720

Ile Ala Phe Met Glu Phe Ile Arg Pro Ile Pro Thr Trp Asp Glu Trp
                725                 730                 735

Pro Glu Phe Ala Arg Glu Thr Phe Gln Ala Phe Arg Thr Thr Asp Val
                740                 745                 750

Gly Arg Lys Leu Ile Ile Asp Gln Asn Val Phe Ile Glu Gly Thr Leu
                755                 760                 765

Pro Met Gly Val Val Arg Pro Leu Thr Glu Val Glu Met Asp His Tyr
770                 775                 780

Arg Glu Pro Phe Leu Asn Pro Val Asp Arg Glu Pro Leu Trp Arg Phe
785                 790                 795                 800

Pro Asn Glu Leu Pro Ile Ala Gly Glu Pro Ala Asn Ile Val Ala Leu
                805                 810                 815

Val Glu Glu Tyr Met Asp Trp Leu His Gln Ser Pro Val Pro Lys Leu
                820                 825                 830

Leu Phe Trp Gly Thr Pro Gly Val Leu Ile Pro Pro Ala Glu Ala Ala
                835                 840                 845

Arg Leu Ala Lys Ser Leu Pro Asn Cys Lys Ala Val Asp Ile Gly Pro
850                 855                 860

Gly Leu Asn Leu Leu Gln Glu Asp Asn Pro Asp Leu Ile Gly Ser Glu
865                 870                 875                 880
```

Ile Ala Arg Trp Leu Ser Thr Leu Glu Ile Ser Gly Glu Asn Leu Tyr
                885                 890                 895

Phe Gln Ser Gly Leu Asn Asp Ile Phe Glu Ala Gln Lys Ile Glu Trp
            900                 905                 910

His Glu

<210> SEQ ID NO 28
<211> LENGTH: 42
<212> TYPE: DNA
<213> ORGANISM: Artificial Sequence
<220> FEATURE:
<223> OTHER INFORMATION: Forward primer for P80-coilin-V5-HaloTag

<400> SEQUENCE: 28
tagtagaagc ttggtaccat ggcagcttcc gagacggtta gg                   42

<210> SEQ ID NO 29
<211> LENGTH: 47
<212> TYPE: DNA
<213> ORGANISM: Artificial Sequence
<220> FEATURE:
<223> OTHER INFORMATION: Reverse primer for P80-coilin-V5-HaloTag

<400> SEQUENCE: 29
tagtaggcta gcggatcctt ggcaggttct gtacttgatg tgttact              47

<210> SEQ ID NO 30
<211> LENGTH: 701
<212> TYPE: PRT
<213> ORGANISM: Artificial Sequence
<220> FEATURE:
<223> OTHER INFORMATION: HNRNPD-V5-HaloTag

<400> SEQUENCE: 30

Met Ser Glu Glu Gln Phe Gly Gly Asp Gly Ala Ala Ala Ala Ala Thr
1               5                   10                  15

Ala Ala Val Gly Gly Ser Ala Gly Glu Gln Glu Gly Ala Met Val Ala
            20                  25                  30

Ala Thr Gln Gly Ala Ala Ala Ala Ala Gly Ser Gly Ala Gly Thr Gly
        35                  40                  45

Gly Gly Thr Ala Ser Gly Gly Thr Glu Gly Gly Ser Ala Glu Ser Glu
    50                  55                  60

Gly Ala Lys Ile Asp Ala Ser Lys Asn Glu Glu Asp Glu Gly His Ser
65                  70                  75                  80

Asn Ser Ser Pro Arg His Ser Glu Ala Ala Thr Ala Gln Arg Glu Glu
                85                  90                  95

Trp Lys Met Phe Ile Gly Gly Leu Ser Trp Asp Thr Thr Lys Lys Asp
            100                 105                 110

Leu Lys Asp Tyr Phe Ser Lys Phe Gly Glu Val Val Asp Cys Thr Leu
        115                 120                 125

Lys Leu Asp Pro Ile Thr Gly Arg Ser Arg Gly Phe Gly Phe Val Leu
    130                 135                 140

Phe Lys Glu Ser Glu Ser Val Asp Lys Val Met Asp Gln Lys Glu His
145                 150                 155                 160

Lys Leu Asn Gly Lys Val Ile Asp Pro Lys Arg Ala Lys Ala Met Lys
                165                 170                 175

Thr Lys Glu Pro Val Lys Lys Ile Phe Val Gly Gly Leu Ser Pro Asp
            180                 185                 190

-continued

Thr Pro Glu Glu Lys Ile Arg Glu Tyr Phe Gly Gly Phe Gly Val
        195                 200                 205

Glu Ser Ile Glu Leu Pro Met Asp Asn Lys Thr Asn Lys Arg Arg Gly
210                 215                 220

Phe Cys Phe Ile Thr Phe Lys Glu Glu Pro Val Lys Lys Ile Met
225                 230                 235                 240

Glu Lys Lys Tyr His Asn Val Gly Leu Ser Lys Cys Glu Ile Lys Val
                245                 250                 255

Ala Met Ser Lys Glu Gln Tyr Gln Gln Gln Gln Trp Gly Ser Arg
        260                 265                 270

Gly Gly Phe Ala Gly Arg Ala Arg Gly Arg Gly Gly Pro Ser Gln
        275                 280                 285

Asn Trp Asn Gln Gly Tyr Ser Asn Tyr Trp Asn Gln Gly Tyr Gly Asn
290                 295                 300

Tyr Gly Tyr Asn Ser Gln Gly Tyr Gly Gly Tyr Gly Tyr Asp Tyr
305                 310                 315                 320

Thr Gly Tyr Asn Asn Tyr Gly Tyr Gly Asp Tyr Ser Asn Gln Gln
                325                 330                 335

Ser Gly Tyr Gly Lys Val Ser Arg Arg Gly Gly His Gln Asn Ser Tyr
        340                 345                 350

Lys Pro Tyr Lys Leu Ala Gly Gly Ser Gly Glu Asn Leu Tyr Phe Gln
        355                 360                 365

Ser Gly Lys Pro Ile Pro Asn Pro Leu Leu Gly Leu Asp Ser Thr Gly
        370                 375                 380

Leu Asn Asp Ile Phe Glu Ala Gln Lys Ile Glu Trp His Glu Met Ala
385                 390                 395                 400

Glu Ile Gly Thr Gly Phe Pro Phe Asp Pro His Tyr Val Glu Val Leu
                405                 410                 415

Gly Glu Arg Met His Tyr Val Asp Val Gly Pro Arg Asp Gly Thr Pro
                420                 425                 430

Val Leu Phe Leu His Gly Asn Pro Thr Ser Ser Tyr Val Trp Arg Asn
        435                 440                 445

Ile Ile Pro His Val Ala Pro Thr His Arg Cys Ile Ala Pro Asp Leu
450                 455                 460

Ile Gly Met Gly Lys Ser Asp Lys Pro Asp Leu Gly Tyr Phe Phe Asp
465                 470                 475                 480

Asp His Val Arg Phe Met Asp Ala Phe Ile Glu Ala Leu Gly Leu Glu
                485                 490                 495

Glu Val Val Leu Val Ile His Asp Trp Gly Ser Ala Leu Gly Phe His
                500                 505                 510

Trp Ala Lys Arg Asn Pro Glu Arg Val Lys Gly Ile Ala Phe Met Glu
        515                 520                 525

Phe Ile Arg Pro Ile Pro Thr Trp Asp Glu Trp Pro Glu Phe Ala Arg
530                 535                 540

Glu Thr Phe Gln Ala Phe Arg Thr Thr Asp Val Gly Arg Lys Leu Ile
545                 550                 555                 560

Ile Asp Gln Asn Val Phe Ile Glu Gly Thr Leu Pro Met Gly Val Val
                565                 570                 575

Arg Pro Leu Thr Glu Val Glu Met Asp His Tyr Arg Glu Pro Phe Leu
                580                 585                 590

Asn Pro Val Asp Arg Glu Pro Leu Trp Arg Phe Pro Asn Glu Leu Pro
        595                 600                 605

Ile Ala Gly Glu Pro Ala Asn Ile Val Ala Leu Val Glu Glu Tyr Met

```
                610             615             620
Asp Trp Leu His Gln Ser Pro Val Pro Lys Leu Leu Phe Trp Gly Thr
625             630             635             640

Pro Gly Val Leu Ile Pro Ala Glu Ala Ala Arg Leu Ala Lys Ser
                645             650             655

Leu Pro Asn Cys Lys Ala Val Asp Ile Gly Pro Gly Leu Asn Leu Leu
                660             665             670

Gln Glu Asp Asn Pro Asp Leu Ile Gly Ser Glu Ile Ala Arg Trp Leu
                675             680             685

Ser Thr Leu Glu Ile Ser Gly His His His His His
690             695             700

<210> SEQ ID NO 31
<211> LENGTH: 34
<212> TYPE: DNA
<213> ORGANISM: Artificial Sequence
<220> FEATURE:
<223> OTHER INFORMATION: Forward primer for HNRNPD-V5-HaloTag

<400> SEQUENCE: 31
tagtagggta ccatgtcgga ggagcagttc ggcg                           34

<210> SEQ ID NO 32
<211> LENGTH: 42
<212> TYPE: DNA
<213> ORGANISM: Artificial Sequence
<220> FEATURE:
<223> OTHER INFORMATION: Reverse primer for HNRNPD-V5-HaloTag

<400> SEQUENCE: 32
gctagcttgt atggtttgta gctattttga tgaccacctc gc                  42

<210> SEQ ID NO 33
<211> LENGTH: 522
<212> TYPE: PRT
<213> ORGANISM: Artificial Sequence
<220> FEATURE:
<223> OTHER INFORMATION: MRPL12-V5-HaloTag

<400> SEQUENCE: 33

Met Leu Pro Ala Ala Ala Arg Pro Leu Trp Gly Pro Cys Leu Gly Leu
1               5               10              15

Arg Ala Ala Ala Phe Arg Leu Ala Arg Arg Gln Val Pro Cys Val Cys
                20              25              30

Ala Val Arg His Met Arg Ser Ser Gly His Gln Arg Cys Glu Ala Leu
                35              40              45

Ala Gly Ala Pro Leu Asp Asn Ala Pro Lys Glu Tyr Pro Pro Lys Ile
            50              55              60

Gln Gln Leu Val Gln Asp Ile Ala Ser Leu Thr Leu Leu Glu Ile Ser
65              70              75              80

Asp Leu Asn Glu Leu Leu Lys Lys Thr Leu Lys Ile Gln Asp Val Gly
                85              90              95

Leu Val Pro Met Gly Gly Val Met Ser Gly Ala Val Pro Ala Ala Ala
                100             105             110

Ala Gln Glu Ala Val Glu Glu Asp Ile Pro Ile Ala Lys Glu Arg Thr
                115             120             125

His Phe Thr Val Arg Leu Thr Glu Ala Lys Pro Val Asp Lys Val Lys
                130             135             140

Leu Ile Lys Glu Ile Lys Asn Tyr Ile Gln Gly Ile Asn Leu Val Gln
```

```
            145                 150                 155                 160
Ala Lys Lys Leu Val Glu Ser Leu Pro Gln Glu Ile Lys Ala Asn Val
                    165                 170                 175

Ala Lys Ala Glu Ala Glu Lys Ile Lys Ala Leu Glu Ala Val Gly
                    180                 185                 190

Gly Thr Val Val Leu Glu Lys Asp Pro Leu Ala Gly Lys Pro Ile Pro
                    195                 200                 205

Asn Pro Leu Leu Gly Leu Asp Ser Thr Met Ala Glu Ile Gly Thr Gly
210                 215                 220

Phe Pro Phe Asp Pro His Tyr Val Glu Val Leu Gly Glu Arg Met His
225                 230                 235                 240

Tyr Val Asp Val Gly Pro Arg Asp Gly Thr Pro Val Leu Phe Leu His
                    245                 250                 255

Gly Asn Pro Thr Ser Ser Tyr Val Trp Arg Asn Ile Ile Pro His Val
                    260                 265                 270

Ala Pro Thr His Arg Cys Ile Ala Pro Asp Leu Ile Gly Met Gly Lys
                    275                 280                 285

Ser Asp Lys Pro Asp Leu Gly Tyr Phe Phe Asp Asp His Val Arg Phe
290                 295                 300

Met Asp Ala Phe Ile Glu Ala Leu Gly Leu Glu Glu Val Val Leu Val
305                 310                 315                 320

Ile His Asp Trp Gly Ser Ala Leu Gly Phe His Trp Ala Lys Arg Asn
                    325                 330                 335

Pro Glu Arg Val Lys Gly Ile Ala Phe Met Glu Phe Ile Arg Pro Ile
                    340                 345                 350

Pro Thr Trp Asp Glu Trp Pro Glu Phe Ala Arg Glu Thr Phe Gln Ala
                    355                 360                 365

Phe Arg Thr Thr Asp Val Gly Arg Lys Leu Ile Ile Asp Gln Asn Val
                    370                 375                 380

Phe Ile Glu Gly Thr Leu Pro Met Gly Val Val Arg Pro Leu Thr Glu
385                 390                 395                 400

Val Glu Met Asp His Tyr Arg Glu Pro Phe Leu Asn Pro Val Asp Arg
                    405                 410                 415

Glu Pro Leu Trp Arg Phe Pro Asn Glu Leu Pro Ile Ala Gly Glu Pro
                    420                 425                 430

Ala Asn Ile Val Ala Leu Val Glu Glu Tyr Met Asp Trp Leu His Gln
                    435                 440                 445

Ser Pro Val Pro Lys Leu Leu Phe Trp Gly Thr Pro Gly Val Leu Ile
450                 455                 460

Pro Pro Ala Glu Ala Ala Arg Leu Ala Lys Ser Leu Pro Asn Cys Lys
465                 470                 475                 480

Ala Val Asp Ile Gly Pro Gly Leu Asn Leu Leu Gln Glu Asp Asn Pro
                    485                 490                 495

Asp Leu Ile Gly Ser Glu Ile Ala Arg Trp Leu Ser Thr Leu Glu Ile
                    500                 505                 510

Ser Gly Trp Ser His Pro Gln Phe Glu Lys
                    515                 520

<210> SEQ ID NO 34
<211> LENGTH: 37
<212> TYPE: DNA
<213> ORGANISM: Artificial Sequence
<220> FEATURE:
<223> OTHER INFORMATION: Forward primer for MRPL12-V5-HaloTag
```

```
<400> SEQUENCE: 34
tagtagaagc ttggtaccat gctgccggcg gccgctc                                    37

<210> SEQ ID NO 35
<211> LENGTH: 40
<212> TYPE: DNA
<213> ORGANISM: Artificial Sequence
<220> FEATURE:
<223> OTHER INFORMATION: Reverse primer for MRPL12-V5-HaloTag

<400> SEQUENCE: 35
tagtaggcta gcggatcctt ctccagaacc acggtgccgc                                 40

<210> SEQ ID NO 36
<211> LENGTH: 501
<212> TYPE: PRT
<213> ORGANISM: Artificial Sequence
<220> FEATURE:
<223> OTHER INFORMATION: Tom20-V5-HaloTag

<400> SEQUENCE: 36
```

Met Val Gly Arg Asn Ser Ala Ile Ala Ala Gly Val Cys Gly Ala Leu
1               5                   10                  15

Phe Ile Gly Tyr Cys Ile Tyr Phe Asp Arg Lys Arg Arg Ser Asp Pro
                20                  25                  30

Asn Phe Lys Asn Arg Leu Arg Glu Arg Arg Lys Gln Lys Leu Ala
            35                  40                  45

Lys Glu Arg Ala Gly Leu Ser Lys Leu Pro Asp Leu Lys Asp Ala Glu
    50                  55                  60

Ala Val Gln Lys Phe Phe Leu Glu Glu Ile Gln Leu Gly Glu Glu Leu
65                  70                  75                  80

Leu Ala Gln Gly Glu Tyr Glu Lys Gly Val Asp His Leu Thr Asn Ala
                85                  90                  95

Ile Ala Val Cys Gly Gln Pro Gln Gln Leu Leu Gln Val Leu Gln Gln
            100                 105                 110

Thr Leu Pro Pro Pro Val Phe Gln Met Leu Leu Thr Lys Leu Pro Thr
        115                 120                 125

Ile Ser Gln Arg Ile Val Ser Ala Gln Ser Leu Ala Glu Asp Asp Val
    130                 135                 140

Glu Gly Gly Ser Gly Asp Pro Pro Val Ala Thr Lys Leu Ala Gly Gly
145                 150                 155                 160

Ser Gly Gly Ser Gly Gly Ser Arg Gly Lys Pro Ile Pro Asn Pro Leu
                165                 170                 175

Leu Gly Leu Asp Ser Thr Met Ala Glu Ile Gly Thr Gly Phe Pro Phe
            180                 185                 190

Asp Pro His Tyr Val Glu Val Leu Gly Glu Arg Met His Tyr Val Asp
        195                 200                 205

Val Gly Pro Arg Asp Gly Thr Pro Val Leu Phe Leu His Gly Asn Pro
    210                 215                 220

Thr Ser Ser Tyr Val Trp Arg Asn Ile Ile Pro His Val Ala Pro Thr
225                 230                 235                 240

His Arg Cys Ile Ala Pro Asp Leu Ile Gly Met Gly Lys Ser Asp Lys
                245                 250                 255

Pro Asp Leu Gly Tyr Phe Phe Asp Asp His Val Arg Phe Met Asp Ala
            260                 265                 270

Phe Ile Glu Ala Leu Gly Leu Glu Glu Val Val Leu Val Ile His Asp
        275                 280                 285

-continued

```
Trp Gly Ser Ala Leu Gly Phe His Trp Ala Lys Arg Asn Pro Glu Arg
        290                 295                 300

Val Lys Gly Ile Ala Phe Met Glu Phe Ile Arg Pro Ile Pro Thr Trp
305                 310                 315                 320

Asp Glu Trp Pro Glu Phe Ala Arg Glu Thr Phe Gln Ala Phe Arg Thr
                325                 330                 335

Thr Asp Val Gly Arg Lys Leu Ile Ile Asp Gln Asn Val Phe Ile Glu
            340                 345                 350

Gly Thr Leu Pro Met Gly Val Val Arg Pro Leu Thr Glu Val Glu Met
        355                 360                 365

Asp His Tyr Arg Glu Pro Phe Leu Asn Pro Val Asp Arg Glu Pro Leu
    370                 375                 380

Trp Arg Phe Pro Asn Glu Leu Pro Ile Ala Gly Glu Pro Ala Asn Ile
385                 390                 395                 400

Val Ala Leu Val Glu Glu Tyr Met Asp Trp Leu His Gln Ser Pro Val
                405                 410                 415

Pro Lys Leu Leu Phe Trp Gly Thr Pro Gly Val Leu Ile Pro Pro Ala
            420                 425                 430

Glu Ala Ala Arg Leu Ala Lys Ser Leu Pro Asn Cys Lys Ala Val Asp
        435                 440                 445

Ile Gly Pro Gly Leu Asn Leu Leu Gln Glu Asp Asn Pro Asp Leu Ile
    450                 455                 460

Gly Ser Glu Ile Ala Arg Trp Leu Ser Thr Leu Glu Ile Ser Gly Glu
465                 470                 475                 480

Asn Leu Tyr Phe Gln Ser Gly Leu Asn Asp Ile Phe Glu Ala Gln Lys
                485                 490                 495

Ile Glu Trp His Glu
            500

<210> SEQ ID NO 37
<211> LENGTH: 32
<212> TYPE: DNA
<213> ORGANISM: Artificial Sequence
<220> FEATURE:
<223> OTHER INFORMATION: Forward primer for Tom20-V5-HaloTag

<400> SEQUENCE: 37
tagtaggcta gcaggcaagc ccatccccaa cc                               32

<210> SEQ ID NO 38
<211> LENGTH: 106
<212> TYPE: DNA
<213> ORGANISM: Artificial Sequence
<220> FEATURE:
<223> OTHER INFORMATION: Reverse primer for Tom20-V5-HaloTag

<400> SEQUENCE: 38
tagtaggcgg ccgctcatta ctcgtgccac tcgatcttct gggcctcgaa gatgtcgttc   60
aggccagact gaaaatacag gttttcgccg gaaatctcga gcgtcg                 106

<210> SEQ ID NO 39
<211> LENGTH: 433
<212> TYPE: PRT
<213> ORGANISM: Artificial Sequence
<220> FEATURE:
<223> OTHER INFORMATION: SEC61B-V5-HaloTag

<400> SEQUENCE: 39
```

```
Met Gly Lys Pro Ile Pro Asn Pro Leu Leu Gly Leu Asp Ser Thr Met
1               5                   10                  15
Ala Glu Ile Gly Thr Gly Phe Pro Phe Asp Pro His Tyr Val Glu Val
            20                  25                  30
Leu Gly Glu Arg Met His Tyr Val Asp Val Gly Pro Arg Asp Gly Thr
        35                  40                  45
Pro Val Leu Phe Leu His Gly Asn Pro Thr Ser Ser Tyr Val Trp Arg
50                  55                  60
Asn Ile Ile Pro His Val Ala Pro Thr His Arg Cys Ile Ala Pro Asp
65                  70                  75                  80
Leu Ile Gly Met Gly Lys Ser Asp Lys Pro Asp Leu Gly Tyr Phe Phe
                85                  90                  95
Asp Asp His Val Arg Phe Met Asp Ala Phe Ile Glu Ala Leu Gly Leu
            100                 105                 110
Glu Glu Val Val Leu Val Ile His Asp Trp Gly Ser Ala Leu Gly Phe
            115                 120                 125
His Trp Ala Lys Arg Asn Pro Glu Arg Val Lys Gly Ile Ala Phe Met
    130                 135                 140
Glu Phe Ile Arg Pro Ile Pro Thr Trp Asp Glu Trp Pro Glu Phe Ala
145                 150                 155                 160
Arg Glu Thr Phe Gln Ala Phe Arg Thr Thr Asp Val Gly Arg Lys Leu
                165                 170                 175
Ile Ile Asp Gln Asn Val Phe Ile Glu Gly Thr Leu Pro Met Gly Val
            180                 185                 190
Val Arg Pro Leu Thr Glu Val Glu Met Asp His Tyr Arg Glu Pro Phe
        195                 200                 205
Leu Asn Pro Val Asp Arg Glu Pro Leu Trp Arg Phe Pro Asn Glu Leu
210                 215                 220
Pro Ile Ala Gly Glu Pro Ala Asn Ile Val Ala Leu Val Glu Glu Tyr
225                 230                 235                 240
Met Asp Trp Leu His Gln Ser Pro Val Pro Lys Leu Leu Phe Trp Gly
                245                 250                 255
Thr Pro Gly Val Leu Ile Pro Pro Ala Glu Ala Ala Arg Leu Ala Lys
            260                 265                 270
Ser Leu Pro Asn Cys Lys Ala Val Asp Ile Gly Pro Gly Leu Asn Leu
        275                 280                 285
Leu Gln Glu Asp Asn Pro Asp Leu Ile Gly Ser Glu Ile Ala Arg Trp
    290                 295                 300
Leu Ser Thr Leu Glu Ile Ser Gly Glu Asn Leu Tyr Phe Gln Ser Gly
305                 310                 315                 320
Leu Asn Asp Ile Phe Glu Ala Gln Lys Ile Glu Trp His Glu Lys Leu
                325                 330                 335
Ala Met Pro Gly Pro Thr Pro Ser Gly Thr Asn Val Gly Ser Ser Gly
            340                 345                 350
Arg Ser Pro Ser Lys Ala Val Ala Ala Arg Ala Ala Gly Ser Thr Val
        355                 360                 365
Arg Gln Arg Lys Asn Ala Ser Cys Gly Thr Arg Ser Ala Gly Arg Thr
    370                 375                 380
Thr Ser Ala Gly Thr Gly Gly Met Trp Arg Phe Tyr Thr Glu Asp Ser
385                 390                 395                 400
Pro Gly Leu Lys Val Gly Pro Val Pro Val Leu Val Met Ser Leu Leu
                405                 410                 415
Phe Ile Ala Ser Val Phe Met Leu His Ile Trp Gly Lys Tyr Thr Arg
```

<210> SEQ ID NO 40
<211> LENGTH: 32
<212> TYPE: DNA
<213> ORGANISM: Artificial Sequence
<220> FEATURE:
<223> OTHER INFORMATION: Forward primer for SEC61B-V5-HaloTag

<400> SEQUENCE: 40
tagtagctta agatgggcaa gcccatcccc aa    32

<210> SEQ ID NO 41
<211> LENGTH: 36
<212> TYPE: DNA
<213> ORGANISM: Artificial Sequence
<220> FEATURE:
<223> OTHER INFORMATION: Reverse primer for SEC61B-V5-HaloTag

<400> SEQUENCE: 41
tagtaggcta gcttctcgtg ccactcgatc ttctgg    36

<210> SEQ ID NO 42
<211> LENGTH: 822
<212> TYPE: PRT
<213> ORGANISM: Artificial Sequence
<220> FEATURE:
<223> OTHER INFORMATION: G3BP1-V5-HaloTag

<400> SEQUENCE: 42

```
Met Gly Leu Asn Asp Ile Phe Glu Ala Gln Lys Ile Glu Trp His Glu
1               5                   10                  15

Ala Ser Gly Lys Pro Ile Pro Asn Pro Leu Leu Gly Leu Asp Ser Thr
            20                  25                  30

Met Ala Glu Ile Gly Thr Gly Phe Pro Phe Asp Pro His Tyr Val Glu
        35                  40                  45

Val Leu Gly Glu Arg Met His Tyr Val Asp Val Gly Pro Arg Asp Gly
    50                  55                  60

Thr Pro Val Leu Phe Leu His Gly Asn Pro Thr Ser Ser Tyr Val Trp
65                  70                  75                  80

Arg Asn Ile Ile Pro His Val Ala Pro Thr His Arg Cys Ile Ala Pro
                85                  90                  95

Asp Leu Ile Gly Met Gly Lys Ser Asp Lys Pro Asp Leu Gly Tyr Phe
            100                 105                 110

Phe Asp Asp His Val Arg Phe Met Asp Ala Phe Ile Glu Ala Leu Gly
        115                 120                 125

Leu Glu Glu Val Val Leu Val Ile His Asp Trp Gly Ser Ala Leu Gly
    130                 135                 140

Phe His Trp Ala Lys Arg Asn Pro Glu Arg Val Lys Gly Ile Ala Phe
145                 150                 155                 160

Met Glu Phe Ile Arg Pro Ile Pro Thr Trp Asp Glu Trp Pro Glu Phe
                165                 170                 175

Ala Arg Glu Thr Phe Gln Ala Phe Arg Thr Thr Asp Val Gly Arg Lys
            180                 185                 190

Leu Ile Ile Asp Gln Asn Val Phe Ile Glu Gly Thr Leu Pro Met Gly
        195                 200                 205

Val Val Arg Pro Leu Thr Glu Val Glu Met Asp His Tyr Arg Glu Pro
    210                 215                 220
```

```
Phe Leu Asn Pro Val Asp Arg Glu Pro Leu Trp Arg Phe Pro Asn Glu
225                 230                 235                 240

Leu Pro Ile Ala Gly Glu Pro Ala Asn Ile Val Ala Leu Val Glu Glu
        245                 250                 255

Tyr Met Asp Trp Leu His Gln Ser Pro Val Pro Lys Leu Leu Phe Trp
            260                 265                 270

Gly Thr Pro Gly Val Leu Ile Pro Pro Ala Glu Ala Ala Arg Leu Ala
        275                 280                 285

Lys Ser Leu Pro Asn Cys Lys Ala Val Asp Ile Gly Pro Gly Leu Asn
        290                 295                 300

Leu Leu Gln Glu Asp Asn Pro Asp Leu Ile Gly Ser Glu Ile Ala Arg
305                 310                 315                 320

Trp Leu Ser Thr Leu Glu Ile Ser Gly Gly Ser Glu Asn Leu Tyr Phe
                325                 330                 335

Gln Ser Glu Asn Leu Tyr Phe Gln Ser Asp Tyr Lys Asp Asp Asp Asp
            340                 345                 350

Lys Glu Leu Ser Met Val Met Glu Lys Pro Ser Pro Leu Leu Val Gly
        355                 360                 365

Arg Glu Phe Val Arg Gln Tyr Tyr Thr Leu Leu Asn Gln Ala Pro Asp
370                 375                 380

Met Leu His Arg Phe Tyr Gly Lys Asn Ser Ser Tyr Val His Gly Gly
385                 390                 395                 400

Leu Asp Ser Asn Gly Lys Pro Ala Asp Ala Val Tyr Gly Gln Lys Glu
                405                 410                 415

Ile His Arg Lys Val Met Ser Gln Asn Phe Thr Asn Cys His Thr Lys
            420                 425                 430

Ile Arg His Val Asp Ala His Ala Thr Leu Asn Asp Gly Val Val Val
            435                 440                 445

Gln Val Met Gly Leu Leu Ser Asn Asn Asn Gln Ala Leu Arg Arg Phe
450                 455                 460

Met Gln Thr Phe Val Leu Ala Pro Glu Gly Ser Val Ala Asn Lys Phe
465                 470                 475                 480

Tyr Val His Asn Asp Ile Phe Arg Tyr Gln Asp Glu Val Phe Gly Gly
                485                 490                 495

Phe Val Thr Glu Pro Gln Glu Glu Ser Glu Glu Glu Val Glu Glu Pro
                500                 505                 510

Glu Glu Arg Gln Gln Thr Pro Glu Val Val Pro Asp Asp Ser Gly Thr
            515                 520                 525

Phe Tyr Asp Gln Ala Val Val Ser Asn Asp Met Glu Glu His Leu Glu
            530                 535                 540

Glu Pro Val Ala Glu Pro Glu Pro Asp Pro Glu Pro Glu Pro Glu Gln
545                 550                 555                 560

Glu Pro Val Ser Glu Ile Gln Glu Glu Lys Pro Glu Pro Val Leu Glu
                565                 570                 575

Glu Thr Ala Pro Glu Asp Ala Gln Lys Ser Ser Pro Ala Pro Ala
            580                 585                 590

Asp Ile Ala Gln Thr Val Gln Glu Asp Leu Arg Thr Phe Ser Trp Ala
            595                 600                 605

Ser Val Thr Ser Lys Asn Leu Pro Pro Ser Gly Ala Val Pro Val Thr
            610                 615                 620

Gly Ile Pro Pro His Val Val Lys Val Pro Ala Ser Gln Pro Arg Pro
625                 630                 635                 640
```

Glu Ser Lys Pro Glu Ser Gln Ile Pro Pro Gln Arg Pro Gln Arg Asp
            645                 650                 655

Gln Arg Val Arg Glu Gln Arg Ile Asn Ile Pro Pro Arg Gly Pro
        660                 665                 670

Arg Pro Ile Arg Glu Ala Gly Glu Gln Gly Asp Ile Glu Pro Arg Arg
            675                 680                 685

Met Val Arg His Pro Asp Ser His Gln Leu Phe Ile Gly Asn Leu Pro
        690                 695                 700

His Glu Val Asp Lys Ser Glu Leu Lys Asp Phe Phe Gln Ser Tyr Gly
705                 710                 715                 720

Asn Val Val Glu Leu Arg Ile Asn Ser Gly Gly Lys Leu Pro Asn Phe
                725                 730                 735

Gly Phe Val Val Phe Asp Asp Ser Glu Pro Val Gln Lys Val Leu Ser
            740                 745                 750

Asn Arg Pro Ile Met Phe Arg Gly Glu Val Arg Leu Asn Val Glu Glu
        755                 760                 765

Lys Lys Thr Arg Ala Ala Arg Glu Gly Asp Arg Arg Asp Asn Arg Leu
    770                 775                 780

Arg Gly Pro Gly Gly Pro Arg Gly Gly Leu Gly Gly Met Arg Gly
785                 790                 795                 800

Pro Pro Arg Gly Gly Met Val Gln Lys Pro Gly Phe Gly Val Gly Arg
            805                 810                 815

Gly Leu Ala Pro Arg Gln
            820

<210> SEQ ID NO 43
<211> LENGTH: 33
<212> TYPE: DNA
<213> ORGANISM: Artificial Sequence
<220> FEATURE:
<223> OTHER INFORMATION: Forward primer for G3BP1-V5-HaloTag

<400> SEQUENCE: 43
tagtagaagc ttggtaccat gggcctgaac gac                                    33

<210> SEQ ID NO 44
<211> LENGTH: 35
<212> TYPE: DNA
<213> ORGANISM: Artificial Sequence
<220> FEATURE:
<223> OTHER INFORMATION: Reverse primer for G3BP1-V5-HaloTag

<400> SEQUENCE: 44
tagtaggcgg ccgctcatta ctgccgtggc gcaag                                  35

<210> SEQ ID NO 45
<211> LENGTH: 1066
<212> TYPE: PRT
<213> ORGANISM: Artificial Sequence
<220> FEATURE:
<223> OTHER INFORMATION: HaloTag-EBFP-V5-G3BP1

<400> SEQUENCE: 45

Met Val Met Glu Lys Pro Ser Pro Leu Leu Val Gly Arg Glu Phe Val
1               5                   10                  15

Arg Gln Tyr Tyr Thr Leu Leu Asn Gln Ala Pro Asp Met Leu His Arg
            20                  25                  30

Phe Tyr Gly Lys Asn Ser Ser Tyr Val His Gly Leu Asp Ser Asn
        35                  40                  45

-continued

Gly Lys Pro Ala Asp Ala Val Tyr Gly Gln Lys Glu Ile His Arg Lys
    50              55                  60

Val Met Ser Gln Asn Phe Thr Asn Cys His Thr Lys Ile Arg His Val
65              70                  75                  80

Asp Ala His Ala Thr Leu Asn Asp Gly Val Val Gln Val Met Gly
                85              90                  95

Leu Leu Ser Asn Asn Asn Gln Ala Leu Arg Arg Phe Met Gln Thr Phe
            100                 105                 110

Val Leu Ala Pro Glu Gly Ser Val Ala Asn Lys Phe Tyr Val His Asn
            115                 120                 125

Asp Ile Phe Arg Tyr Gln Asp Glu Val Phe Gly Gly Phe Val Thr Glu
    130                 135                 140

Pro Gln Glu Glu Ser Glu Glu Val Glu Glu Pro Glu Glu Arg Gln
145                 150                 155                 160

Gln Thr Pro Glu Val Val Pro Asp Asp Ser Gly Thr Phe Tyr Asp Gln
                165                 170                 175

Ala Val Val Ser Asn Asp Met Glu Glu His Leu Glu Glu Pro Val Ala
            180                 185                 190

Glu Pro Glu Pro Asp Pro Glu Pro Glu Gln Glu Pro Val Ser
            195                 200                 205

Glu Ile Gln Glu Glu Lys Pro Glu Pro Val Leu Glu Glu Thr Ala Pro
    210                 215                 220

Glu Asp Ala Gln Lys Ser Ser Pro Ala Pro Ala Asp Ile Ala Gln
225                 230                 235                 240

Thr Val Gln Glu Asp Leu Arg Thr Phe Ser Trp Ala Ser Val Thr Ser
                245                 250                 255

Lys Asn Leu Pro Pro Ser Gly Ala Val Pro Val Thr Gly Ile Pro Pro
            260                 265                 270

His Val Val Lys Val Pro Ala Ser Gln Pro Arg Pro Glu Ser Lys Pro
    275                 280                 285

Glu Ser Gln Ile Pro Pro Gln Arg Pro Gln Arg Asp Gln Arg Val Arg
    290                 295                 300

Glu Gln Arg Ile Asn Ile Pro Pro Gln Arg Gly Pro Arg Pro Ile Arg
305                 310                 315                 320

Glu Ala Gly Glu Gln Gly Asp Ile Glu Pro Arg Arg Met Val Arg His
                325                 330                 335

Pro Asp Ser His Gln Leu Phe Ile Gly Asn Leu Pro His Glu Val Asp
                340                 345                 350

Lys Ser Glu Leu Lys Asp Phe Phe Gln Ser Tyr Gly Asn Val Val Glu
            355                 360                 365

Leu Arg Ile Asn Ser Gly Gly Lys Leu Pro Asn Phe Gly Phe Val Val
    370                 375                 380

Phe Asp Asp Ser Glu Pro Val Gln Lys Val Leu Ser Asn Arg Pro Ile
385                 390                 395                 400

Met Phe Arg Gly Glu Val Arg Leu Asn Val Glu Glu Lys Lys Thr Arg
                405                 410                 415

Ala Ala Arg Glu Gly Asp Arg Arg Asp Asn Arg Leu Arg Gly Pro Gly
            420                 425                 430

Gly Pro Arg Gly Gly Leu Gly Gly Met Arg Gly Pro Pro Arg Gly
    435                 440                 445

Gly Met Val Gln Lys Pro Gly Phe Gly Val Gly Arg Gly Leu Ala Pro
    450                 455                 460

Arg Gln Lys Asp Pro Gly Ala Pro Gly Ser Ala Gly Ser Ala Ala Gly

```
            465                 470                 475                 480
        Ser Gly Val Ser Lys Gly Glu Glu Leu Phe Thr Gly Val Val Pro Ile
                        485                 490                 495

Leu Val Glu Leu Asp Gly Asp Val Asn Gly His Lys Phe Ser Val Arg
                        500                 505                 510

Gly Glu Gly Glu Gly Asp Ala Thr Asn Gly Lys Leu Thr Leu Lys Phe
                        515                 520                 525

Ile Cys Thr Thr Gly Lys Leu Pro Val Pro Trp Pro Thr Leu Val Thr
                        530                 535                 540

Thr Leu Ser His Gly Val Gln Cys Phe Ala Arg Tyr Pro Asp His Met
        545                 550                 555                 560

Lys Gln His Asp Phe Lys Ser Ala Met Pro Glu Gly Tyr Val Gln
                        565                 570                 575

Glu Arg Thr Ile Phe Phe Lys Asp Asp Gly Thr Tyr Lys Thr Arg Ala
                        580                 585                 590

Glu Val Lys Phe Glu Gly Asp Thr Leu Val Asn Arg Ile Glu Leu Lys
                        595                 600                 605

Gly Val Asp Phe Lys Glu Asp Gly Asn Ile Leu Gly His Lys Leu Glu
                        610                 615                 620

Tyr Asn Phe Asn Ser His Asn Ile Tyr Ile Met Ala Val Lys Gln Lys
        625                 630                 635                 640

Asn Gly Ile Lys Val Asn Phe Lys Ile Arg His Asn Val Glu Asp Gly
                        645                 650                 655

Ser Val Gln Leu Ala Asp His Tyr Gln Gln Asn Thr Pro Ile Gly Asp
                        660                 665                 670

Gly Pro Val Leu Leu Pro Asp Ser His Tyr Leu Ser Thr Gln Ser Val
                        675                 680                 685

Leu Ser Lys Asp Pro Asn Glu Lys Arg Asp His Met Val Leu Leu Glu
                        690                 695                 700

Phe Arg Thr Ala Ala Gly Ile Thr Leu Gly Met Asp Glu Leu Tyr Lys
        705                 710                 715                 720

Lys Leu Ala Gly Gly Ser Gly Glu Asn Leu Tyr Phe Gln Ser Gly Lys
                        725                 730                 735

Pro Ile Pro Asn Pro Leu Leu Gly Leu Asp Ser Thr Gly Leu Asn Asp
                        740                 745                 750

Ile Phe Glu Ala Gln Lys Ile Glu Trp His Glu Met Ala Glu Ile Gly
                        755                 760                 765

Thr Gly Phe Pro Phe Asp Pro His Tyr Val Glu Val Leu Gly Glu Arg
        770                 775                 780

Met His Tyr Val Asp Val Gly Pro Arg Asp Gly Thr Pro Val Leu Phe
        785                 790                 795                 800

Leu His Gly Asn Pro Thr Ser Ser Tyr Val Trp Arg Asn Ile Ile Pro
                        805                 810                 815

His Val Ala Pro Thr His Arg Cys Ile Ala Pro Asp Leu Ile Gly Met
                        820                 825                 830

Gly Lys Ser Asp Lys Pro Asp Leu Gly Tyr Phe Phe Asp Asp His Val
                        835                 840                 845

Arg Phe Met Asp Ala Phe Ile Glu Ala Leu Gly Leu Glu Glu Val Val
                        850                 855                 860

Leu Val Ile His Asp Trp Gly Ser Ala Leu Gly Phe His Trp Ala Lys
        865                 870                 875                 880

Arg Asn Pro Glu Arg Val Lys Gly Ile Ala Phe Met Glu Phe Ile Arg
                        885                 890                 895
```

Pro Ile Pro Thr Trp Asp Glu Trp Pro Glu Phe Ala Arg Glu Thr Phe
             900                 905                 910

Gln Ala Phe Arg Thr Thr Asp Val Gly Arg Lys Leu Ile Ile Asp Gln
             915                 920                 925

Asn Val Phe Ile Glu Gly Thr Leu Pro Met Gly Val Val Arg Pro Leu
             930                 935                 940

Thr Glu Val Glu Met Asp His Tyr Arg Glu Pro Phe Leu Asn Pro Val
945                 950                 955                 960

Asp Arg Glu Pro Leu Trp Arg Phe Pro Asn Glu Leu Pro Ile Ala Gly
                965                 970                 975

Glu Pro Ala Asn Ile Val Ala Leu Val Glu Glu Tyr Met Asp Trp Leu
             980                 985                 990

His Gln Ser Pro Val Pro Lys Leu Leu Phe Trp Gly Thr Pro Gly Val
             995                 1000                1005

Leu Ile Pro Pro Ala Glu Ala Ala Arg Leu Ala Lys Ser Leu Pro
        1010                1015                1020

Asn Cys Lys Ala Val Asp Ile Gly Pro Gly Leu Asn Leu Leu Gln
        1025                1030                1035

Glu Asp Asn Pro Asp Leu Ile Gly Ser Glu Ile Ala Arg Trp Leu
        1040                1045                1050

Ser Thr Leu Glu Ile Ser Gly His His His His His His
        1055                1060                1065

<210> SEQ ID NO 46
<211> LENGTH: 34
<212> TYPE: DNA
<213> ORGANISM: Artificial Sequence
<220> FEATURE:
<223> OTHER INFORMATION: Forward primer for HaloTag-EBFP-V5-G3BP1

<400> SEQUENCE: 46
tagtagaagc ttggtaccat ggtgatggag aagc                          34

<210> SEQ ID NO 47
<211> LENGTH: 39
<212> TYPE: DNA
<213> ORGANISM: Artificial Sequence
<220> FEATURE:
<223> OTHER INFORMATION: Reverse primer for HaloTag-EBFP-V5-G3BP1

<400> SEQUENCE: 47
tagtaggcta gcttcttgta cagctcgtcc atgccgaga                     39

<210> SEQ ID NO 48
<211> LENGTH: 769
<212> TYPE: PRT
<213> ORGANISM: Artificial Sequence
<220> FEATURE:
<223> OTHER INFORMATION: SARS-CoV-2N-V5-HaloTag-AP

<400> SEQUENCE: 48

Met Ser Asp Asn Gly Pro Gln Asn Gln Arg Asn Ala Pro Arg Ile Thr
1               5                   10                  15

Phe Gly Gly Pro Ser Asp Ser Thr Gly Ser Asn Gln Asn Gly Glu Arg
             20                  25                  30

Ser Gly Ala Arg Ser Lys Gln Arg Arg Pro Gln Gly Leu Pro Asn Asn
         35                  40                  45

Thr Ala Ser Trp Phe Thr Ala Leu Thr Gln His Gly Lys Glu Asp Leu
     50                  55                  60

```
Lys Phe Pro Arg Gly Gln Gly Val Pro Ile Asn Thr Asn Ser Ser Pro
 65                  70                  75                  80

Asp Asp Gln Ile Gly Tyr Tyr Arg Arg Ala Thr Arg Ile Arg Gly
                 85                  90                  95

Gly Asp Gly Lys Met Lys Asp Leu Ser Pro Arg Trp Tyr Phe Tyr Tyr
                100                 105                 110

Leu Gly Thr Gly Pro Glu Ala Gly Leu Pro Tyr Gly Ala Asn Lys Asp
                115                 120                 125

Gly Ile Ile Trp Val Ala Thr Glu Gly Ala Leu Asn Thr Pro Lys Asp
            130                 135                 140

His Ile Gly Thr Arg Asn Pro Ala Asn Asn Ala Ala Ile Val Leu Gln
145                 150                 155                 160

Leu Pro Gln Gly Thr Thr Leu Pro Lys Gly Phe Tyr Ala Glu Gly Ser
                165                 170                 175

Arg Gly Gly Ser Gln Ala Ser Ser Arg Ser Ser Ser Arg Ser Arg Asn
                180                 185                 190

Ser Ser Arg Asn Ser Thr Pro Gly Ser Ser Arg Gly Thr Ser Pro Ala
            195                 200                 205

Arg Met Ala Gly Asn Gly Gly Asp Ala Ala Leu Ala Leu Leu Leu Leu
            210                 215                 220

Asp Arg Leu Asn Gln Leu Glu Ser Lys Met Ser Gly Lys Gly Gln Gln
225                 230                 235                 240

Gln Gln Gly Gln Thr Val Thr Lys Lys Ser Ala Ala Glu Ala Ser Lys
                245                 250                 255

Lys Pro Arg Gln Lys Arg Thr Ala Thr Lys Ala Tyr Asn Val Thr Gln
                260                 265                 270

Ala Phe Gly Arg Arg Gly Pro Glu Gln Thr Gln Gly Asn Phe Gly Asp
            275                 280                 285

Gln Glu Leu Ile Arg Gln Gly Thr Asp Tyr Lys His Trp Pro Gln Ile
            290                 295                 300

Ala Gln Phe Ala Pro Ser Ala Ser Ala Phe Phe Gly Met Ser Arg Ile
305                 310                 315                 320

Gly Met Glu Val Thr Pro Ser Gly Thr Trp Leu Thr Tyr Thr Gly Ala
                325                 330                 335

Ile Lys Leu Asp Asp Lys Asp Pro Asn Phe Lys Asp Gln Val Ile Leu
                340                 345                 350

Leu Asn Lys His Ile Asp Ala Tyr Lys Thr Phe Pro Pro Thr Glu Pro
            355                 360                 365

Lys Lys Asp Lys Lys Lys Lys Ala Asp Glu Thr Gln Ala Leu Pro Gln
            370                 375                 380

Arg Gln Lys Lys Gln Gln Thr Val Thr Leu Leu Pro Ala Ala Asp Leu
385                 390                 395                 400

Asp Asp Phe Ser Lys Gln Leu Gln Gln Ser Met Ser Ser Ala Asp Ser
                405                 410                 415

Thr Gln Ala Glu Asn Leu Tyr Phe Gln Ser Glu Asn Leu Tyr Phe Gln
                420                 425                 430
```

```
Ser Lys Leu Ala Gly Lys Pro Ile Pro Asn Pro Leu Leu Gly Leu Asp
        435                 440                 445

Ser Thr Met Ala Glu Ile Gly Thr Gly Phe Pro Phe Asp Pro His Tyr
    450                 455                 460

Val Glu Val Leu Gly Glu Arg Met His Tyr Val Asp Val Gly Pro Arg
465                 470                 475                 480

Asp Gly Thr Pro Val Leu Phe Leu His Gly Asn Pro Thr Ser Ser Tyr
                485                 490                 495

Val Trp Arg Asn Ile Ile Pro His Val Ala Pro Thr His Arg Cys Ile
            500                 505                 510

Ala Pro Asp Leu Ile Gly Met Gly Lys Ser Asp Lys Pro Asp Leu Gly
            515                 520                 525

Tyr Phe Phe Asp Asp His Val Arg Phe Met Asp Ala Phe Ile Glu Ala
            530                 535                 540

Leu Gly Leu Glu Glu Val Val Leu Val Ile His Asp Trp Gly Ser Ala
545                 550                 555                 560

Leu Gly Phe His Trp Ala Lys Arg Asn Pro Glu Arg Val Lys Gly Ile
                565                 570                 575

Ala Phe Met Glu Phe Ile Arg Pro Ile Pro Thr Trp Asp Glu Trp Pro
                580                 585                 590

Glu Phe Ala Arg Glu Thr Phe Gln Ala Phe Arg Thr Thr Asp Val Gly
                595                 600                 605

Arg Lys Leu Ile Ile Asp Gln Asn Val Phe Ile Glu Gly Thr Leu Pro
            610                 615                 620

Met Gly Val Val Arg Pro Leu Thr Glu Val Glu Met Asp His Tyr Arg
625                 630                 635                 640

Glu Pro Phe Leu Asn Pro Val Asp Arg Glu Pro Leu Trp Arg Phe Pro
                645                 650                 655

Asn Glu Leu Pro Ile Ala Gly Glu Pro Ala Asn Ile Val Ala Leu Val
                660                 665                 670

Glu Glu Tyr Met Asp Trp Leu His Gln Ser Pro Val Pro Lys Leu Leu
            675                 680                 685

Phe Trp Gly Thr Pro Gly Val Leu Ile Pro Pro Ala Glu Ala Ala Arg
            690                 695                 700

Leu Ala Lys Ser Leu Pro Asn Cys Lys Ala Val Asp Ile Gly Pro Gly
705                 710                 715                 720

Leu Asn Leu Leu Gln Glu Asp Asn Pro Asp Leu Ile Gly Ser Glu Ile
                725                 730                 735

Ala Arg Trp Leu Ser Thr Leu Glu Ile Ser Gly Glu Asn Leu Tyr Phe
                740                 745                 750

Gln Ser Gly Leu Asn Asp Ile Phe Glu Ala Gln Lys Ile Glu Trp His
            755                 760                 765

Glu
```

```
<210> SEQ ID NO 49
<211> LENGTH: 41
<212> TYPE: DNA
<213> ORGANISM: Artificial Sequence
<220> FEATURE:
<223> OTHER INFORMATION: Forward primer for SARS-CoV-2N-V5-HaloTag-AP

<400> SEQUENCE: 49
tagtagggta ccatgtctga taatggaccc caaaatcagc g                 41

<210> SEQ ID NO 50
<211> LENGTH: 79
<212> TYPE: DNA
<213> ORGANISM: Artificial Sequence
<220> FEATURE:
<223> OTHER INFORMATION: Reverse primer for SARS-CoV-2N-V5-HaloTag-AP

<400> SEQUENCE: 50
tagtaggcta gcttagactg aaaatacagg ttttcagact gaaaatacag gttttcggcc    60
tgagttgagt cagcactgc                                                79
```